United States Patent
Oi et al.

(10) Patent No.: US 11,972,547 B2
(45) Date of Patent: Apr. 30, 2024

(54) VIDEO DISTRIBUTION SYSTEM, VIDEO DISTRIBUTION METHOD, AND DISPLAY TERMINAL

(71) Applicant: SONY GROUP CORPORATION, Tokyo (JP)

(72) Inventors: Junji Oi, Kanagawa (JP); Tomohiro Ooi, Chiba (JP); Hiroki Gohara, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 441 days.

(21) Appl. No.: 17/428,469

(22) PCT Filed: Feb. 28, 2020

(86) PCT No.: PCT/JP2020/008240
§ 371 (c)(1),
(2) Date: Aug. 4, 2021

(87) PCT Pub. No.: WO2020/189223
PCT Pub. Date: Sep. 24, 2020

(65) Prior Publication Data
US 2022/0101498 A1    Mar. 31, 2022

(30) Foreign Application Priority Data

Mar. 15, 2019   (JP) .................. 2019-048111

(51) Int. Cl.
*G06T 5/00*     (2006.01)
*G06T 3/40*     (2006.01)
(Continued)

(52) U.S. Cl.
CPC .............. *G06T 5/77* (2024.01); *G06T 3/4038* (2013.01); *G06T 11/60* (2013.01); *H04N 5/2628* (2013.01);
(Continued)

(58) Field of Classification Search
CPC ....... G06T 5/005; G06T 3/4038; G06T 11/60; G06T 2207/20221; H04N 5/2628;
(Continued)

(56) References Cited

U.S. PATENT DOCUMENTS

| 2011/0037894 A1 | 2/2011 | Sbaiz |
| 2016/0165148 A1 | 6/2016 | Itoh |

(Continued)

FOREIGN PATENT DOCUMENTS

| CN | 101262597 A | 9/2008 |
| CN | 109167924 A | 1/2019 |

(Continued)

OTHER PUBLICATIONS

Liu Yu et al, Design of Ultra High Resolution Real-time Display System:, Journal of National University of Defense Technology, Jun. 25, 2002, 5 pgs., No. 3.

*Primary Examiner* — Said Broome
*Assistant Examiner* — Andrew Shin
(74) *Attorney, Agent, or Firm* — Paratus Law Group, PLLC

(57) ABSTRACT

There is provided a video distribution system, a video distribution method, and a display terminal enabling more reliable video distribution, the video distribution system including: an image acquisition unit that acquires a low-resolution image from a low-resolution camera while acquiring a high-resolution image from a high-resolution camera; an abnormality determination unit that determines whether or not there is an abnormality in any one of a first signal representing the low-resolution image and a second signal representing the high-resolution image; and a transmission control unit that transmits first synthetic images to a display terminal in a case where it is determined that there is no abnormality, the first synthetic images having continuity (Continued)

between the low-resolution image and the high-resolution image, and transmits second synthetic images to the display terminal in a case where it is determined that there is an abnormality, the second synthetic images substantially reproducing continuity by replacing an image acquired from one determined to have the abnormality between the low-resolution camera and the high-resolution camera with a substitute image corresponding to a region of a real space. The present technology can be applied to, for example, a system performing VR live distribution.

20 Claims, 43 Drawing Sheets

(51) Int. Cl.
  *G06T 3/4038* (2024.01)
  *G06T 5/77* (2024.01)
  *G06T 11/60* (2006.01)
  *H04N 5/262* (2006.01)
  *H04N 5/265* (2006.01)
  *H04N 17/00* (2006.01)

(52) U.S. Cl.
  CPC ........... *H04N 5/265* (2013.01); *H04N 17/002* (2013.01); *G06T 2207/20221* (2013.01)

(58) Field of Classification Search
  CPC ................ H04N 5/265; H04N 17/002; H04N 21/44008; H04N 21/440245; H04N 21/44029; H04N 21/21805
  See application file for complete search history.

(56) References Cited

U.S. PATENT DOCUMENTS

| | | |
|---|---|---|
| 2016/0373637 A1* | 12/2016 | Zhou ........................ G06F 18/22 |
| 2017/0243384 A1 | 8/2017 | Huang |
| 2017/0280066 A1 | 9/2017 | Hayashi |
| 2018/0081178 A1* | 3/2018 | Shpunt ................. H04N 13/383 |

FOREIGN PATENT DOCUMENTS

| | | |
|---|---|---|
| EP | 3528200 A1 | 8/2019 |
| JP | 2012089918 A | 5/2012 |
| JP | 2017-069926 A | 4/2017 |
| KR | 20050000564 A | 1/2005 |
| WO | WO 2017/099037 A1 | 6/2017 |
| WO | WO 2018/070121 A1 | 4/2018 |

* cited by examiner

C

VIDEO DISTRIBUTION SYSTEM, VIDEO DISTRIBUTION METHOD, AND DISPLAY TERMINAL

CROSS REFERENCE TO PRIOR APPLICATION

This application is a National Stage Patent Application of PCT International Patent Application No. PCT/JP2020/008240 (filed on Feb. 28, 2020) under 35U.S.C. § 371, which claims priority to Japanese Patent Application No. 2019-048111 (filed on Mar. 15, 2019), which are all hereby incorporated by reference in their entirety.

TECHNICAL FIELD

The present technology relates to a video distribution system, a video distribution method, and a display terminal, and particularly relates to a video distribution system, a video distribution method, and a display terminal enabling more reliable video distribution.

BACKGROUND ART

As an image processing device, it has been known that a plurality of images captured by a plurality of imaging units is synthesized and synthetic images are output (for example, see Patent Document 1).

CITATION LIST

Patent Document

Patent Document 1: Japanese Patent Application Laid-Open No. 2017-69926

SUMMARY OF THE INVENTION

Problems to be Solved by the Invention

Meanwhile, in a case where a plurality of images captured by a plurality of imaging units is synthesized to be distributed as a video, if inputs of images from some of the plurality of imaging units are missing, video distribution sometimes cannot be continued. Thus, a technology for more reliable video distribution has been required.

Under such circumstances, the present technology has been made to enable more reliable video distribution.

Solutions to Problems

A video distribution system according to one aspect of the present technology includes: an image acquisition unit that acquires a low-resolution image from a low-resolution camera while acquiring a high-resolution image from a high-resolution camera, the high-resolution image having a narrower angle of view than the low-resolution image, having a higher resolution than the low-resolution image, and representing a region of a real space included in the low-resolution image; an abnormality determination unit that determines whether or not there is an abnormality in any one of a first signal representing the low-resolution image and a second signal representing the high-resolution image; and a transmission control unit that transmits first synthetic images to a display terminal in a case where it is determined that there is no abnormality, the first synthetic images having continuity between the low-resolution image and the high-resolution image, and transmits second synthetic images to the display terminal in a case where it is determined that there is an abnormality, the second synthetic images substantially reproducing the continuity by replacing an image acquired from one determined to have the abnormality between the low-resolution camera and the high-resolution camera with a substitute image corresponding to the region of the real space.

A video distribution method performed by a video distribution system according to one aspect of the present technology includes: acquiring a low-resolution image from a low-resolution camera while acquiring a high-resolution image from a high-resolution camera, the high-resolution image having a narrower angle of view than the low-resolution image, having a higher resolution than the low-resolution image, and representing a region of a real space included in the low-resolution image; determining whether or not there is an abnormality in any one of a first signal representing the low-resolution image and a second signal representing the high-resolution image; and transmitting first synthetic images to a display terminal in a case where it is determined that there is no abnormality, the first synthetic images having continuity between the low-resolution image and the high-resolution image, and transmitting second synthetic images to the display terminal in a case where it is determined that there is an abnormality, the second synthetic images substantially reproducing the continuity by replacing an image acquired from one determined to have the abnormality between the low-resolution camera and the high-resolution camera with a substitute image corresponding to the region of the real space.

In the video distribution system and the video distribution method according to one aspect of the present technology: the low-resolution image is acquired from the low-resolution camera while the high-resolution image is acquired from the high-resolution camera, the high-resolution image having a narrower angle of view than the low-resolution image, having a higher resolution than the low-resolution image, and representing a region of a real space included in the low-resolution image; it is determined whether or not there is an abnormality in any one of the first signal representing the low-resolution image and the second signal representing the high-resolution image; and the first synthetic images are transmitted to the display terminal in a case where it is determined that there is no abnormality, the first synthetic images having continuity between the low-resolution image and the high-resolution image, and the second synthetic images are transmitted to the display terminal in a case where it is determined that there is an abnormality, the second synthetic images substantially reproducing the continuity by replacing an image acquired from one determined to have the abnormality between the low-resolution camera and the high-resolution camera with the substitute image corresponding to the region of the real space.

A display terminal according to one aspect of the present technology includes: an image acquisition unit that acquires first synthetic images having continuity between a low-resolution image acquired from a low-resolution camera and a high-resolution image acquired from a high-resolution camera, the high-resolution image having a narrower angle of view than the low-resolution image, having a higher resolution than the low-resolution image, and representing a region of a real space included in the low-resolution image; and a display control unit that displays the first synthetic images on a display unit in a case where there is no abnormality in any one of a first signal representing the low-resolution image and a second signal representing the high-resolution image, and displays second synthetic images on the display unit in a case where there is an abnormality, the second synthetic images substantially reproducing the continuity by replacing an image acquired from one having the abnormality between the low-resolution camera and the high-resolution camera with a substitute image corresponding to the region of the real space.

In the display terminal according to one aspect of the present technology: the first synthetic images having continuity between the low-resolution image acquired from the low-resolution camera and the high-resolution image acquired from the high-resolution camera are acquired, the high-resolution image having a narrower angle of view than the low-resolution image, having a higher resolution than the low-resolution image, and representing a region of a real space included in the low-resolution image; and the first synthetic images are displayed on the display unit in a case where there is no abnormality in any one of the first signal representing the low-resolution image and the second signal representing the high-resolution image, and the second synthetic images are displayed on the display unit in a case where there is an abnormality, the second synthetic images substantially reproducing the continuity by replacing an image acquired from one having the abnormality between the low-resolution camera and the high-resolution camera with the substitute image corresponding to the region of the real space.

Note that the display terminal according to one aspect of the present technology may be an independent device or may be an internal block constituting one device.

MODE FOR CARRYING OUT THE INVENTION

Hereinafter, embodiments of the present technology will be described with reference to the drawings. Note that the description will be given in the following order.

1. First Embodiment
2. Second Embodiment
3. Modified Example
4. Configuration of Computer

1. First Embodiment (Configuration of System)

Figure 1:
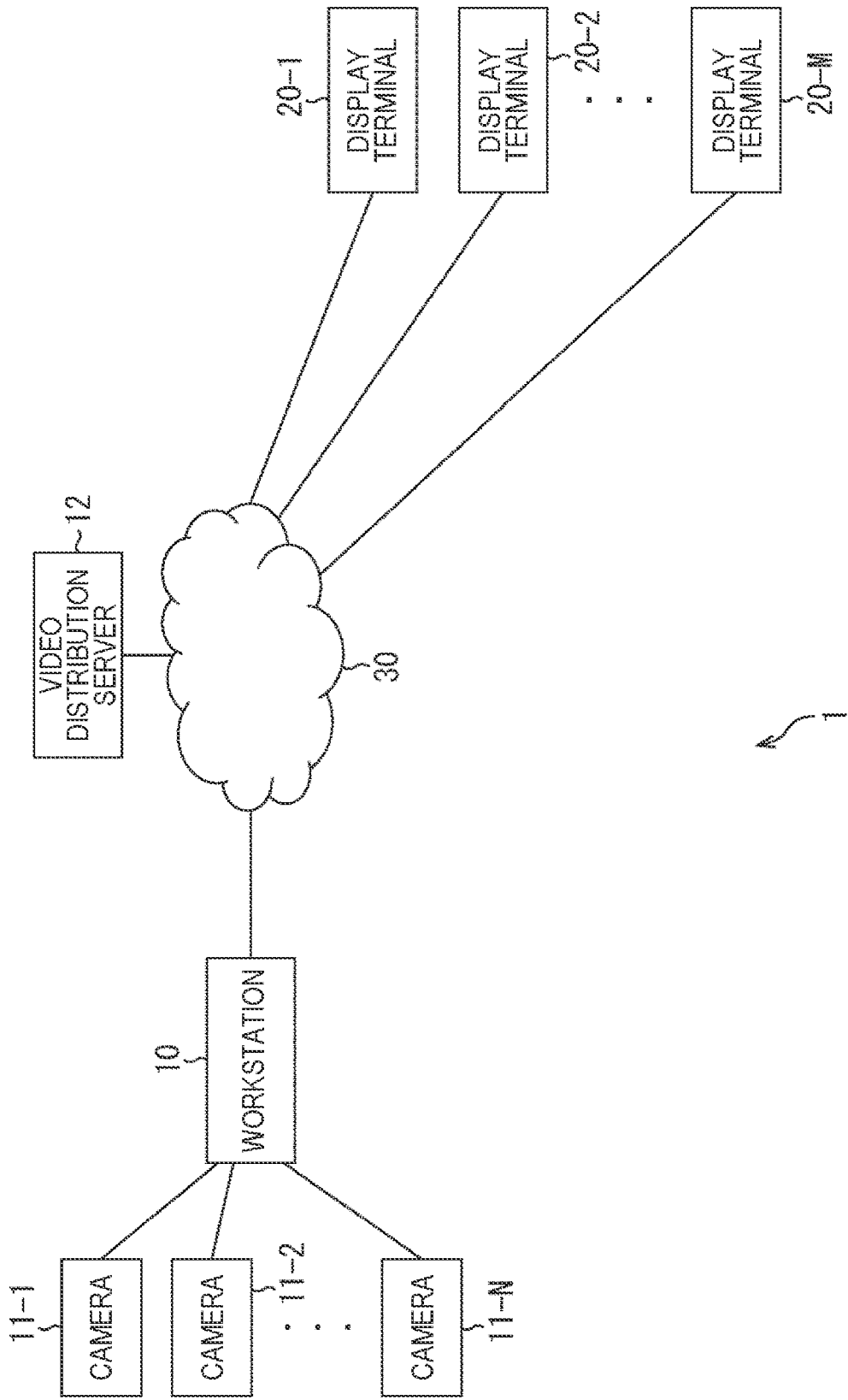
FIG. 1 is a diagram illustrating a first example of a configuration for a video distribution system to which the present technology is applied.

FIG. 1 illustrates a first example of a configuration for a video distribution system to which the present technology is applied.

The video distribution system 1 includes a workstation 10, cameras 11-1 to 11-N (N: an integer of 2 or more), a video distribution server 12, and display terminals 20-1 to 20-M (M: an integer of 1 or more). Furthermore, in the video distribution system 1, each of the workstation 10, the video distribution server 12, and the display terminals 20-1 to 20-M is connected to the Internet 30.

The workstation 10 is an image processing device specialized for image processing. The workstation 10 performs image processing on a plurality of images captured by the cameras 11-1 to 11-N, and transmits data obtained by the image processing to the video distribution server 12 via the Internet 30.

The camera 11-1 includes, for example, an image sensor, such as a complementary metal oxide semiconductor (CMOS) image sensor or a charge coupled device (CCD) image sensor, and a signal processing unit, such as a camera image signal processor (ISP). The camera 11-1 transmits the data on the captured images to the workstation 10.

Each of the cameras 11-2 to 11-N includes an image sensor and a signal processing unit, and transmits data on captured images to the workstation 10.

Note that each of the cameras 11-1 to 11-N may be connected to the workstation 10, for example, either via a communication line such as a dedicated line (cable) or by wired communication or wireless communication in conformity with a predetermined standard. Furthermore, in the following description, the cameras 11-1 to 11-N will be referred to simply as camera(s) 11 in a case where they do not need to be particularly distinguished from each other.

The video distribution server 12 is a web server installed, for example, in a data center or the like. The video distribution server 12 receives the data transmitted from the workstation 10. In a case where video distribution is requested from any one of the display terminals 20-1 to 20-M, the video distribution server 12 transmits a video stream including the data from the workstation 10 to the requesting display terminal 20 via the Internet 30.

The display terminal 20-1 is configured as, for example, a head-mounted display that is mounted on a user's head in such a manner as to cover user's both eyes so that the user watches a video or a still image displayed on a display screen provided in front of the user's eyes. Note that the display terminal 20-1 is not limited to the head-mounted display, and may be, for example, an electronic device having a display such as a smartphone, a tablet terminal, or a game machine.

The display terminal 20-1 transmits a request for video distribution to the video distribution server 12 via the Internet 30, for example, according to an operation of the user. The display terminal 20-1 receives and processes a video stream transmitted from the video distribution server 12 via the Internet 30, and reproduces a video. The video includes, for example, content that is distributed live from the video distribution server 12, such as a virtual reality (VR) video.

Similarly to the display terminal 20-1, each of the display terminals 20-2 to 20-M is configured as, for example, a head-mounted display or the like, and reproduces a video distributed as a video stream from the video distribution server 12. Note that the display terminals 20-1 to 20-M will be referred to simply as display terminal(s) 20 in a case where they do not need to be particularly distinguished from each other.

(Configuration of Workstation)

Figure 2:
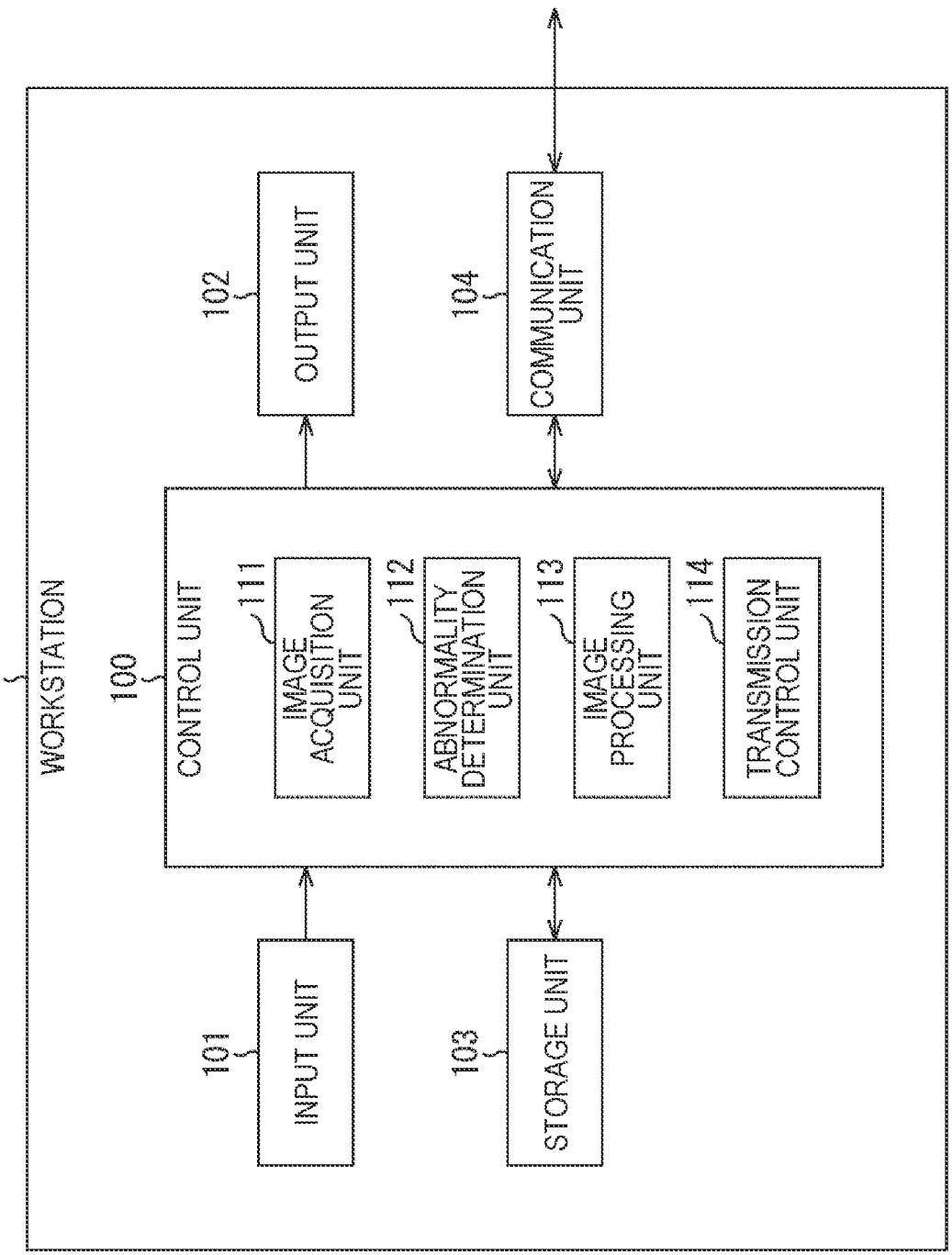
FIG. 2 is a diagram illustrating an example of a configuration for a workstation.

FIG. 2 illustrates an example of a configuration for the workstation 10 of FIG. 1.

In FIG. 2, the workstation 10 includes a control unit 100, an input unit 101, an output unit 102, a storage unit 103, and a communication unit 104.

The control unit 100 includes, for example, a processor such as a central processing unit (CPU), a graphic card (video card), etc. The control unit 100 is a main processing device controlling operation of each unit and performing various types of arithmetic processing.

The input unit 101 is configured as, for example, a keyboard, a mouse, a physical button, or the like. The input unit 101 supplies an operation signal corresponding to a user's operation to the control unit 100.

The output unit 102 is configured as, for example, a display, a speaker, or the like. The output unit 102 outputs a video image, a sound, or the like under the control of the control unit 100.

The storage unit 103 is configured as, for example, a semiconductor memory including a non-volatile memory or a volatile memory, a buffer memory, or the like. The storage unit 103 stores various kinds of data under the control of the control unit 100.

The communication unit 104 is configured as, for example, a communication module supporting wireless communication or wired communication in conformity with a predetermined standard, a video and audio capture card, or the like.

The communication unit 104 exchanges various kinds of data with the video distribution server 12 via the Internet 30 under the control of the control unit 100. Furthermore, the communication unit 104 receives data from the cameras 11-1 to 11-N under the control of the control unit 100.

Furthermore, the control unit 100 includes an image acquisition unit 111, an abnormality determination unit 112, an image processing unit 113, and a transmission control unit 114.

The image acquisition unit 111 acquires (captures) an image signal for each of a plurality of images captured by the cameras 11-1 to 11-N via the communication unit 104 and stores the acquired image signal in the storage unit 103.

The abnormality determination unit 112 determines whether or not there is an abnormality in the image signal on the basis of a result of monitoring the plurality of images acquired by the image acquisition unit 111. The abnormality determination unit 112 supplies the abnormality determination result to the image processing unit 113.

The image processing unit 113 reads out the image signal of the image stored in the storage unit 103, performs predetermined image processing, and supplies data obtained as a result of the image processing to the transmission control unit 114. Note that the image processing includes, for example, stitch processing, trimming and resizing processing, dividing processing, encoding processing, and the like, which will be described in detail later with reference to FIG. 5, etc.

The transmission control unit 114 controls the communication unit 104 to transmit the data from the image processing unit 113 to the video distribution server 12 via the Internet 30.

The video distribution system 1 is configured as described above.

Example where Inputs from Some Cameras are Missing

Meanwhile, in the video distribution system 1, in a case where inputs of images are missing from some cameras 11 of the plurality of cameras 11-1 to 11-N, video distribution cannot be continued sometimes. Thus, a certain solution to the missing input is required.

Figure 3:
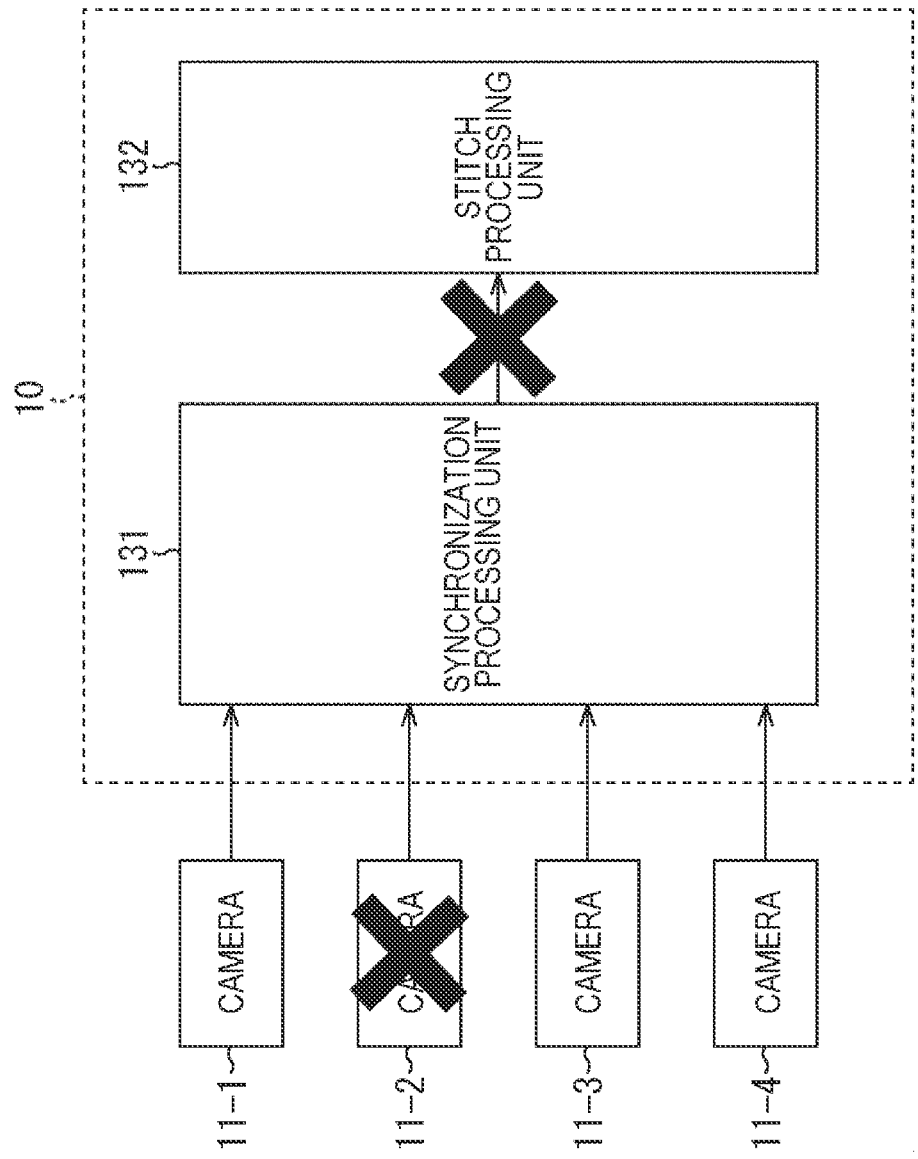
FIG. 3 is a diagram illustrating an example in which inputs from some cameras are missing.

Here, for example, it is assumed that, among four cameras 11-1 to 11-4 connected to the workstation 10, a camera 11-2 has failed, as illustrated in FIG. 3. In this case, image signals input from the cameras 11-1 to 11-4, respectively, are synchronized by a synchronization processing unit 131 in (the image processing unit 113 of) the workstation 10.

However, since no image signal is input from the camera 11-2 that has failed, the workstation 10 stands by until image signals from all of the cameras 11 are input thereto. At this time, a stitch processing unit 132 cannot perform stitch processing because no image signals synchronized in the preceding stage are input thereto from the synchronization processing unit 131.

As described above, if at least one camera 11 of the plurality of cameras 11 fails, then the stitch processing cannot be performed, and as a result, the video distribution cannot be continued. Note that the stitch processing will be described in detail later with reference to FIGS. 6 and 7.

Example where Missing Input is Replaced with Black Image

Figure 4:
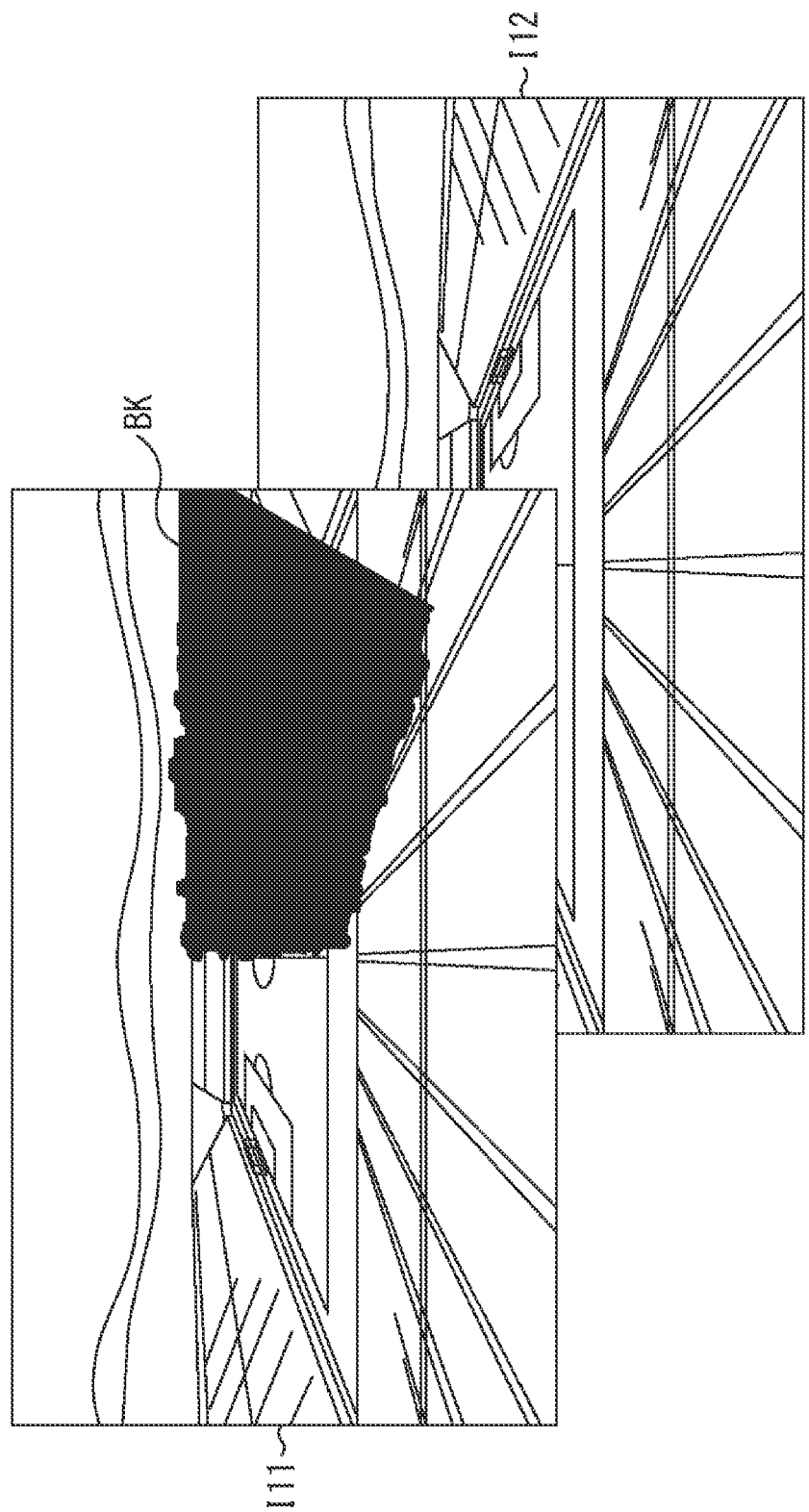
FIG. 4 is a diagram illustrating an example of a case where a missing input from a camera is replaced with a black image.

Furthermore, FIG. 4 illustrates an example of a case where a missing input from a camera is replaced with a black image.

For example, it is assumed that the four cameras 11-1 to 11-4 include a high-resolution camera 11-1, a high-resolution camera 11-2, a low-resolution camera 11-3, and a low-resolution camera 11-4.

Here, the high-resolution camera 11 is a camera capable of capturing a high-resolution image. The high-resolution image is an image having a narrower angle of view than a low-resolution image, having a higher resolution than the low-resolution image, and representing a region of a real space included in the low-resolution image.

On the other hand, the low-resolution camera 11 is a camera capable of capturing a low-resolution image. The low-resolution image is an image having a wider angle of view than a high-resolution image, having a lower resolution than the high-resolution image, and including the high-resolution image representing a region of a real space.

In FIG. 4, for example, since the high-resolution camera 11-2 has failed, a partial region of a high-resolution image I11 is replaced with a black image ("BK" in the drawing). At this time, the display terminal 20 on a reproduction side receives a video stream distributed from the video distribution server 12 and displays a video image in a hierarchical segmentation scheme, but the black image ("BK" in the drawing) drawn on a low-resolution image I12 makes a region that is supposed to be seen by the user invisible.

Here, in the hierarchical segmentation scheme, in order to increase a resolution of a partial region-of-interest of an omnidirectional image, high-resolution images cut out in a plurality of regions after stitch processing is performed on the images captured by the plurality of cameras 11-1 to 11-N and an omnidirectional low-resolution image are distributed as different streams, and the images are synthesized and synthetic images are displayed on the display terminal 20 on the reproduction side.

That is, in the hierarchical segmentation scheme, when the high-resolution image I11 including the black image illustrated in FIG. 4 ("BK" in the drawing) is distributed to the display terminal 20 on the reproduction side in order to superimpose the high-resolution image on the low-resolution image, the region that is visible in the low-resolution image I12 becomes invisible. Note that a video that does not include an alpha value cannot be expressed as being transparent.

Therefore, the present technology enables the video distribution system 1 to continue video distribution, even in a case where inputs from some cameras 11 of the plurality of cameras 11-1 to 11-N are missing, thereby more reliably performing the video distribution. Hereinafter, the present technology will be described in detail with reference to the drawings.

(Configuration for Main Components on Distribution Side)

Figure 5:
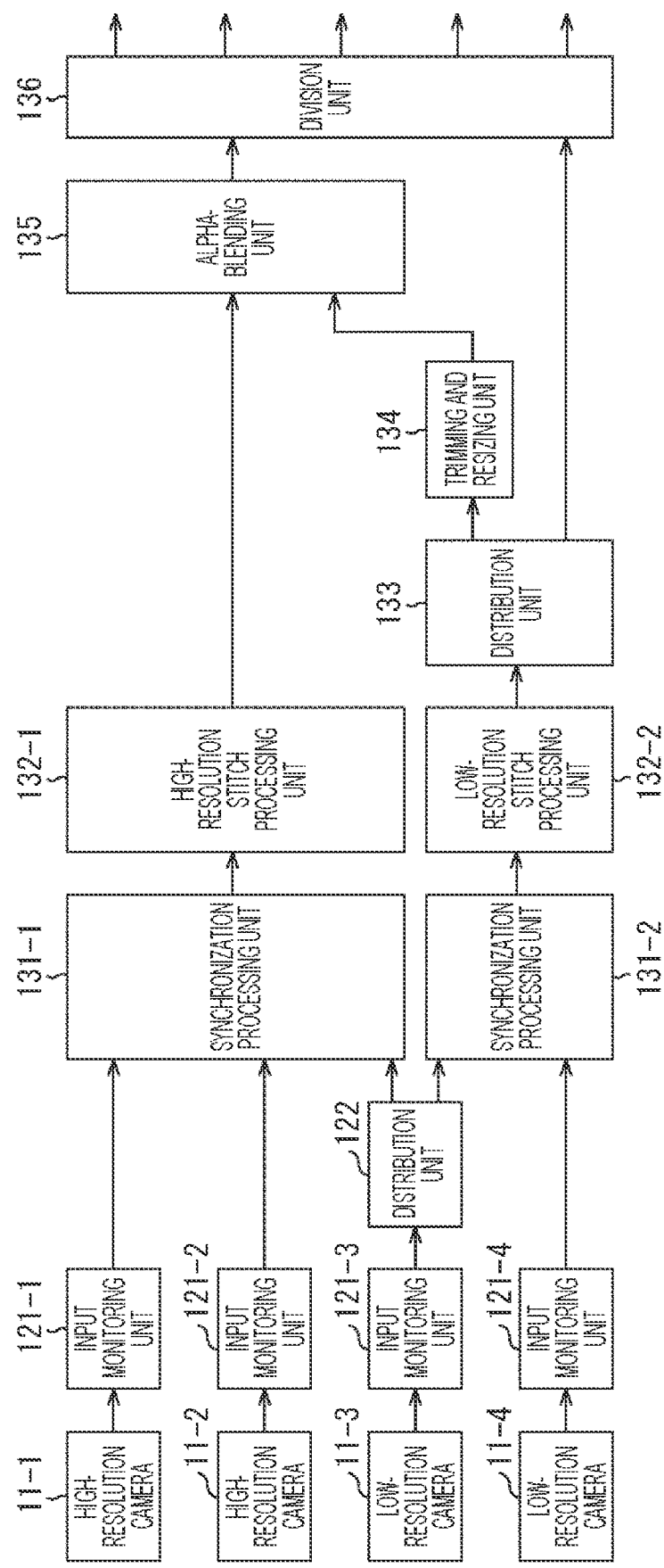
FIG. 5 is a diagram illustrating an example of a configuration for main components in the video distribution system to which the present technology is applied.

FIG. 5 illustrates an example of a configuration for main components on a distribution side in the video distribution system 1 of FIG. 1.

Note that input monitoring units 121-1 to 121-4 in FIG. 5 are provided to function as the abnormality determination unit 112 (FIG. 2). Furthermore, a synchronization processing unit 131-1, a synchronization processing unit 131-2, a high-resolution stitch processing unit 132-1, a low-resolution stitch processing unit 132-2, a distribution unit 133, a trimming and resizing unit 134, an alpha-blending unit 135, and a division unit 136 are provided, for example, to function as the image processing unit 113 (FIG. 2).

In FIG. 5, the workstation 10 has four camera inputs. The image acquisition unit 111 (FIG. 2) acquires respective image signals of a high-resolution image I1-1 captured by the high-resolution camera 11-1, a high-resolution image I1-2 captured by the high-resolution camera 11-2, a low-resolution image I1-3 captured by the low-resolution camera 11-3, and a low-resolution image I1-4 captured by the low-resolution camera 11-4, and the acquired image signals are input as input signals.

The input monitoring unit 121-1 monitors an input signal of the high-resolution image I1-1 input from the high-resolution camera 11-1 to the synchronization processing unit 131-1. Furthermore, the input monitoring unit 121-2 monitors an input signal of the high-resolution image I1-2 input from the high-resolution camera 11-2 to the synchronization processing unit 131-1.

The input monitoring unit 121-3 monitors an input signal of the low-resolution image I1-3 input from the low-resolution camera 11-3 to a distribution unit 122. Furthermore, the input monitoring unit 121-4 monitors an input signal of the low-resolution image I1-4 input from the low-resolution camera 11-4 to the synchronization processing unit 131-2.

Each of monitoring results of the input monitoring units 121-1 to 121-4 is supplied to the abnormality determination unit 112 (FIG. 2) to determine whether or not there is an abnormality in each of the input signals (whether or not there is an abnormality in any one of the high-resolution image signals and the low-resolution image signals).

In the example of the configuration of FIG. 5, image processing is described for a case where it is determined that there is no abnormality in the input signals. Note that image processing will be described later with reference to FIGS. 10, 17, 21, etc. for a case where it is determined that there is an abnormality in the input signals.

The distribution unit 122 distributes the input signal of the low-resolution image I1-3 input from the input monitoring unit 121-3 to be supplied to each of the synchronization processing unit 131-1 and the synchronization processing unit 131-2.

The synchronization processing unit 131-1 synchronizes the respective image signals of the high-resolution image I1-1, the high-resolution image I1-2, and the low-resolution image I1-3 input thereto, and supplies the synchronized image signals to the high-resolution stitch processing unit 132-1.

The synchronization processing unit 131-2 synchronizes the respective image signals of the low-resolution image I1-3 and the low-resolution image I1-4 input thereto, and supplies the synchronized image signals to the low-resolution stitch processing unit 132-2.

The high-resolution stitch processing unit 132-1 performs stitch processing on the respective image signals of the high-resolution image I1-1, the high-resolution image I1-2, and the low-resolution image I1-3 input thereto after being synchronized, and supplies an image signal of a high-resolution stitch image I3-1 obtained as a result of the processing to the alpha-blending unit 135.

The low-resolution stitch processing unit 132-2 performs stitch processing on the respective image signals of the low-resolution image I1-3 and the low-resolution image I1-4 input thereto after being synchronized, and supplies an image signal of a low-resolution stitch image I3-2 obtained as a result of the processing to the distribution unit 133.

Figure 6:
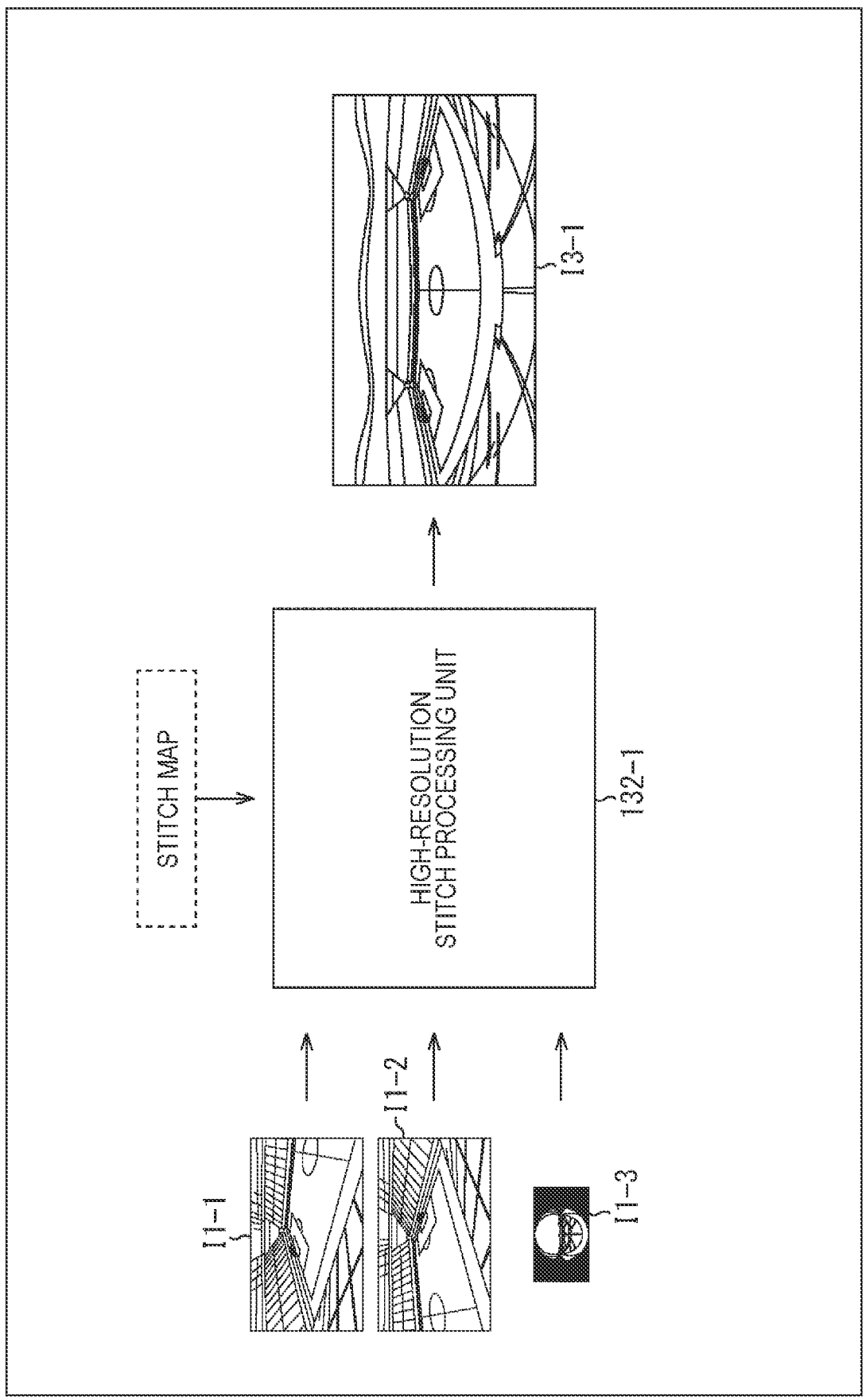
FIG. 6 is a diagram for explaining stitch processing in detail.

Here, FIG. 6 illustrates the stitch processing executed by the high-resolution stitch processing unit 132-1 in detail. In the stitch processing, the high-resolution stitch image I3-1 is generated by obtaining a color and an alpha value using a corresponding stitch map for each of the high-resolution image I1-1, the high-resolution image I1-2, and the low-resolution image I1-3 input thereto after being synchronized, and performing alpha blending in serial order.

Figure 7:
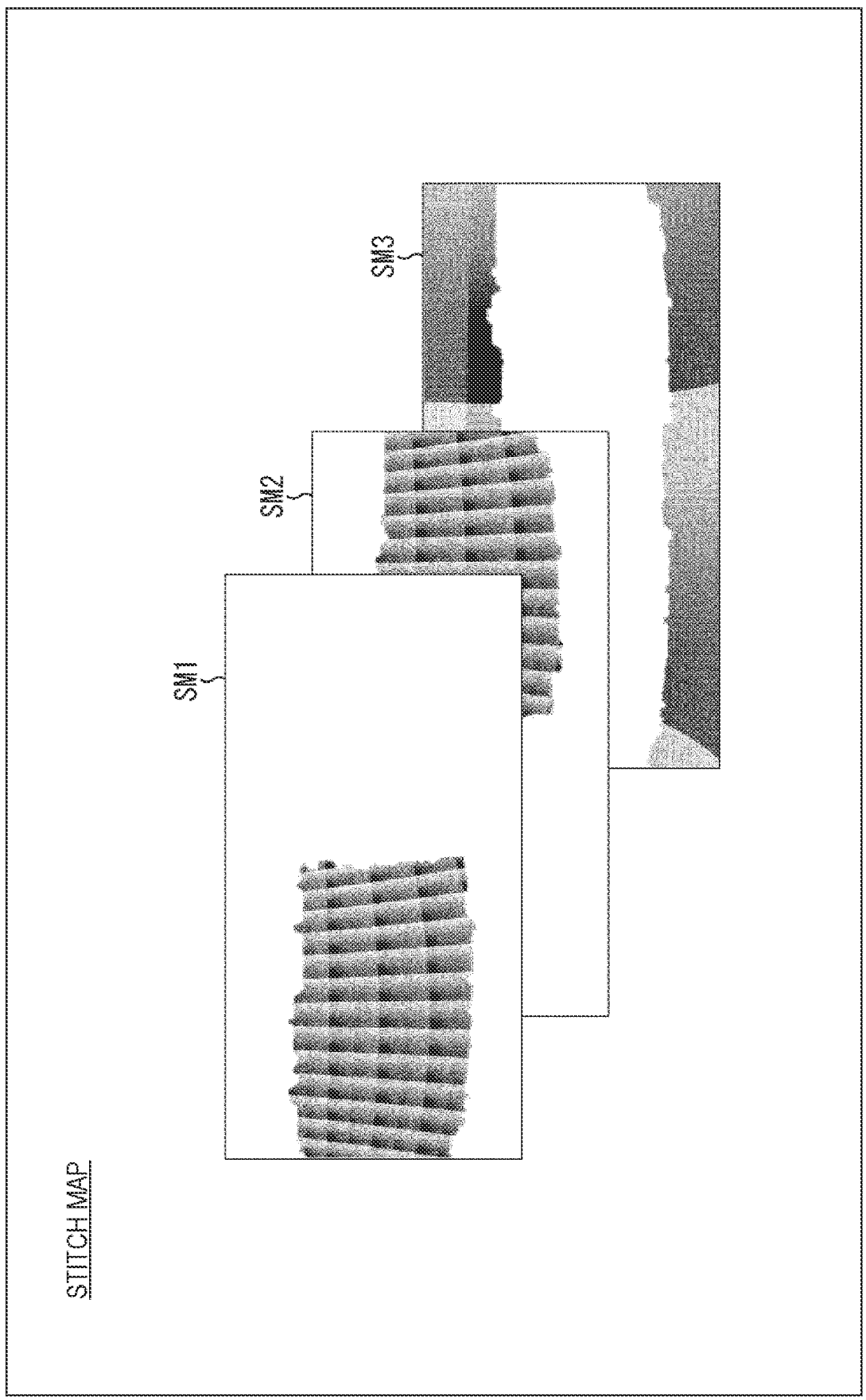
FIG. 7 is a diagram illustrating an example of a stitch map.

Furthermore, FIG. 7 illustrates examples of stitch maps. Here, the stitch map is data generated in advance using stitching software, and is a map in which coordinates and an alpha value of a conversion source pixel are stored for each conversion destination pixel.

In the example of FIG. 7, stitch maps SM1 to SM3 are prepared for the high-resolution image I1-1, the high-resolution image I1-2, and the low-resolution image I1-3, respectively, as input units.

By performing the stitch processing using such stitch maps SM1 to SM3, the high-resolution stitch processing unit 132-1 can connect, for example, the high-resolution image I1-1, the high-resolution image I1-2, and the low-resolution image I1-3 to each other to be synthesized into a partial equidistant cylindrical image.

Note that, although not illustrated, the low-resolution stitch processing unit 132-2 also performs stitch processing using a corresponding stitch map for each of the low-resolution image I1-3 and the low-resolution image I1-4 input thereto. Then, by the stitch processing, the low-resolution stitch image I3-2 is generated as an equidistant cylindrical image synthesized by connecting the low-resolution image I1-3 and the low-resolution image I1-4 to each other.

Returning to the explanation of FIG. 5, the distribution unit 133 supplies the image signal of the low-resolution stitch image I3-2 from the low-resolution stitch processing unit 132-2 to the trimming and resizing unit 134 and the division unit 136.

The trimming and resizing unit 134 performs trimming and resizing processing on the image signal of the low-resolution stitch image I3-2, and supplies an image signal of a trimmed and resized image I4 obtained as a result of the processing to the alpha-blending unit 135.

The alpha-blending unit 135 performs alpha-blending processing for alpha-blending the high-resolution stitch image I3-1 onto the trimmed and resized image I4. In this example, since there is no missing region in the high-resolution stitch image I3-1, the image signal of the high-resolution stitch image I3-1 is supplied to the division unit 136.

The respective image signals of the high-resolution stitch image I3-1 from the alpha-blending unit 135 and the low-resolution stitch image I3-2 from the distribution unit 133 are supplied to the division unit 136. The division unit 136 performs dividing processing using the image signals of the high-resolution stitch image I3-1 and the low-resolution stitch image I3-2, and outputs image signals of synthetic images I2-1 to I2-5 as synthetic images I2 obtained as a result thereof.

Figure 8:
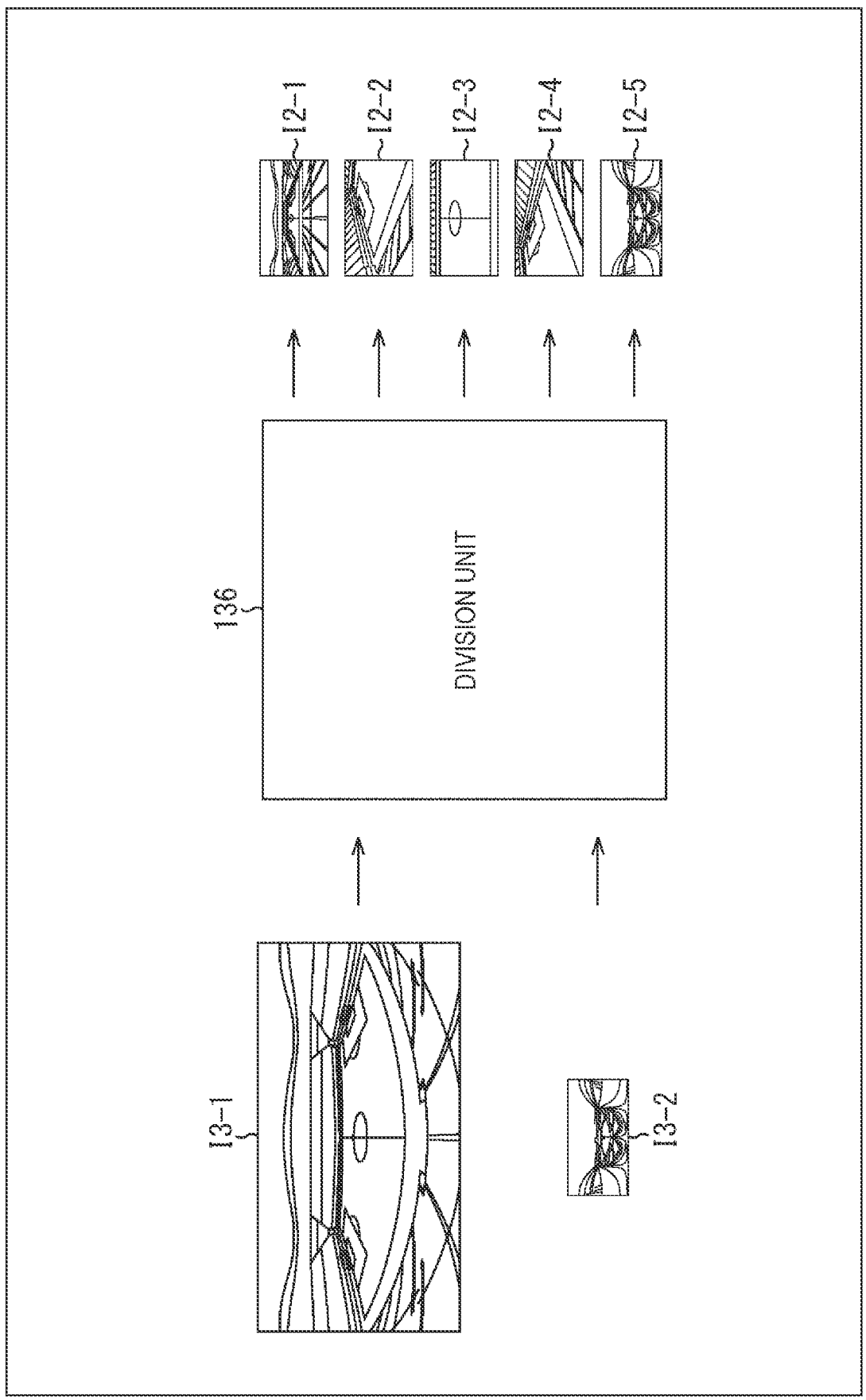
FIG. 8 is a diagram for explaining dividing processing in detail.
Figure 9:
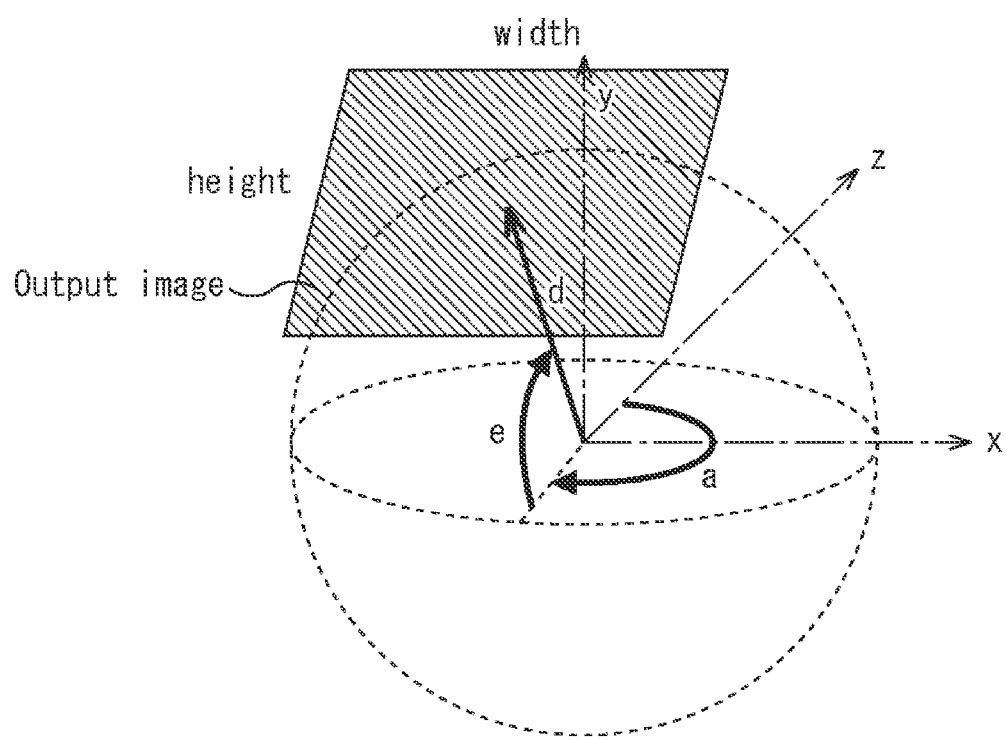
FIG. 9 is a diagram illustrating an example of perspective projection conversion.

Here, FIG. 8 illustrates the dividing processing executed by the division unit 136 in detail. In the dividing processing, perspective projection conversion is performed with respect to the high-resolution stitch image I3-1 and the low-resolution stitch image I3-2 as input images according to designated angle and distance to hierarchically segment an omnidirectional video image. Note that FIG. 9 illustrates an example of perspective projection conversion, and an "output image" represented in a three-dimensional space of the drawing corresponds to, for example, any one image of the synthetic images I2-1 to I2-4.

For example, by the dividing processing, the outside of the region of the high-resolution stitch image I3-1 as the partial high-resolution equidistant cylindrical image is complemented (replaced) using the low-resolution stitch image I3-2 as the low-resolution equidistant cylindrical image, such that the high-resolution synthetic images I2-1 to I2-4 cut out in a plurality of regions and the omnidirectional low-resolution synthetic image I2-5 are generated as the synthetic images I2.

Returning to the explanation of FIG. 5, the synthetic images I2-1 to I2-5 generated by the division unit 136 are encoded by the image processing unit 113 (FIG. 2) in the workstation 10, and the encoded data is uploaded to the video distribution server 12 by the transmission control unit 114 (FIG. 2) via the Internet 30.

The configuration for the main components on the distribution side in the video distribution system 1 has been described above.

Figure 10:
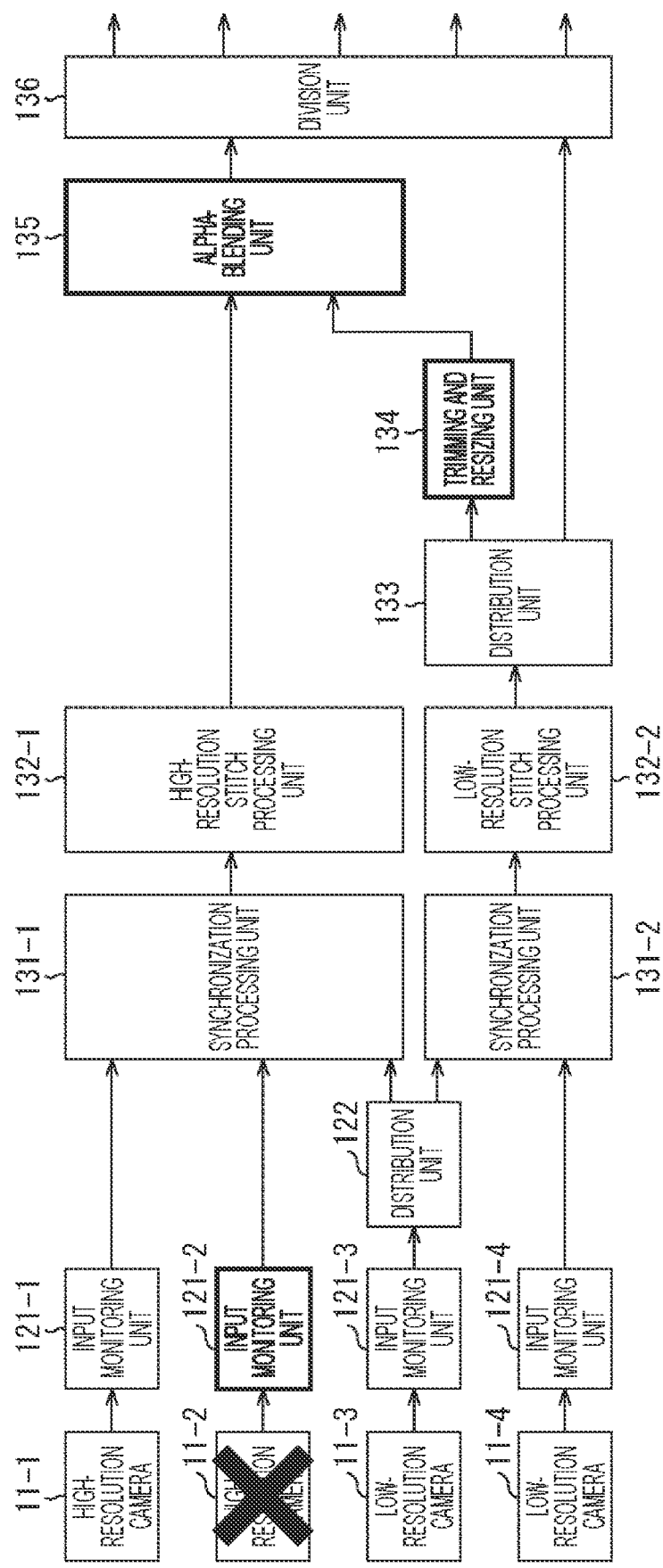
FIG. 10 is a diagram illustrating an example of a configuration for main components when an input of a high-resolution image is missing.
Figure 11:
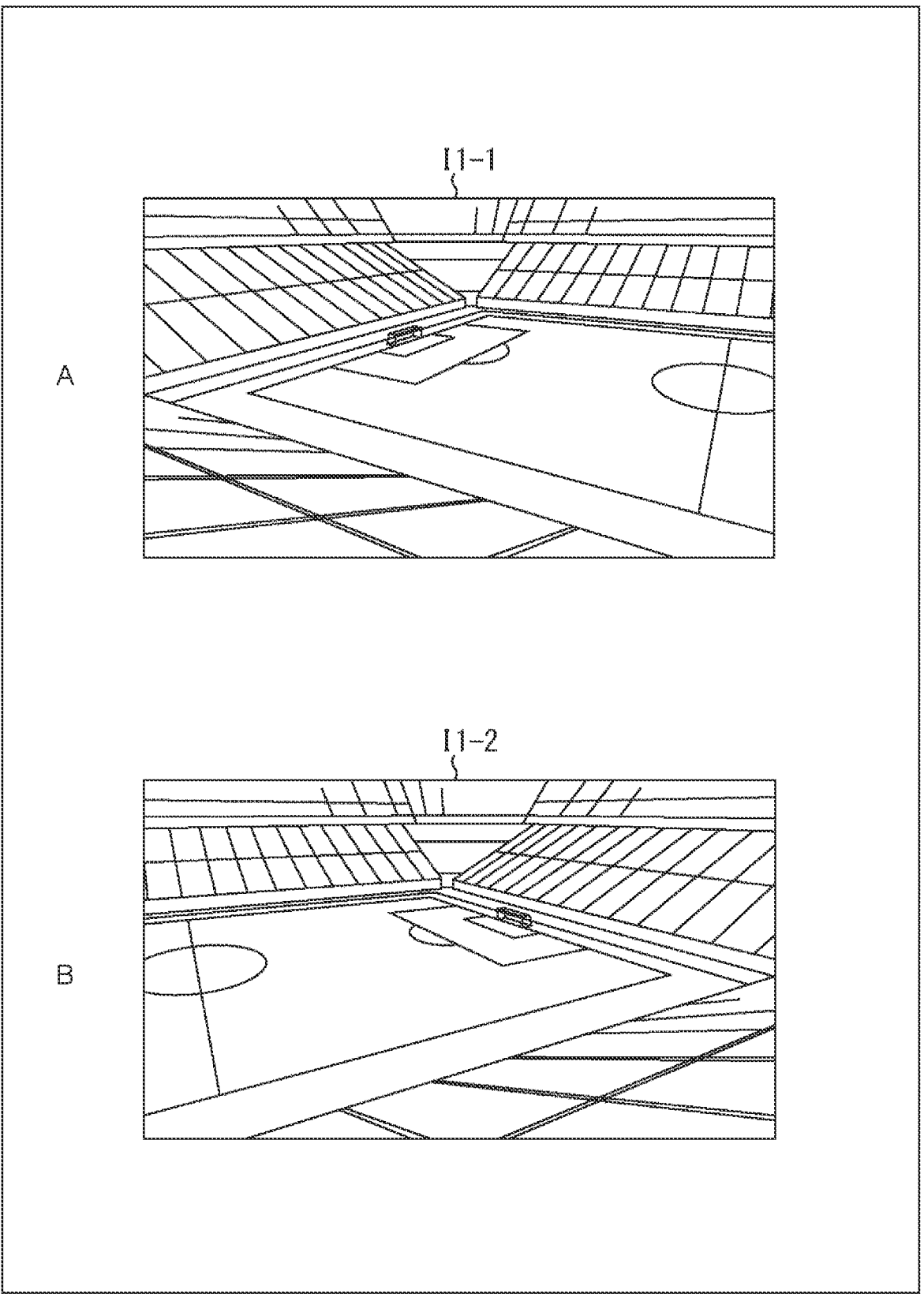
FIG. 11 is a diagram illustrating an example of a high-resolution image.
Figure 12:
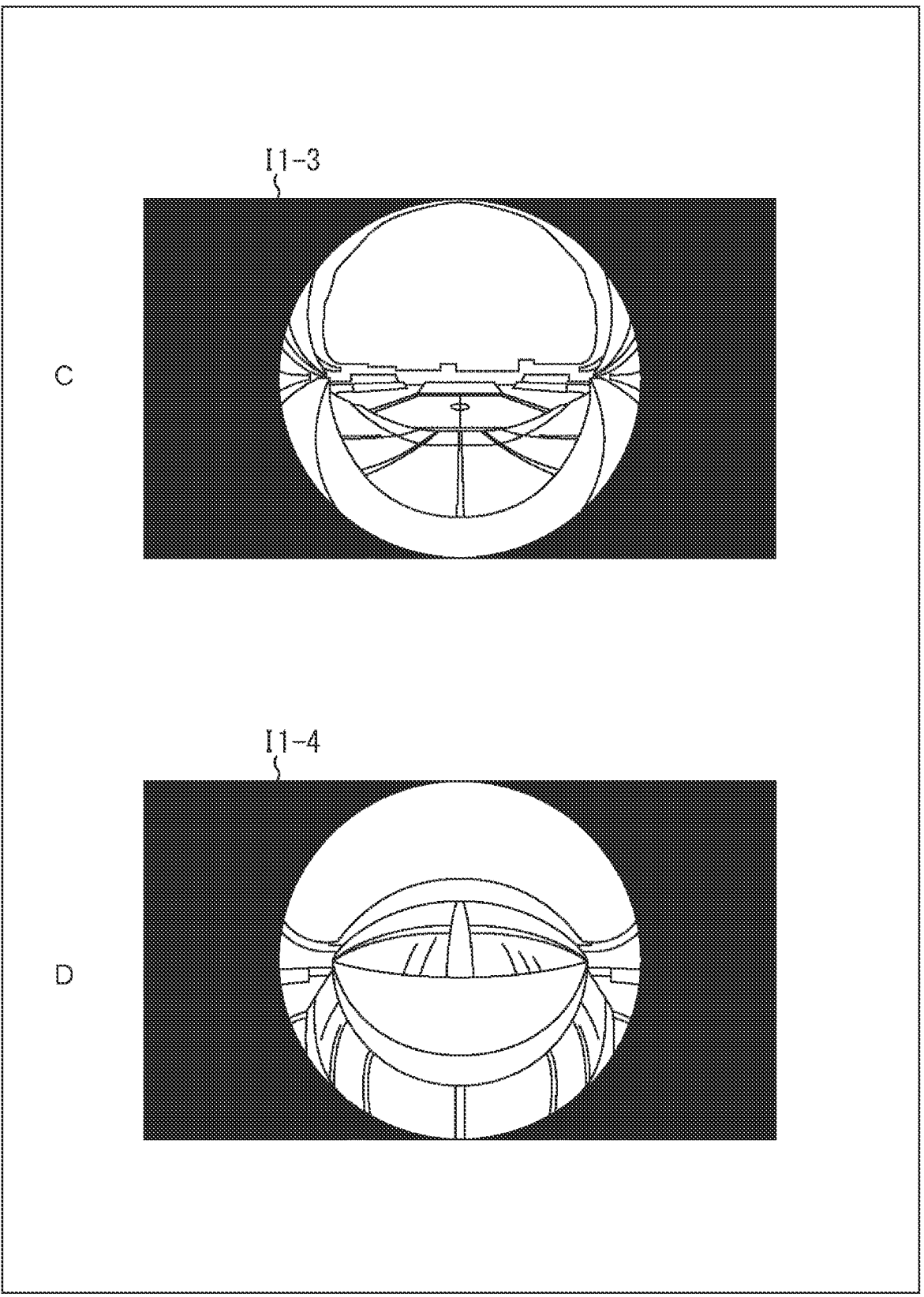
FIG. 12 is a diagram illustrating an example of a low-resolution image.

(Missing Input of High-Resolution Image) FIG. 10 illustrates a configuration for the main components on the distribution side in the video distribution system 1 in a case where an input of the high-resolution image I1-2 captured by the high-resolution camera 11-2 is missing. Furthermore, FIGS. 11 and 12 illustrate examples of input images acquired (captured) by the image acquisition unit 111.

That is, in the example of FIG. 10, among the high-resolution image I1-1 (A of FIG. 11) captured by the high-resolution camera 11-1, the high-resolution image I1-2 (B of FIG. 11) captured by the high-resolution camera 11-2, the low-resolution image I1-3 (C of FIG. 12) captured by the low-resolution camera 11-3, and the low-resolution image I1-4 (D of FIG. 12) captured by the low-resolution camera 11-4, an input of the high-resolution image I1-2 is missing.

At this time, the abnormality determination unit 112 (FIG. 2) determines that the image signal of the high-resolution image I1-2 is abnormal on the basis of the monitoring result from the input monitoring unit 121-2, and notifies the image processing unit 113 of the determination result. Then, the image processing unit 113 (FIG. 2) performs image processing corresponding to the missing input of the high-resolution image.

Specifically, in addition to the image signals of the high-resolution image I1-1 and the low-resolution image I1-3, an image signal of a transparent image I5 (an image having an alpha value of 0), instead of the missing high-resolution image I1-2, is input to the synchronization processing unit 131-1. Therefore, the high-resolution stitch processing unit 132-1 generates a high-resolution stitch image I3-1T partially including a transparent region by stitch processing.

Here, note that the processing for replacing the high-resolution image I1-2 with the transparent image I5 may be performed by the image processing unit 113 (FIG. 2), or may be performed by the input monitoring unit 121-2 or the like in the preceding stage.

Meanwhile, the image signals of the low-resolution image I1-3 and the low-resolution image I1-4 are input to the synchronization processing unit 131-2. Therefore, the low-resolution stitch processing unit 132-2 generates a complete (non-missing) low-resolution stitch image I3-2 by stitch processing.

Figure 13:
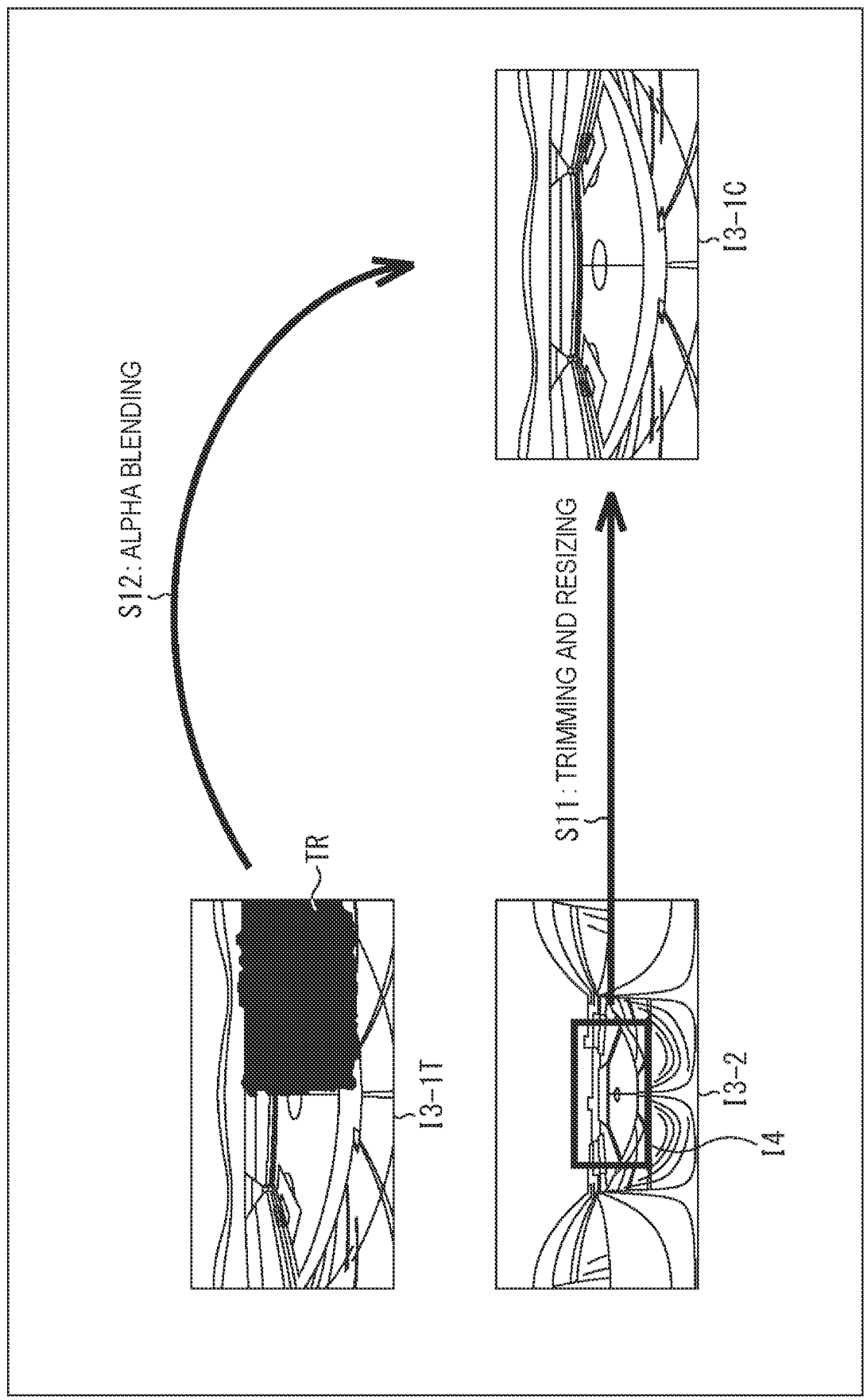
FIG. 13 illustrates an example of trimming and resizing processing and alpha-blending processing when the input of the high-resolution image is missing.

Then, as illustrated in FIG. 13, the image processing unit 113 (FIG. 2) executes each of trimming processing and resizing processing using the low-resolution stitch image I3-2 and alpha-blending processing using the high-resolution stitch image I3-1T including a transparent region TR.

That is, the trimming and resizing unit 134 performs trimming and resizing processing on the low-resolution stitch image I3-2 to cut out a region corresponding to the high-resolution stitch image I3-1T and adjust a size of the region (S11 in FIG. 13). Therefore, the trimmed and resized image I4 is obtained.

Subsequently, the alpha-blending unit 135 performs alpha-blending processing to alpha-blend the high-resolution stitch image I3-1T onto the trimmed and resized image I4 (S12 in FIG. 13). Therefore, the transparent region TR of the high-resolution stitch image I3-1T is complemented with the trimmed and resized image 14, thereby obtaining a high-resolution stitch image I3-1C.

Returning to the explanation of FIG. 10, each of the image signals of the high-resolution stitch image I3-1C from the alpha-blending unit 135 and the low-resolution stitch image I3-2 from the distribution unit 133 is input to the division unit 136.

Figure 14:
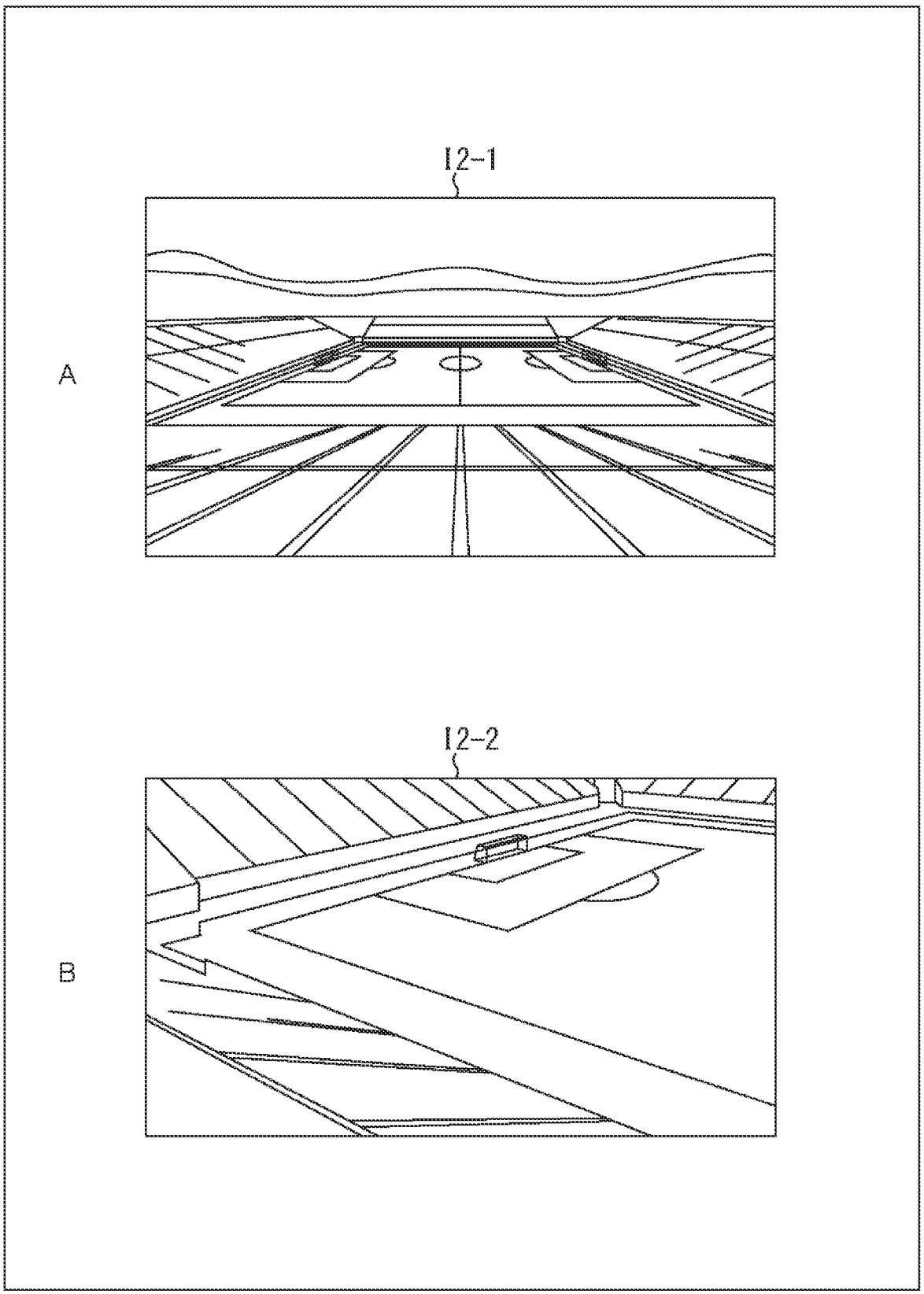
FIG. 14 is a diagram illustrating a first example of a synthetic image.
Figure 15:
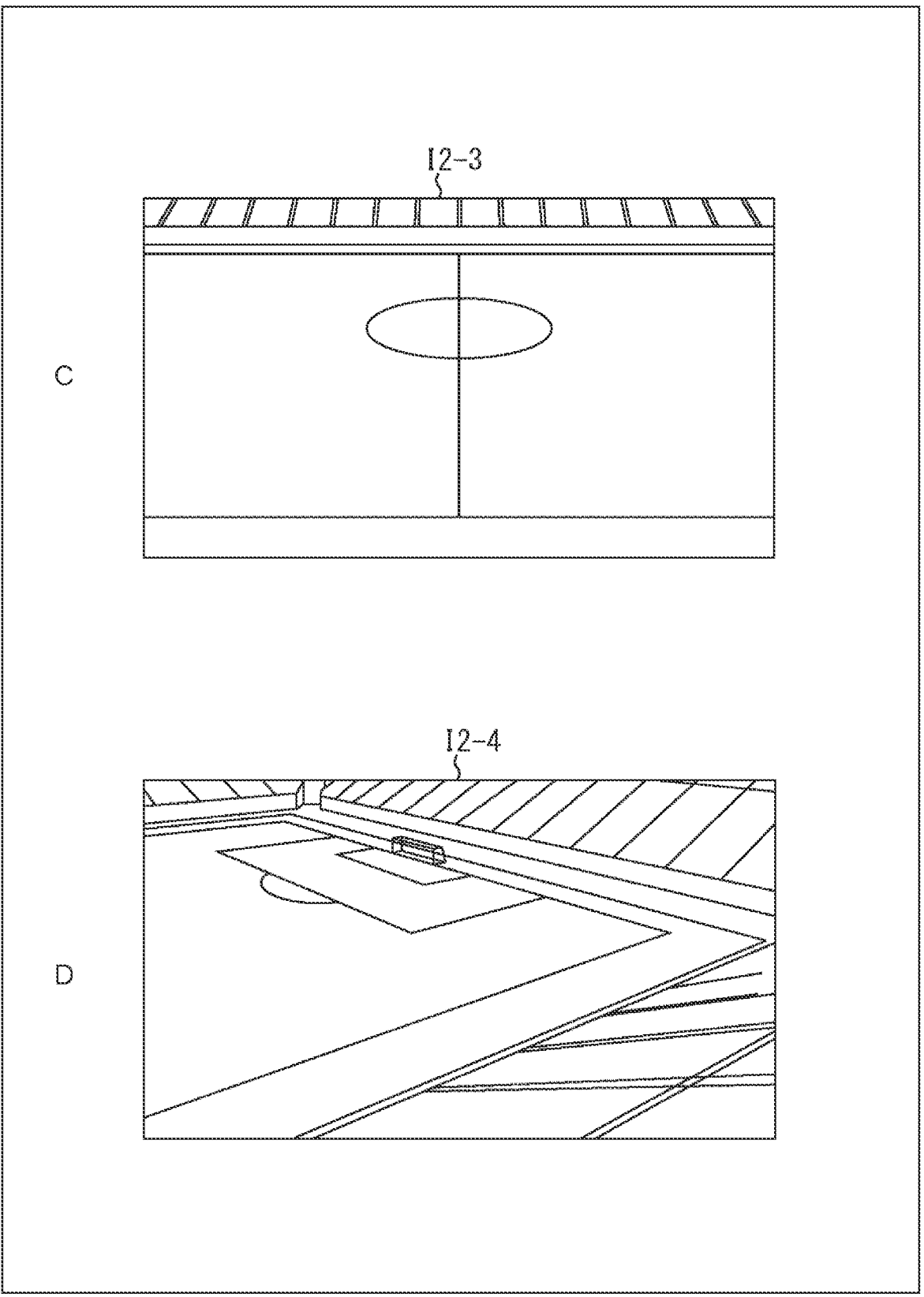
FIG. 15 is a diagram illustrating a first example of a synthetic image.
Figure 16:
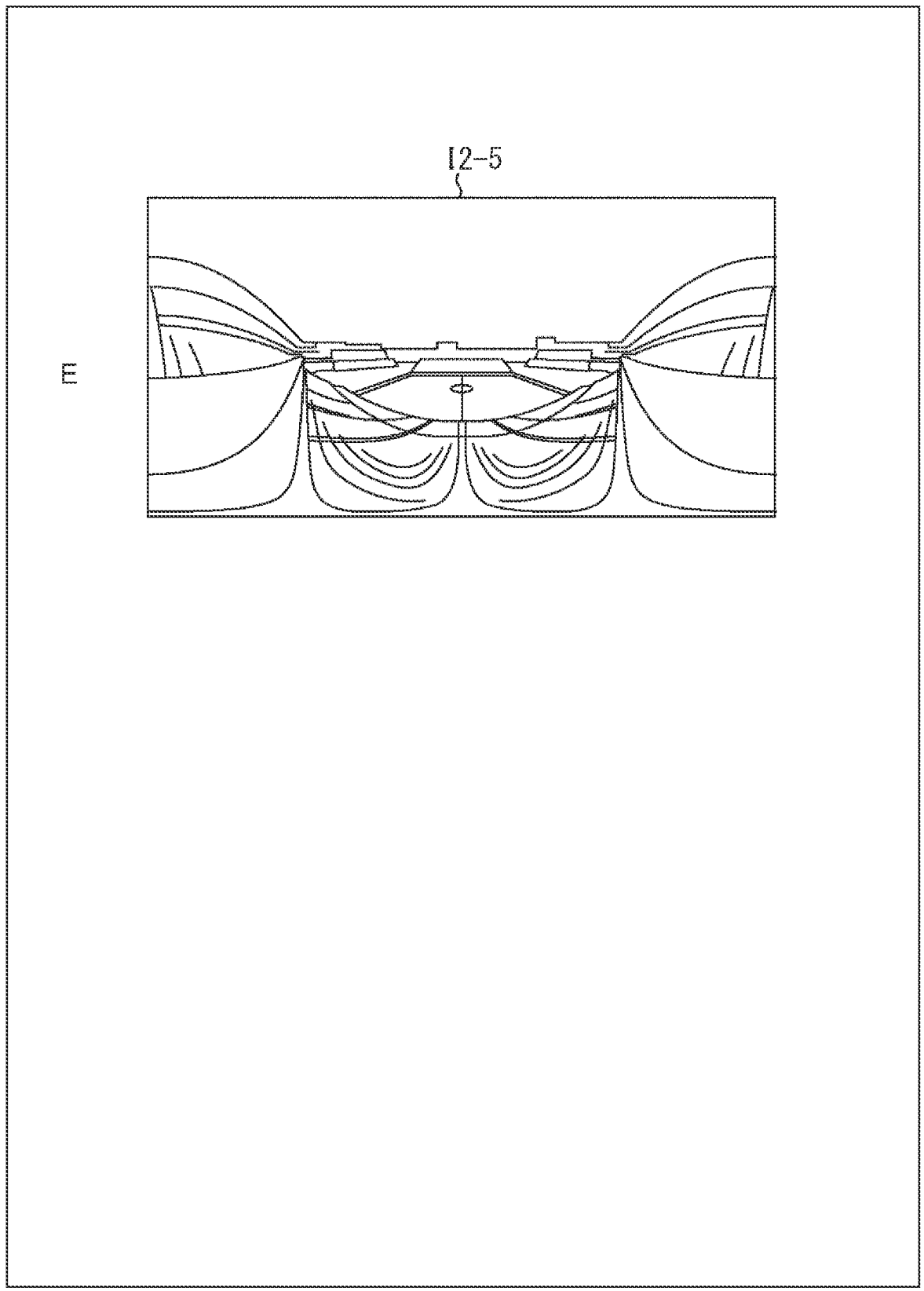
FIG. 16 is a diagram illustrating a first example of a synthetic image.

The division unit 136 performs dividing processing using the high-resolution stitch image I3-1C and the low-resolution stitch image I3-2 to generate synthetic images I2-1 to I2-5 illustrated in FIGS. 14 to 16, for example, by complementing the outside of the region of the high-resolution stitch image I3-1C (partial high-resolution equidistant cylindrical image) using the low-resolution stitch image I3-2 (low-resolution equidistant cylindrical image).

Then, the synthetic images I2-1 to I2-5 are encoded by the image processing unit 113 (FIG. 2) in the workstation 10. Furthermore, the encoded data is uploaded to the video distribution server 12 by the transmission control unit 114 (FIG. 2) via the Internet 30.

In this way, in a case where an input of a high-resolution image is missing, a missing region of the high-resolution image I1 is complemented with a low-resolution image I1 by replacing the missing high-resolution image I1 with the transparent image I5 and alpha-blending the high-resolution stitch image I3-1 obtained by stitching using the high-resolution images I1 (and the low-resolution image I1) onto the low-resolution stitch image I3-2 obtained by stitching using the low-resolution images I1. In other words, it can be said that the low-resolution image I1 used for the complementation is a substitute image.

(Missing Input of Low-Resolution Image)

Figure 17:
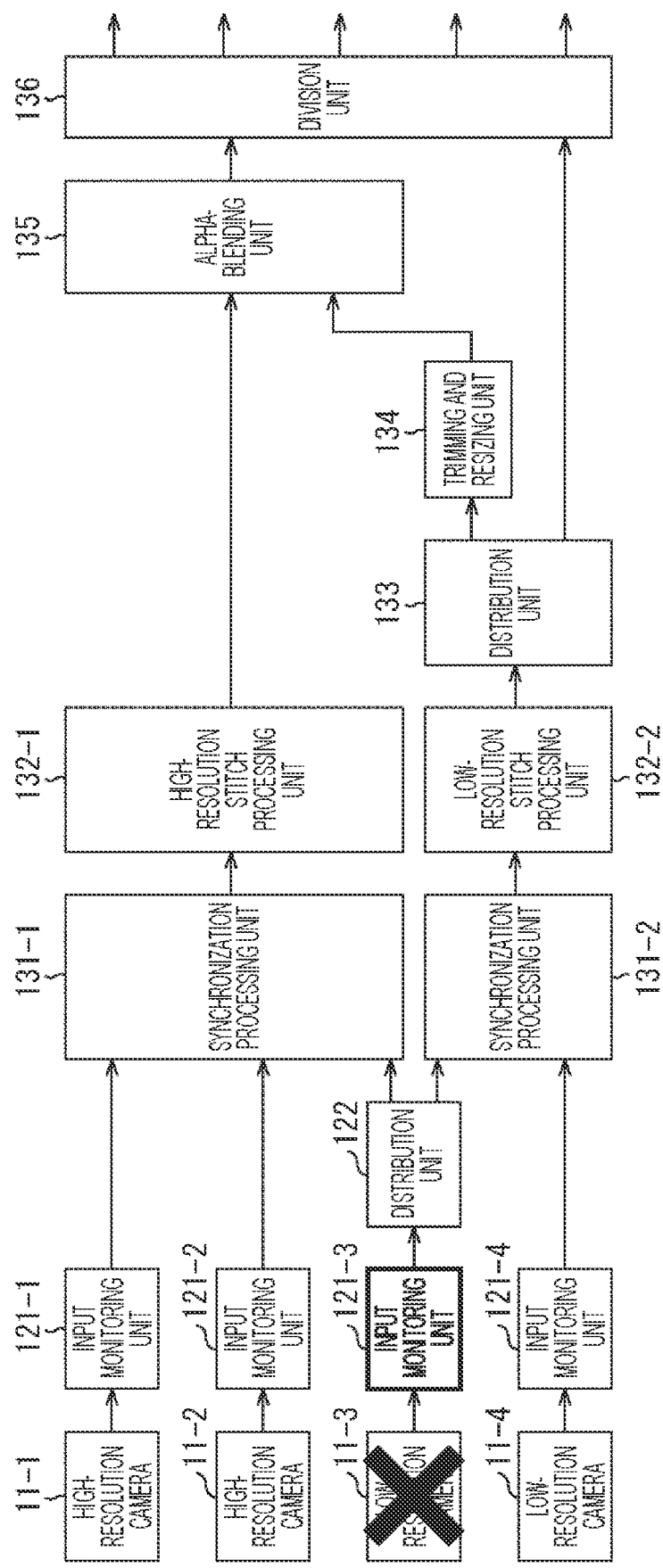
FIG. 17 is a diagram illustrating an example of a configuration for main components when an input of a low-resolution image is missing.

Next, FIG. 17 illustrates a configuration for the main components on the distribution side in the video distribution system 1 in a case where an input of the low-resolution image I1-3 captured by the low-resolution camera 11-3 is missing.

That is, in the example of FIG. 17, among the high-resolution image I1-1 (A of FIG. 11), the high-resolution image I1-2 (B of FIG. 11), the low-resolution image I1-3 (C of FIG. 12), and the low-resolution image I1-4 (D of FIG. 12) illustrated in FIGS. 11 and 12 as described above, an input of the low-resolution image I1-3 is missing.

In this case, in addition to the image signals of the high-resolution image I1-1 and the high-resolution image I1-2, an image signal of a transparent image I5, instead of the low-resolution image I1-3, is input to the synchronization processing unit 131-1. Therefore, the high-resolution stitch processing unit 132-1 generates a high-resolution stitch image I3-1T partially including a transparent region by stitch processing.

Meanwhile, in addition to the image signal of the low-resolution image I1-4, the image signal of the transparent image I5, instead of the low-resolution image I1-3, is input to the synchronization processing unit 131-2. Therefore, the low-resolution stitch processing unit 132-2 generates a low-resolution stitch image I3-2T partially including a transparent region by stitch processing.

Then, the image processing unit 113 (FIG. 2) executes each of trimming processing and resizing processing using the low-resolution stitch image I3-2T and alpha-blending processing using the high-resolution stitch image I3-1T. Subsequently, the division unit 136 generates synthetic images I2-1 to I2-5 illustrated in FIGS. 18 to 20 by complementing the outside of a region of a high-resolution stitch image I3-1C (partial high-resolution equidistant cylindrical image) using the low-resolution stitch image I3-2T (low-resolution equidistant cylindrical image).

At this time, among the synthetic images I2-1 to I2-5, each of the synthetic image I2-1 (A of FIG. 18), the synthetic image I2-2 (B of FIG. 18), the synthetic image I2-4 (D of FIG. 19), and the synthetic image I2-5 (E of FIG. 20) is an image with a partial region (a black region in the drawing) being missing according to the missing input of the low-resolution image I1-3.

Figure 21:
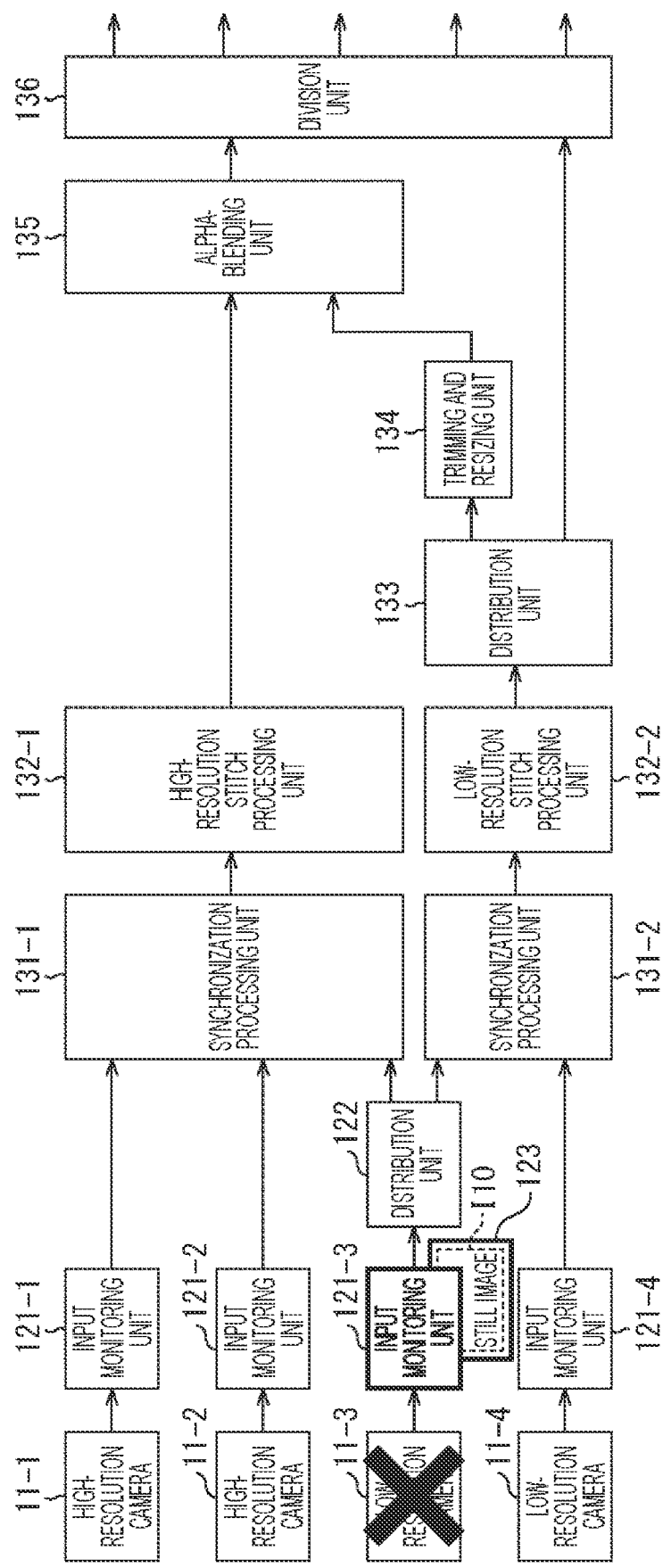
FIG. 21 is a diagram illustrating an example of a configuration for main components in a case where complementation is performed with a still image when the input of the high-resolution image is missing.

Here, in a case where an input of a low-resolution image is missing in the video distribution system 1, complementation is performed using a still image I10 prepared in advance. FIG. 21 illustrates a configuration for the main components on the distribution side for such a video distribution system 1.

That is, in the example of FIG. 21, similarly to the example of FIG. 17 described above, among the high-resolution image I1-1 (A of FIG. 11), the high-resolution image I1-2 (B of FIG. 11), the low-resolution image I1-3 (C of FIG. 12), and the low-resolution image I1-4 (D of FIG. 12), an input of the low-resolution image I1-3 is missing.

At this time, the abnormality determination unit 112 (FIG. 2) determines that the image signal of the low-resolution image I1-3 is abnormal on the basis of the monitoring result from the input monitoring unit 121-3, and notifies the image processing unit 113 of the determination result. Then, the image processing unit 113 (FIG. 2) performs image processing corresponding to the missing input of the low-resolution image.

Here, a memory 123 stores, as the still image I10, a low-resolution image I1-3 captured by the low-resolution camera 11-3 before the input thereof is missing.

Note that the still image I10 stored in the memory 123 can be, for example, a still image (for example, a background image) captured in advance (previously) or an image (for example, an image frame for a background image or the like) that is captured immediately before the missing, such as an image captured one frame ahead or an image captured several frames ahead, and temporarily stored. Furthermore, the memory 123 corresponds to, for example, the storage unit 103 (FIG. 2).

In addition to the image signals of the high-resolution image I1-1 and the high-resolution image I1-2, an image signal of the still image I10 stored in the memory 123, instead of the low-resolution image I1-3, is input to the synchronization processing unit 131-1. Therefore, the high-resolution stitch processing unit 132-1 generates a high-resolution stitch image I3-1C complemented using the still image I10 by stitch processing.

Meanwhile, in addition to the image signal of the low-resolution image I1-4, the image signal of the still image I10 stored in the memory 123 is input to the synchronization processing unit 131-2. Therefore, the low-resolution stitch processing unit 132-2 generates a low-resolution stitch image I3-2C complemented using the still image I10 by stitch processing.

Then, the image processing unit 113 (FIG. 2) executes each of trimming processing and resizing processing using the low-resolution stitch image I3-2C and alpha-blending processing using the high-resolution stitch image I3-1C. Subsequently, the division unit 136 generates synthetic images I2-1 to I2-5 illustrated in FIGS. 22 to 24 by complementing the outside of a region of the high-resolution stitch image I3-1C (partial high-resolution equidistant cylindrical image) using the low-resolution stitch image I3-2C (low-resolution equidistant cylindrical image).

Figure 18:
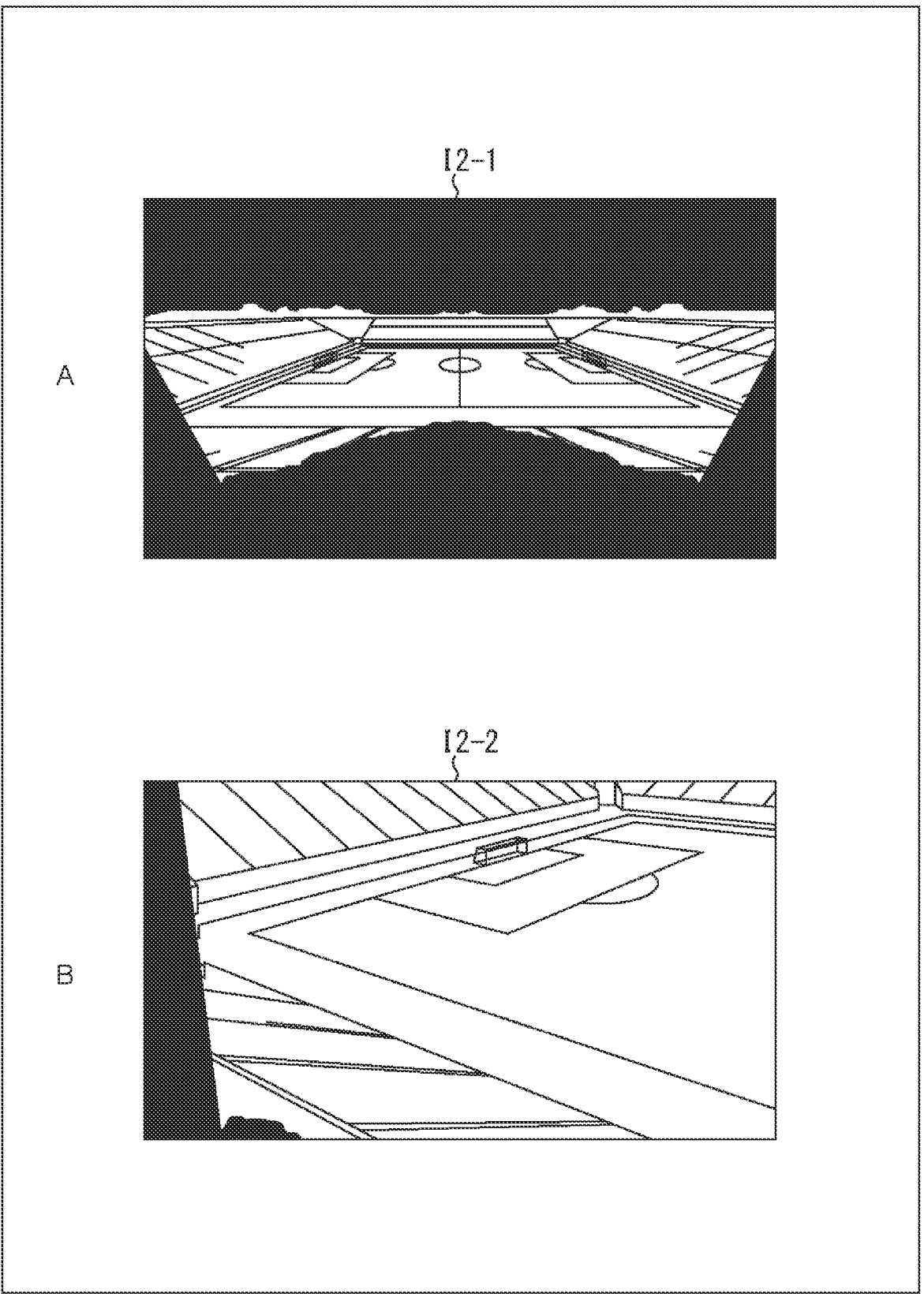
FIG. 18 is a diagram illustrating a second example of a synthetic image.
Figure 19:
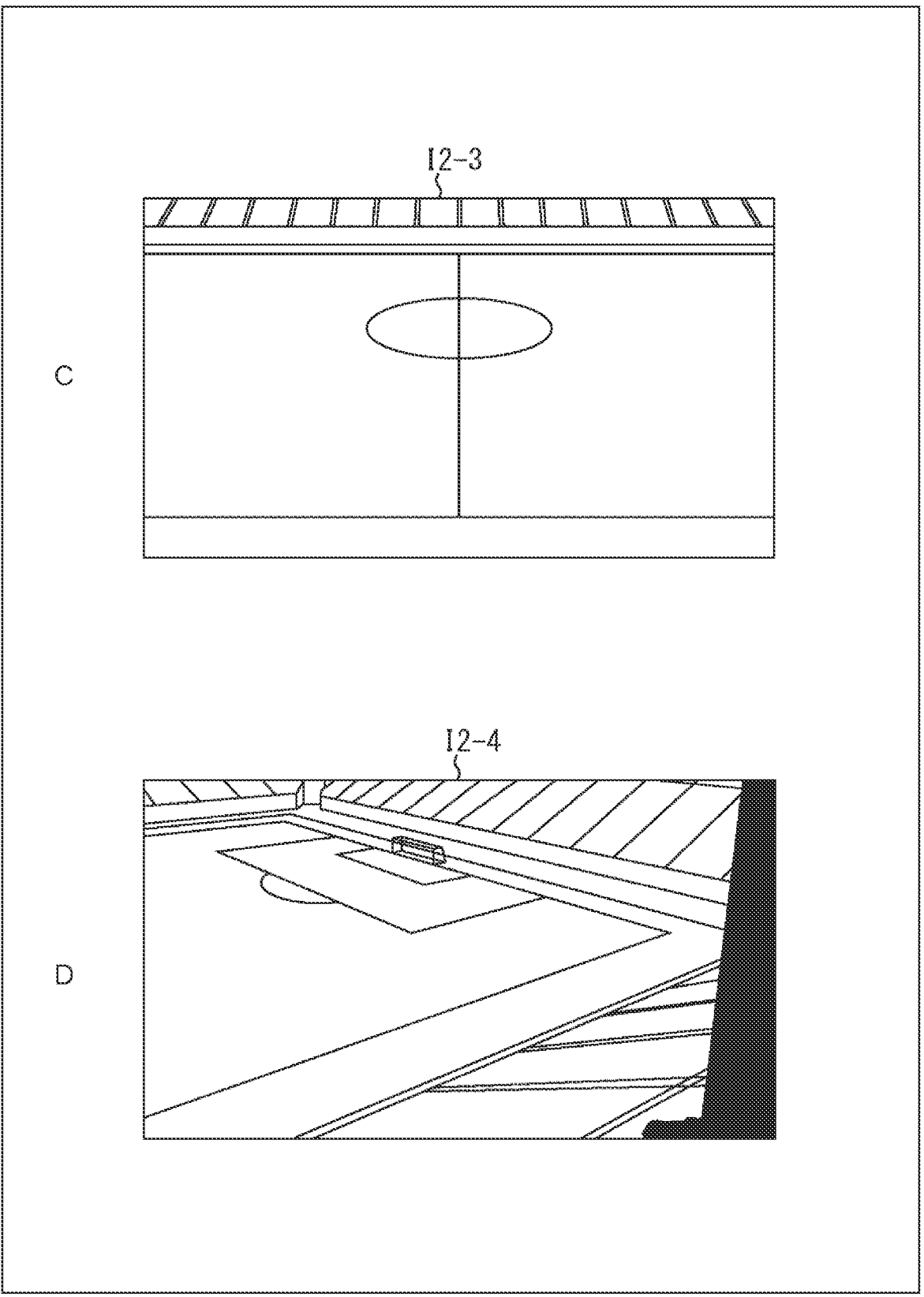
FIG. 19 is a diagram illustrating a second example of a synthetic image.
Figure 20:
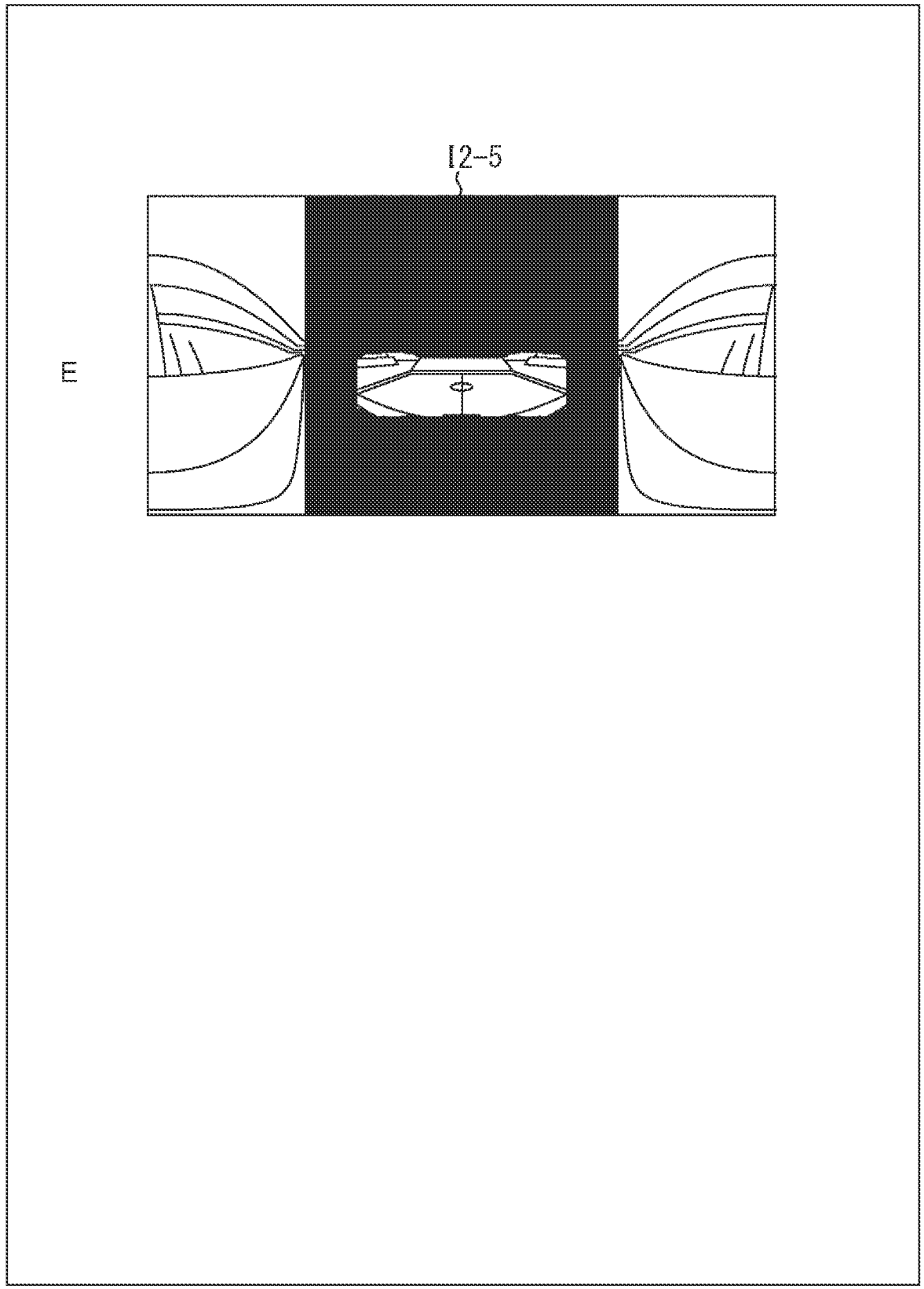
FIG. 20 is a diagram illustrating a second example of a synthetic image.
Figure 22:
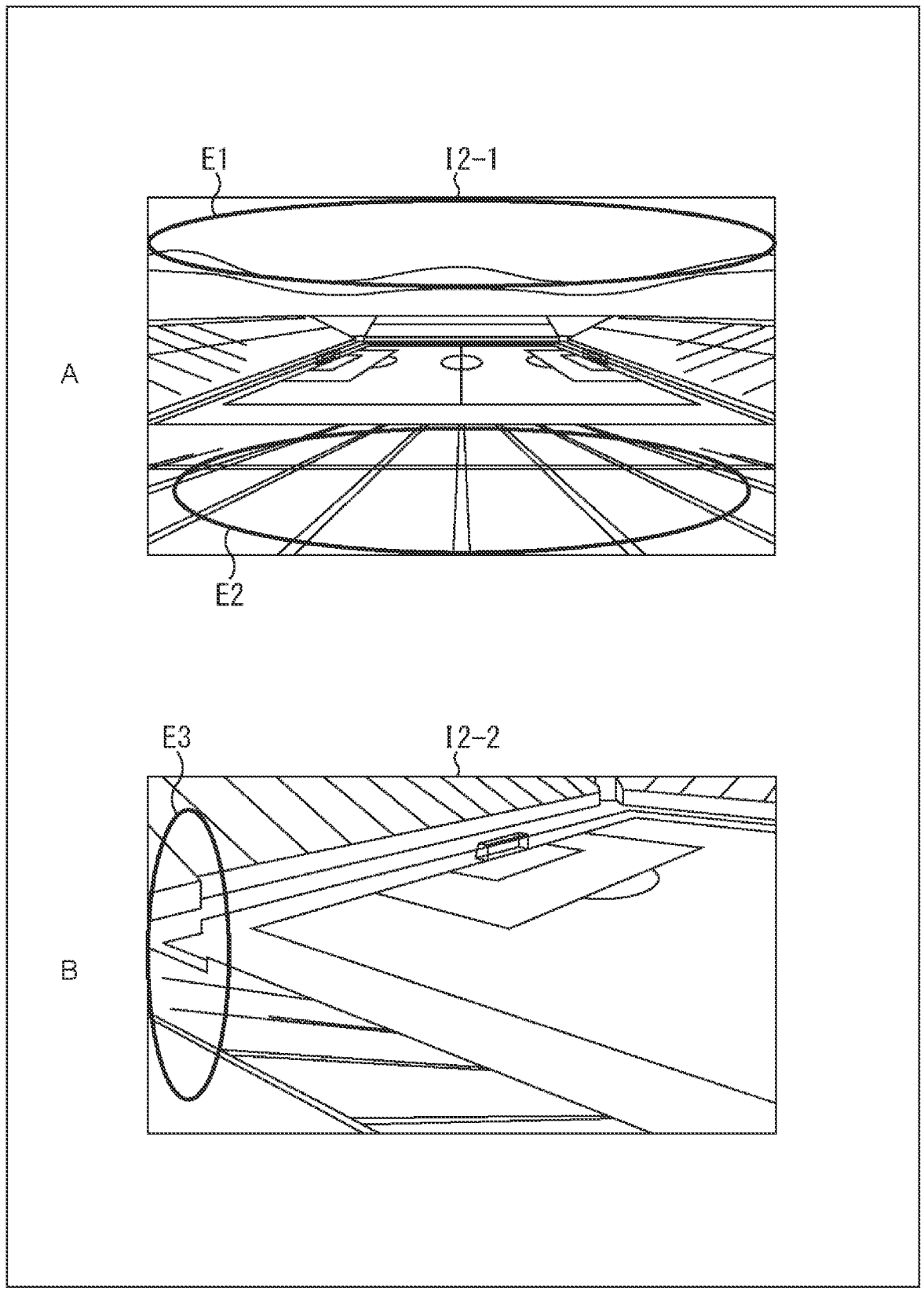
FIG. 22 is a diagram illustrating a third example of a synthetic image.
Figure 23:
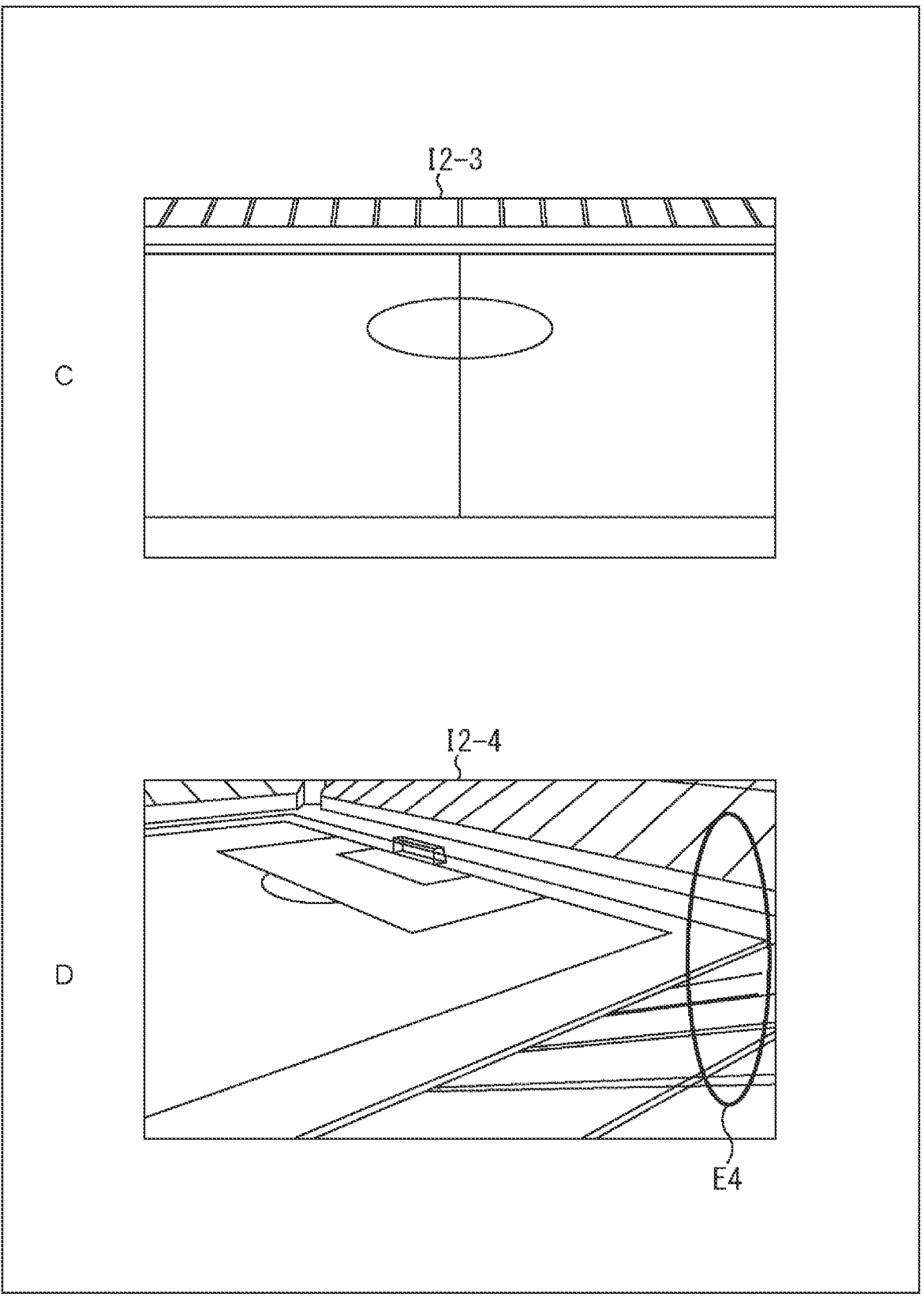
FIG. 23 is a diagram illustrating a third example of a synthetic image.
Figure 24:
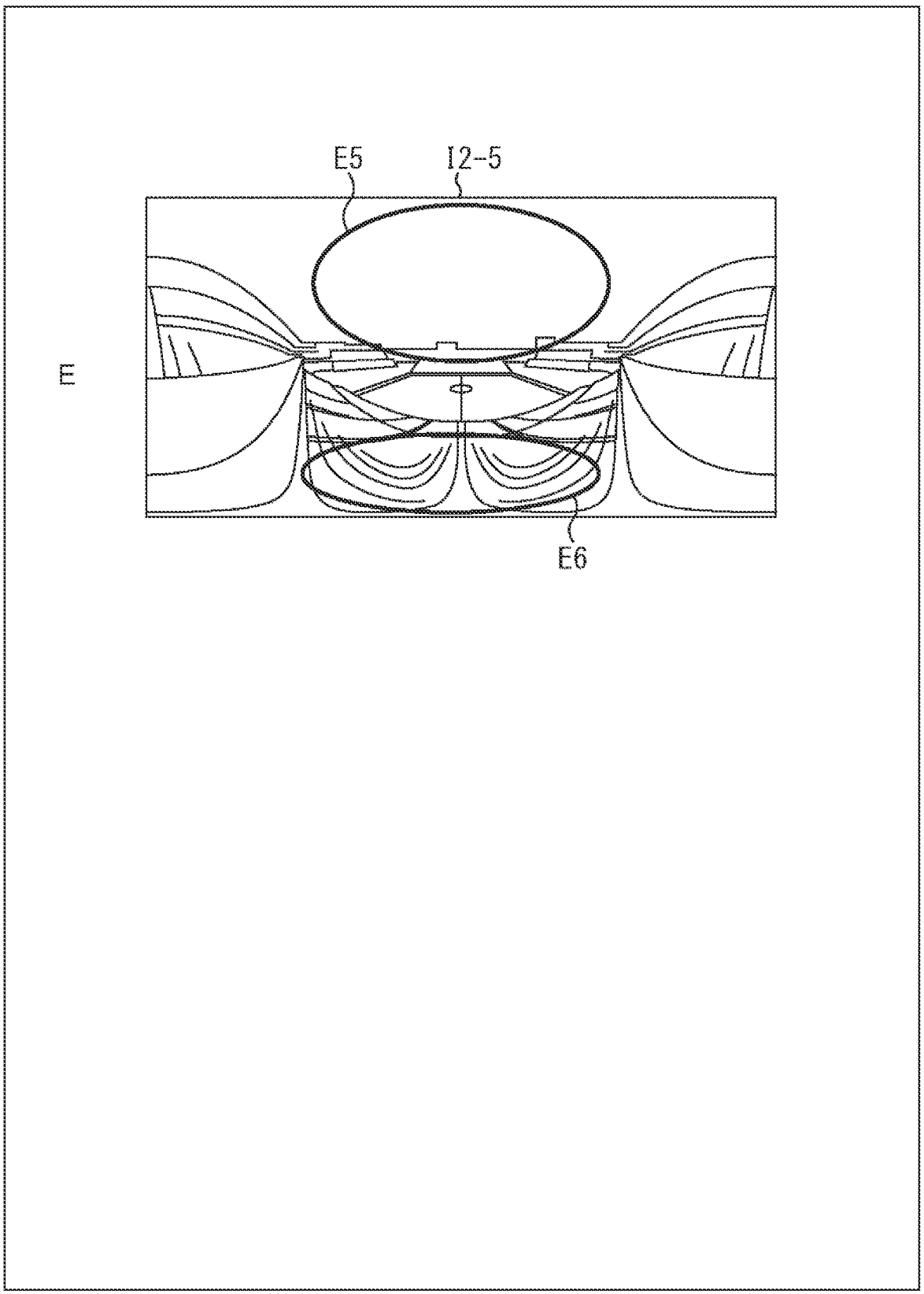
FIG. 24 is a diagram illustrating a third example of a synthetic image.

At this time, when the synthetic images I2-1 to I2-5 illustrated in FIGS. 22 to 24 are compared with the above-described synthetic images I2-1 to I2-5 illustrated in FIGS. 18 to 20, the synthetic image I2-1 in A of FIG. 22 is complemented with the still image I10, in which missing regions (black regions in the drawing) of the synthetic image I2-1 in A of FIG. 18 are retained (in particular, regions surrounded by bold-line ellipses E1 and E2 in the drawing).

Similarly, the synthetic image I2-2 (B of FIG. 22 and B of FIG. 18), the synthetic image I2-4 (D of FIG. 23 and D of FIG. 19), and the synthetic image I2-5 (E of FIGS. 24 and E of FIG. 20) are also complemented with the still image I10, in which missing regions (black regions in the drawings) are retained (in particular, regions surrounded by bold-line ellipses E3 to E6 in the drawings).

In this way, in a case where an input of a low-resolution image is missing, a missing region of the low-resolution image I1 is complemented with a still image I10 by replacing the missing low-resolution image I1 with the still image I10 stored in the memory 123 and alpha-blending the high-resolution stitch image I3-1 obtained by stitching using the high-resolution images I1 (and the still image I10) onto the low-resolution stitch image I3-2 obtained by stitching using the low-resolution image I1 and the still image I10. In other words, it can be said that the still image I10 used for the complementation is a substitute image.

(Flow of Image Processing)

Next, a flow of image processing executed by (the control unit 100 or the like of) the workstation 10 will be described with reference to flowcharts of FIGS. 25 to 28.

Figure 25:
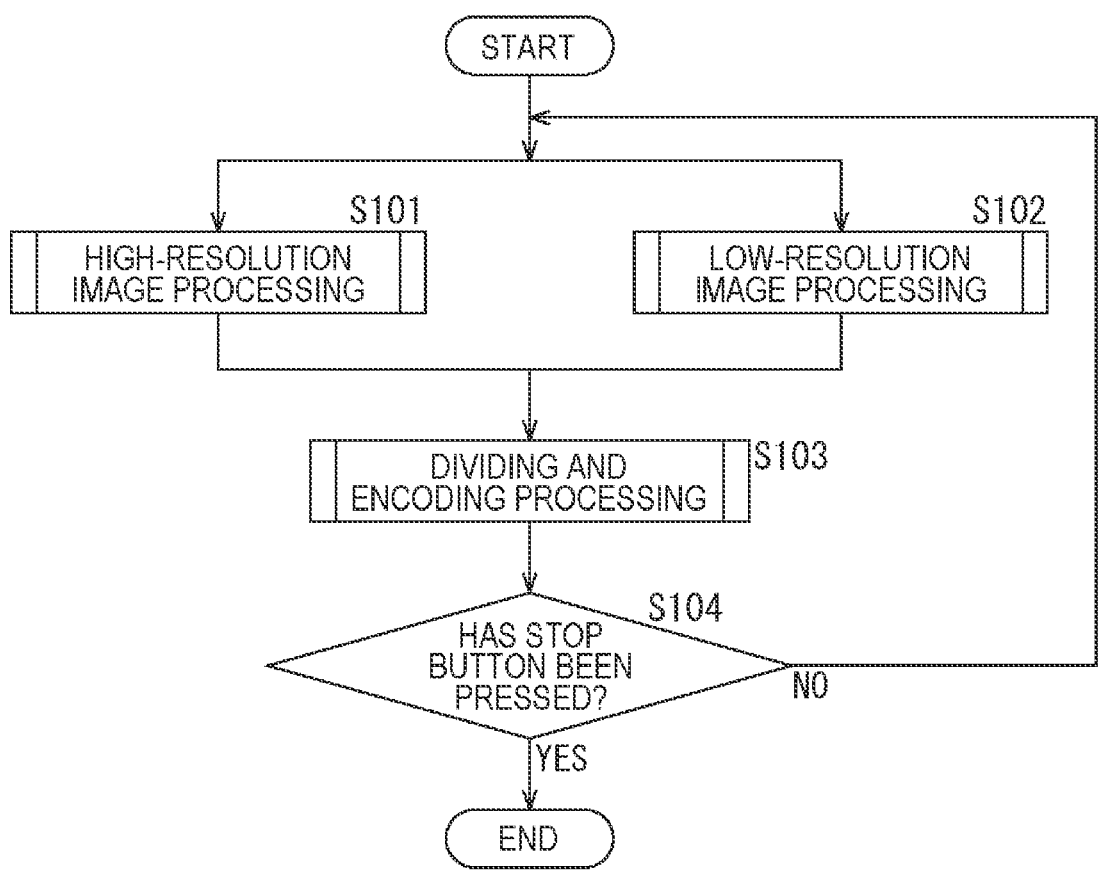
FIG. 25 is a flowchart for explaining a flow of image processing on a distribution side.

In the workstation 10, high-resolution image processing for the high-resolution images I1-1 and I1-2 (S101 in FIG. 25) is executed in parallel to low-resolution image processing for the low-resolution images I1-3 and I1-4 (S102 in FIG. 25).

Figure 26:
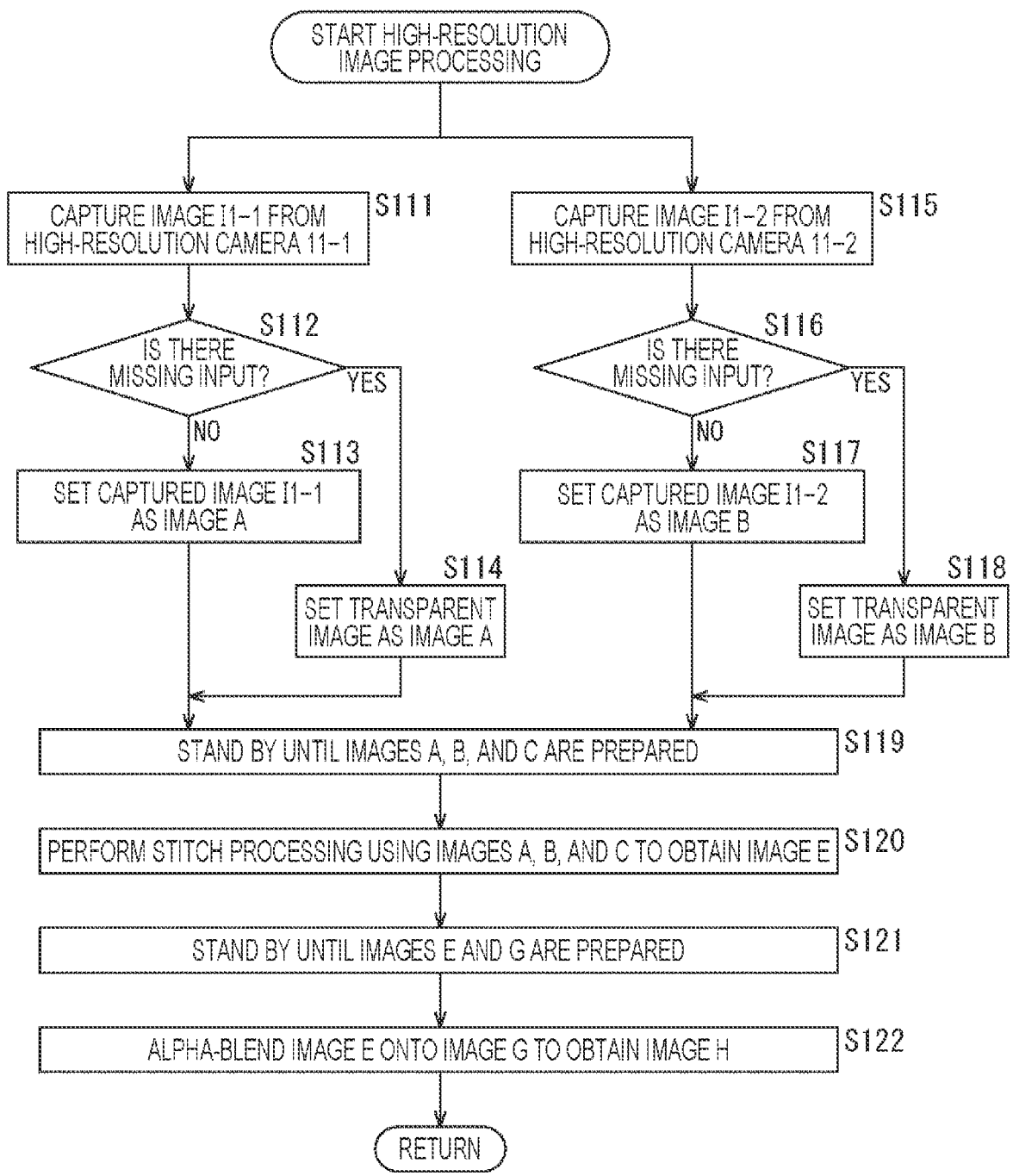
FIG. 26 is a flowchart for explaining a flow of high-resolution image processing.

Here, the high-resolution image processing corresponding to processing of step S101 in FIG. 25 will be described in detail with reference to the flowchart of FIG. 26.

In step S111, the image acquisition unit 111 captures the high-resolution image I1-1 captured by the high-resolution camera 11-1.

In step S112, the abnormality determination unit 112 determines whether or not there is a missing input of the captured high-resolution image I1-1.

In a case where it is determined in step S112 that there is no missing input, the processing proceeds to step S113, and the captured high-resolution image I1-1 is set as image A. On the other hand, in a case where it is determined in step S112 that there is a missing input, the processing proceeds to step S114, and the transparent image I5 is set as image A.

Note that, when the processing of step S113 or step S114 ends, then the processing proceeds to step S119.

Furthermore, in step 3115, the image acquisition unit 111 captures the high-resolution image I1-2 captured by the high-resolution camera 11-2.

In step S116, the abnormality determination unit 112 determines whether or not there is a missing input of the captured high-resolution image I1-2.

In a case where it is determined in step S116 that there is no missing input, the processing proceeds to step S117, and the captured high-resolution image I1-2 is set as image B. On the other hand, in a case where it is determined in step S116 that there is a missing input, the processing proceeds to step S118, and the transparent image I5 is set as image B.

Note that, when the processing of step S117 or step S118 ends, then the processing proceeds to step S119. Furthermore, the processing of steps S111 to S114 is executed in parallel to the processing of steps S115 to S118.

In step S119, (the synchronization processing unit 131-1 of) the image processing unit 113 stands by until the image A, the image B, and image C are prepared. Note that the image C is a low-resolution image I1-3 or a still image I10 (3133 or 3134 in FIG. 27), which will be described in detail later with reference to the flowchart of FIG. 27.

In a case where the image A, the image B, and the image C are prepared (S119), then the processing proceeds to step S120. In step 120, (the high-resolution stitch processing unit 132-1 of) the image processing unit 113 executes stitch processing using the image A, the image B, and the image C that have been synchronized. Here, the high-resolution stitch image I3-1 obtained by the stitch processing is set as image E.

In step S121, (the alpha-blending unit 135 of) the image processing unit 113 stands by until the image E and image G are prepared. Note that the image G is a trimmed and resized image I4 (S141 in FIG. 27), which will be described in detail later with reference to the flowchart of FIG. 27.

In a case where the image E and the image G are prepared (S121), then the processing proceeds to step S122. In step S122, (the alpha-blending unit 135 of) the image processing unit 113 alpha-blends the image E onto the image G to obtain an image H.

When the processing of step S112 ends, then the processing returns to step S101 in FIG. 25, and the processing proceeds to step S103.

Figure 27:
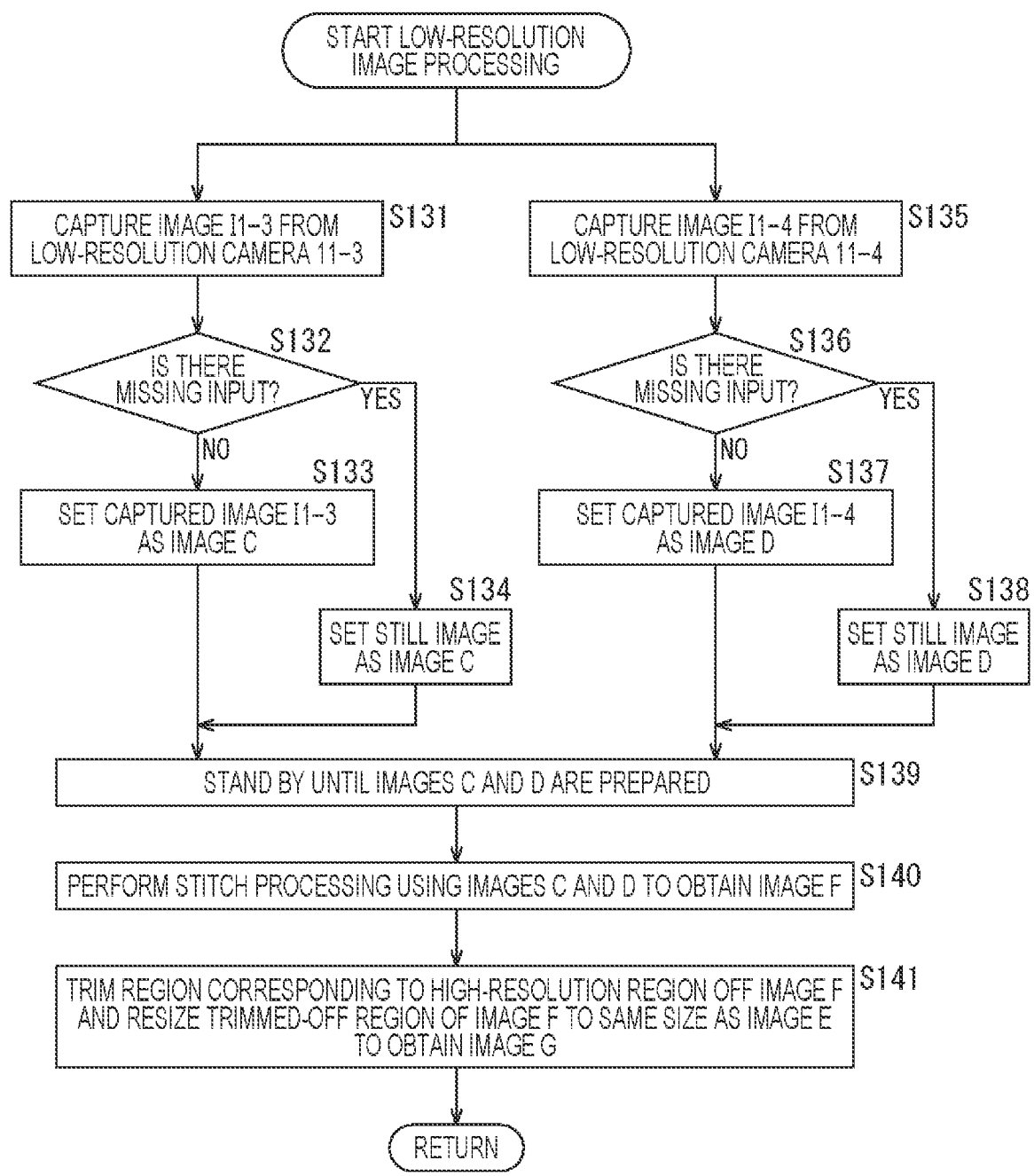
FIG. 27 is a flowchart for explaining a flow of low-resolution image processing.

Next, the low-resolution image processing corresponding to processing of step S102 in FIG. 25 will be described in detail with reference to the flowchart of FIG. 27.

In step S131, the image acquisition unit 111 captures the low-resolution image I1-3 captured by the low-resolution camera 11-3.

In step S132, the abnormality determination unit 112 determines whether or not there is a missing input of the captured low-resolution image I1-3.

In a case where it is determined in step 3132 that there is no missing input, the processing proceeds to step 3133, and the captured low-resolution image I1-3 is set as image C. On the other hand, in a case where it is determined in step S132 that there is a missing input, the processing proceeds to step 3134, and the still image I10 is set as image C.

Note that, when the processing of step S133 or step S134 ends, then the processing proceeds to step S139.

Furthermore, in step S135, the image acquisition unit 111 captures the low-resolution image I1-4 captured by the low-resolution camera 11-4.

In step S136, the abnormality determination unit 112 determines whether or not there is a missing input of the captured low-resolution image I1-4.

In a case where it is determined in step 3136 that there is no missing input, the processing proceeds to step S137, and the low-resolution image I1-4 is set as image D. On the other hand, in a case where it is determined in step S136 that there is a missing input, the processing proceeds to step 3138, and the still image I10 is set as image D.

Note that, when the processing of step 3137 or step 3138 ends, then the processing proceeds to step S139. Furthermore, the processing of steps S131 to S134 is executed in parallel to the processing of steps 3135 to S138.

In step S139, in step S119, (the synchronization processing unit 131-2 of) the image processing unit 113 stands by until the image C and the image D are prepared. In a case where the image C and the image D are prepared (S139), then the processing proceeds to step S140.

In step 140, (the low-resolution stitch processing unit 132-2 of) the image processing unit 113 executes stitch processing using the image C and the image D that have been synchronized. Here, the low-resolution stitch image I3-2 obtained by the stitch processing is set as image F.

In step S141, (the trimming and resizing unit 134 of) the image processing unit 113 trims a region corresponding to a high-resolution region off the image F and resizes the trimmed-off region of the image F to the same size as the image E. Here, the trimmed and resized image I4 obtained by the trimming and resizing processing is set as image G.

When the processing of step S141 ends, then the processing returns to step S102 in FIG. 25, and the processing proceeds to step 3103.

That is, in the workstation 10, when the high-resolution image processing (S101 in FIG. 25) and the low-resolution image processing (S102 in FIG. 25) end, then dividing and encoding processing (S103 in FIG. 25) is executed.

Figure 28:
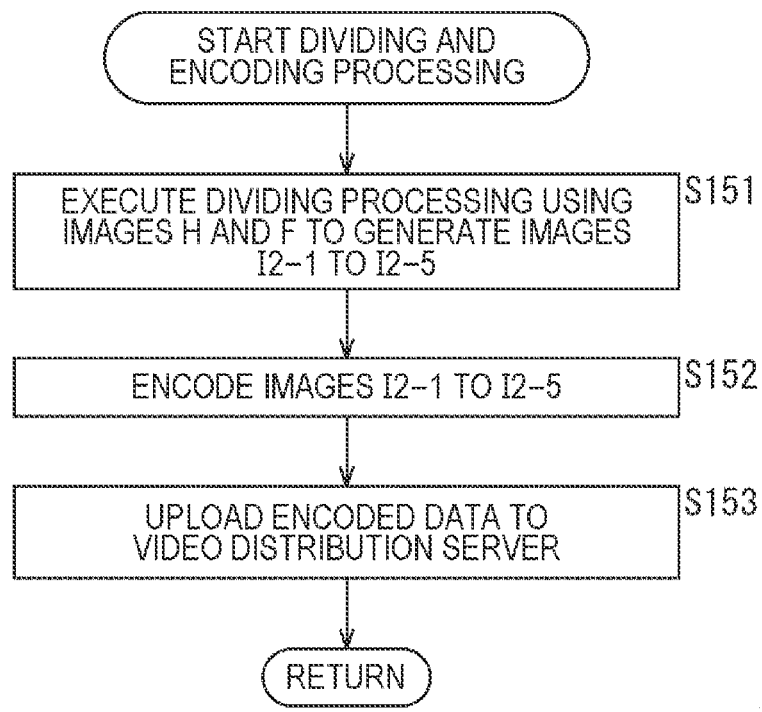
FIG. 28 is a flowchart for explaining a flow of dividing and encoding processing.

Here, the dividing and encoding processing corresponding to processing of step S103 in FIG. 25 will be described in detail with reference to the flowchart of FIG. 28.

In step S151, (the division unit 136 of) the image processing unit 113 executes dividing processing using the image H and the image F to generate synthetic images I2-1 to I2-5.

In step S152, (an encoder of) the image processing unit 113 encodes the generated synthetic images I2-1 to I2-5.

In step S153, the transmission control unit 114 uploads encoded data corresponding to an encoding result to the video distribution server via the Internet 30.

When the processing of step S153 ends, then the processing returns to step S103 in FIG. 25 and proceeds to step S104. In step S104, the control unit 100 determines whether or not a stop button has been pressed on the basis of an operation signal from the input unit 101.

In a case where it is determined in step S104 that the stop button has not been pressed, the processing returns to steps S101 and S102, and the above-described processing is repeated. On the other hand, in a case where it is determined in step S104 that the stop button has been pressed, the image processing illustrated in FIG. 25 ends.

The flow of the image processing has been described above.

(Configuration of Video Distribution Server)

Figure 29:
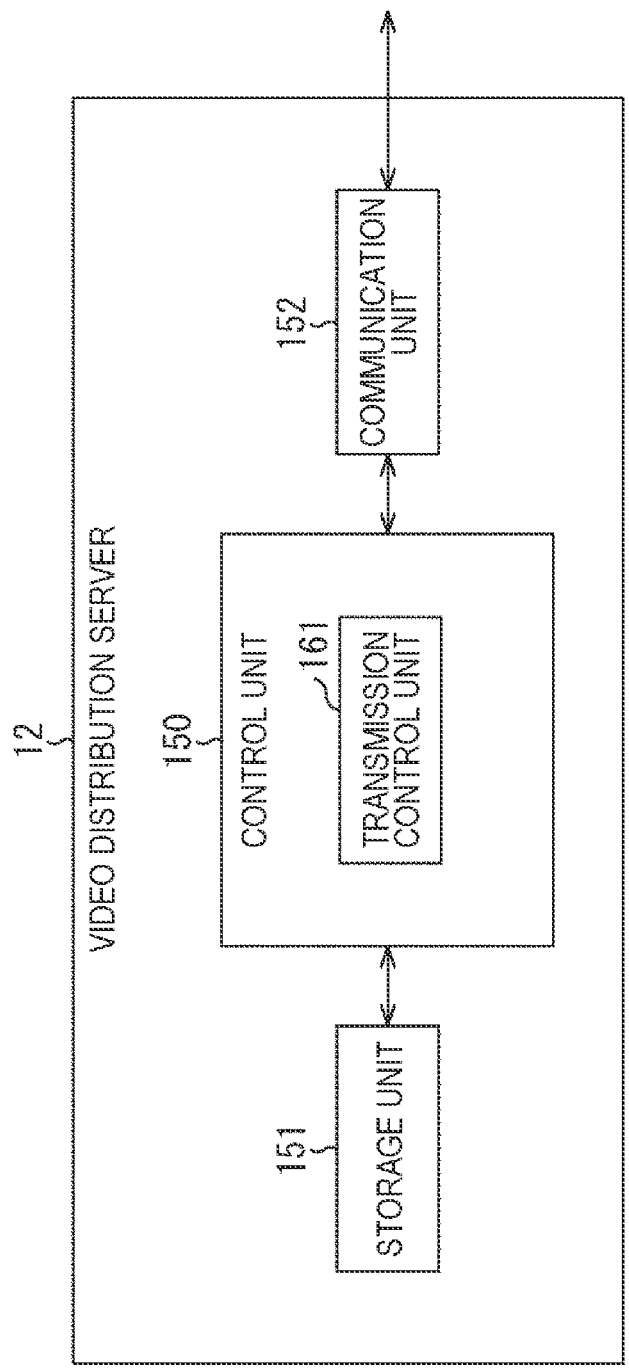
FIG. 29 is a diagram illustrating an example of a configuration for a video distribution server.

FIG. 29 illustrates an example of a configuration for the video distribution server 12 of FIG. 1.

In FIG. 29, the video distribution server 12 includes a control unit 150, a storage unit 151, and a communication unit 152.

The control unit 150 is configured as, for example, a processor such as a CPU. The control unit 150 is a main processing device controlling operation of each unit and performing various types of arithmetic processing.

The storage unit 151 is configured as, for example, a semiconductor memory including a non-volatile memory or a volatile memory, a buffer memory, or the like. The storage unit 151 stores various kinds of data under the control of the control unit 150.

The communication unit 152 is configured as a communication module supporting wireless communication or wired communication. The communication unit 152 exchanges various kinds of data with the workstation 10 or the display terminals 20 via the Internet 30 under the control of the control unit 150.

Furthermore, the control unit 150 includes a transmission control unit 161. The transmission control unit 161 performs control to transmit (live-distribute) a video stream (including content such as a VR video) including encoded data received from the workstation 10 to the display terminal 20 via the Internet 30.

(Flow of Video Distribution Processing)

Figure 30:
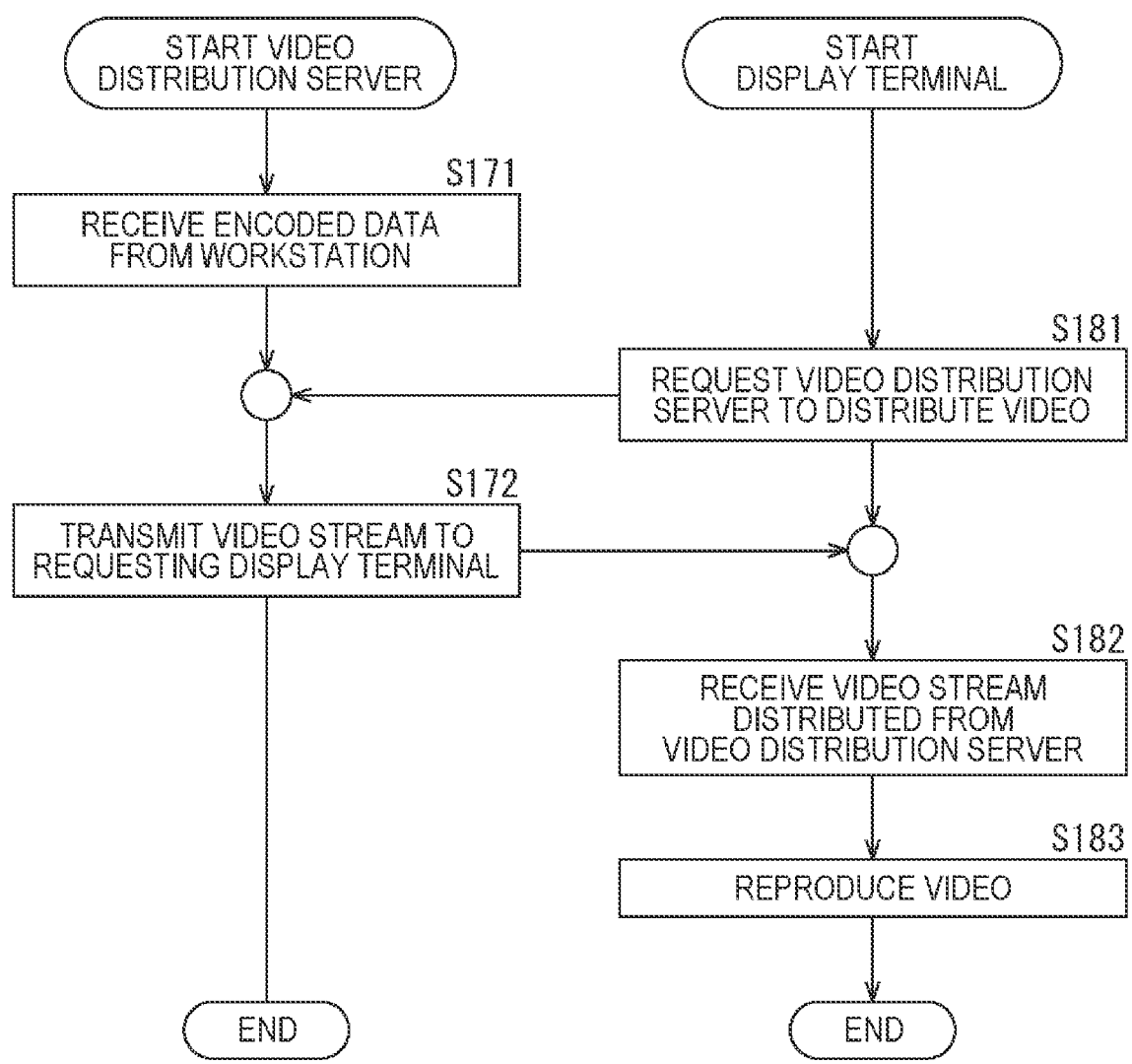
FIG. 30 is a flowchart for explaining a flow of video distribution processing.

Next, a flow of video distribution processing executed between the video distribution server 12 and the display terminal 20 will be described with reference to a flowchart of FIG. 30.

The video distribution server 12 receives the encoded data uploaded from the workstation 10 via the Internet 30 (S171). Here, for example, data of content such as a VR video that is being live-distributed is uploaded.

At this time, in a case where the video distribution server 12 is requested from a display terminal 20 to distribute a video (S181), the transmission control unit 161 transmits a video stream including the encoded data from the workstation 10 to the requesting display terminal 20 (S172).

Therefore, the display terminal 20 receives the video stream that is being live-distributed from the video distribution server 12 (S182), and reproduces a video by decoding the encoded data included in the video stream or the like (S183). For example, the display terminal 20 displays a video image of a VR video and outputs a sound synchronized with the video image.

The flow of the video distribution processing has been described above.

As described above, in the video distribution system 1 according to the first embodiment, the image acquisition unit 111 of the workstation 10 acquires low-resolution images (for example, the low-resolution images I1-3 and I1-4) from low-resolution cameras (for example, the low-resolution cameras 11-3 and 11-4), while acquiring high-resolution images (for example, the high-resolution images I1-1 and I1-2) from high-resolution cameras (for example, the high resolution cameras 11-1 and 11-2), and the abnormality determination unit 112 of the workstation 10 determines whether or not there is an abnormality in any one of first signals representing the low-resolution images and second signals representing the high-resolution images.

Then, the transmission control unit 161 of the video distribution server 12 transmits first synthetic images (for example, the synthetic images I2-1 to I2-5 of FIG. 8) to a display terminal (for example, the display terminal 20) in a case where it is determined that there is no abnormality, the first synthetic images having continuity between the low-resolution images and the high-resolution images, and transmits second synthetic images (for example, the synthetic images I2-1 to I2-5 of FIGS. 14 to 16 or FIGS. 22 to 24) to the display terminal (for example, the display terminal 20) in a case where it is determined that there is an abnormality, the second synthetic images substantially reproducing the continuity by replacing an image acquired from one determined to have the abnormality among the low-resolution cameras and the high-resolution cameras with a substitute image (for example, the low-resolution image I1-3 or the still image I10) corresponding to a region of a real space.

Therefore, even if inputs from some of the cameras 11 the workstation 10, which outputs a plurality of images captured by the plurality of cameras 11 after being synthesized, are missing due to, for example, failure of the cameras 11, cable disconnection, battery shortage, or the like, the video distribution system 1 can continue the image processing, thereby making it possible to continue live distribution. As a result, video distribution can be more reliably performed.

Furthermore, in a case where inputs from some cameras 11 are missing, the video distribution system 1 can complement the missing regions with the inputs from the other cameras 11 or with a stored still image to distribute the complemented images. For example, a missing region of a high-resolution image can be complemented with a low-resolution image, or a missing region of a low-resolution image can be complemented with a stored still image. Thus, the missing input can be complemented as much as possible and the complemented image can be distributed.

Moreover, since stitch processing on a low-resolution image having a wide angle of view is performed separately from stitch processing on a high-resolution image having a narrow angle of view in the workstation 10, the video distribution system 1 can reduce a memory usage amount and a processing load when the stitch processing is performed on the low-resolution image as compared with those when the stitch processing is performed on the high-resolution image having the narrower angle of view than the low-resolution image.

Here, in an image processing device outputting a plurality of images captured by a plurality of cameras after being synthesized as in the technology disclosed in Patent Document 1 described above, if one of the plurality of cameras stops due to failure or the like, the synthesizing processing cannot be continued, and accordingly, nothing is output. In a case where reshoot is not possible, for example, during live distribution or the like, it may be desired to output images if possible even if there is an adverse effect such as deterioration in image quality.

For example, when live-distributing omnidirectional images, an image processing unit having a plurality of cameras is usually used. Generally, images captured by such cameras are synthesized into an equidistant cylindrical image by stitch processing. However, in the conventional technology including the technology disclosed in Patent Document 1, there is a problem that the live distribution is interrupted even when merely one input is not obtained from the camera 11 due to failure of the camera 11, cable disconnection, battery shortage, or the like.

In particular, in a case where the above-described hierarchical segmentation scheme is used, for example, in a case where the high-resolution cameras 11 capturing high-resolution images including regions-of-interest are separate from the low-resolution cameras 11 capturing omnidirectional low-resolution images, if the live distribution is kept continued when a high-resolution camera 11 fails, the following problem occurs. That is, as illustrated in FIGS. 3 and 4 described above, although the omnidirectional images are captured by the low-resolution cameras 11, a portion of a region-of-interest is displayed as a black image, resulting in a problem that a region desired by the user who uses the display terminal 20 to see is invisible.

With respect to such a problem, the video distribution system 1 has the above-described configuration to continue image processing such that live distribution can be continued, even if inputs from some of the cameras 11 are missing due to, for example, failure of the cameras 11, cable disconnection, battery shortage, or the like.

Note that, although the case where the input of the high-resolution image is missing and the case where the input of the low-resolution image is missing have been separately described above, in a case where both the input of the high-resolution image and the input of the low-resolution image are missing, the video distribution system 1 can also cope with the missing inputs by using the low-resolution image I1 and the still image I10 as substitute images.

2. Second Embodiment

Meanwhile, the processing in the first embodiment is performed on the video distribution side (workstation 10) to cope with the missing input of the high-resolution image or the low-resolution image, but the processing coping with such missing may be performed on the video reproduction side (display terminal 20). Thus, a configuration in a second embodiment will be described for the processing performed on the video reproduction side (display terminal 20) to cope with the missing input of the high-resolution image or the low-resolution image.

(Configuration of System)

Figure 31:
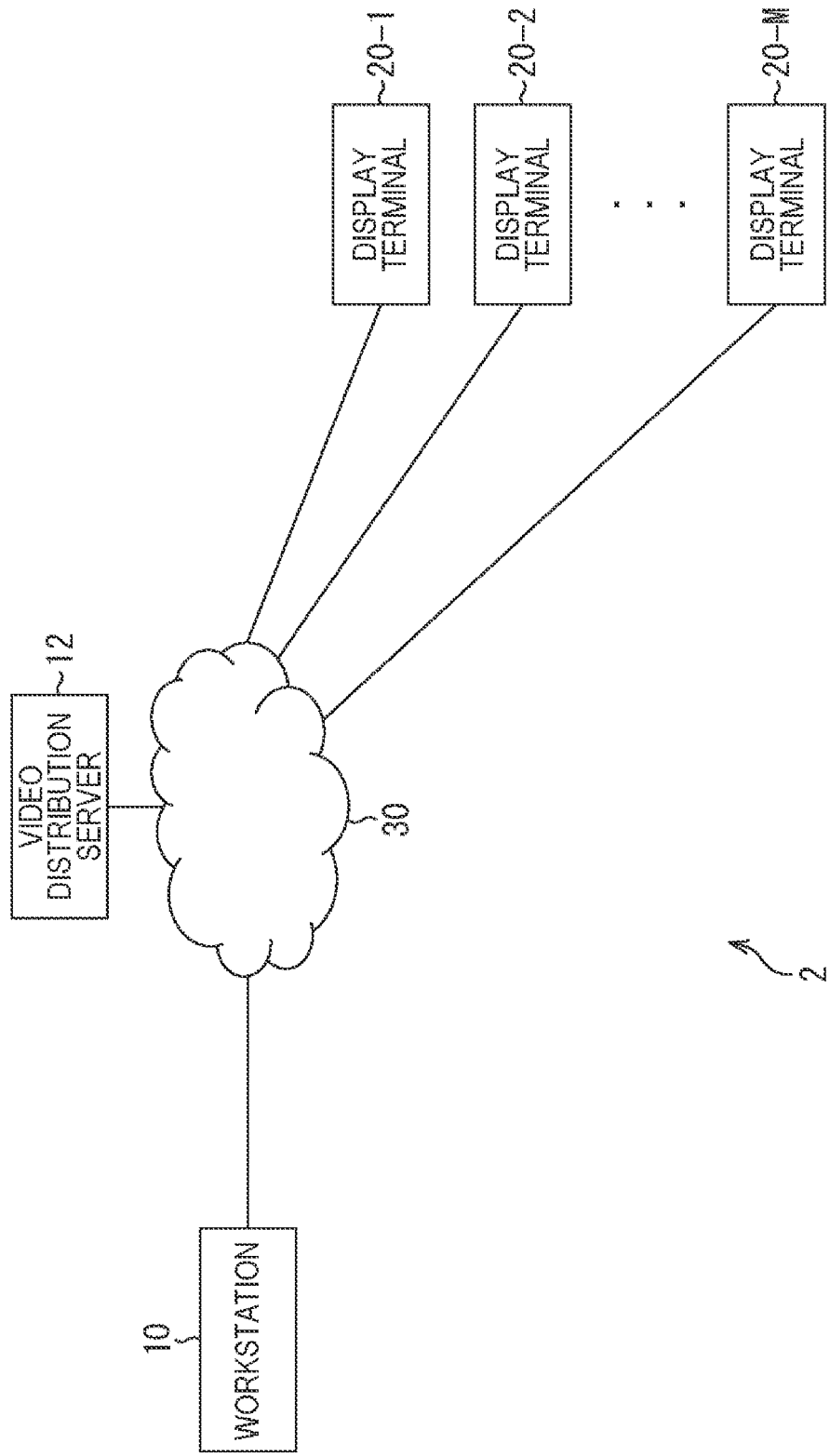
FIG. 31 is a diagram illustrating a second example of a configuration for a video distribution system to which the present technology is applied.

FIG. 31 illustrates a second example of a configuration for a video distribution system to which the present technology is applied.

In FIG. 2, a video distribution system 2 includes a workstation 10, a video distribution server 12, and display terminals 20-1 to 20-M. Furthermore, in the video distribution system 2, each of the workstation 10, the video distribution server 12, and the display terminals 20-1 to 20-M is connected to the Internet 30.

The workstation 10 performs image processing on a plurality of images captured by the cameras 11-1 to 11-N, and transmits data obtained by the image processing to the video distribution server 12 via the Internet 30.

In a case where video distribution is requested from any one of the display terminals 20-1 to 20-M, the video distribution server 12 transmits a video stream including the data from the workstation 10 to the requesting display terminal 20 via the Internet 30.

Each of the display terminals 20-1 to 20-M is configured as, for example, a head-mounted display or the like, and reproduces a video distributed as a video stream from the video distribution server 12.

(Configuration of Display Terminal)

Figure 32:
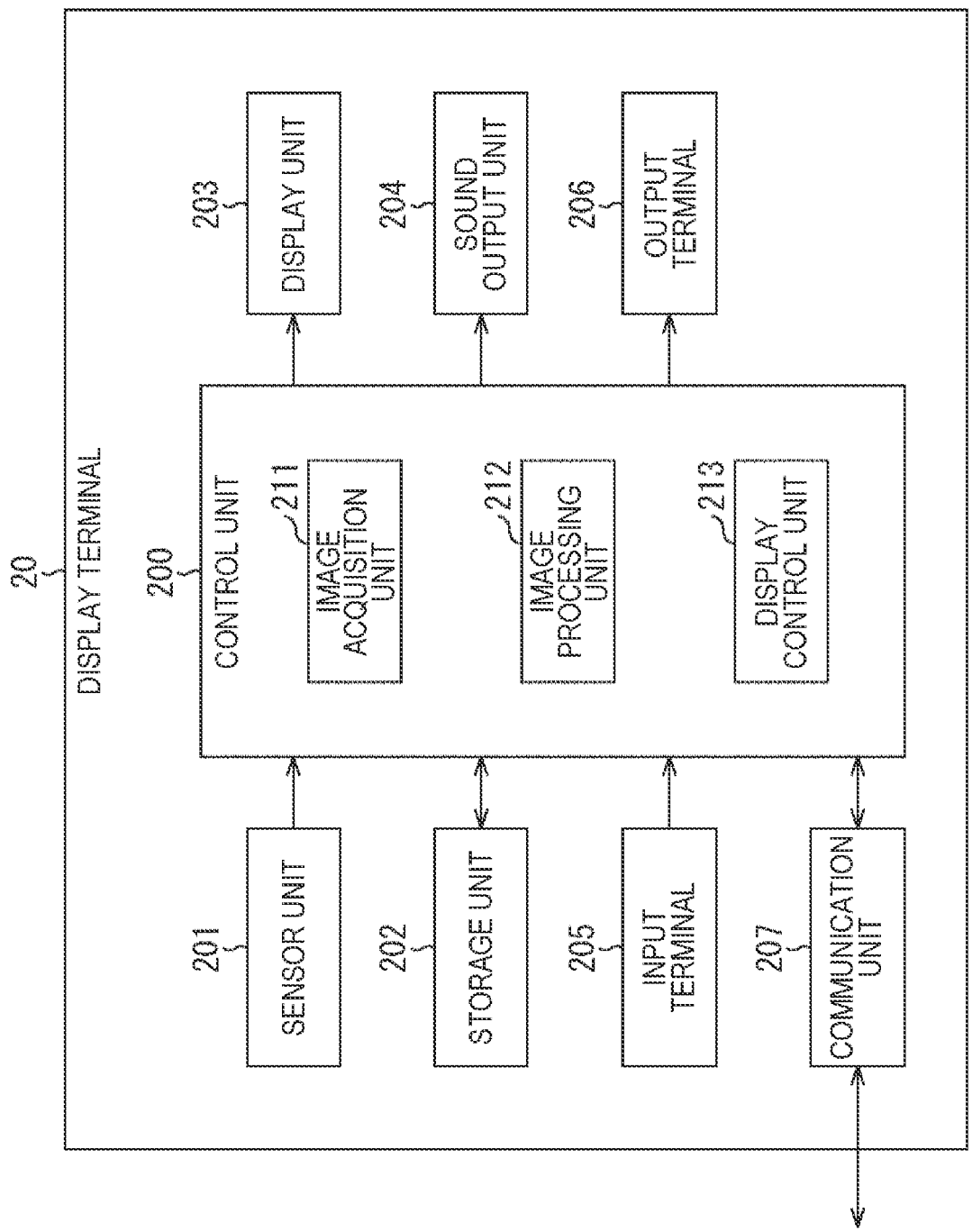
FIG. 32 is a diagram illustrating an example of a configuration for a display terminal.

FIG. 32 illustrates an example of a configuration for the display terminal 20 of FIG. 31.

In FIG. 32, the display terminal 20 includes a control unit 200, a sensor unit 201, a storage unit 202, a display unit 303, a sound output unit 204, an input terminal 205, an output terminal 206, and a communication unit 207.

The control unit 200 is configured as, for example, a CPU or the like. The control unit 200 is a main processing device controlling operation of each unit and performing various types of arithmetic processing. Here, note that a dedicated processor such as a graphics processing unit (GPU) may be provided.

The sensor unit 201 is configured as, for example, various types of sensor devices or the like. The sensor unit 201 senses a user, surroundings thereof, or the like, and supplies sensor data corresponding to a sensing result thereof to the control unit 200.

Here, the sensor unit 201 can include, for example, a magnetic sensor detecting a magnitude and a direction of a magnetic field (magnetic field), an acceleration sensor detecting an acceleration, a gyro sensor detecting an angle (posture), an angular velocity, or an angular acceleration, a proximity sensor detecting an approaching object, and the like. Furthermore, a camera having an image sensor may be provided as the sensor unit 201 to supply an image signal obtained by imaging a subject to the control unit 200.

The storage unit 202 is configured as, for example, a semiconductor memory including a non-volatile memory or a volatile memory or the like. The storage unit 202 stores various kinds of data under the control of the control unit 200.

The display unit 203 is configured as, for example, a display device (display apparatus) such as a liquid crystal display (LCD) or an organic light emitting diode (OLED). The display unit 203 displays a video image (or an image) corresponding to video image data supplied from the control unit 200.

The sound output unit 204 is configured as, for example, a sound output device such as a speaker. The sound output unit 204 outputs a sound (audio) corresponding to sound data supplied from the control unit 200.

The input terminal 205 includes, for example, an input interface circuit and the like, and is connected to an electronic device via a predetermined cable. For example, the input terminal 205 supplies an image signal, a sound signal, a command, or the like input from, for example, a device such as a game machine (dedicated console), a personal computer, or a reproduction machine to the control unit 200.

The output terminal 206 includes, for example, an output interface circuit and the like, and is connected to an electronic device via a predetermined cable. For example, the output terminal 206 outputs a sound signal supplied thereto to a device such as an earphone or a headphone via the cable.

The communication unit 207 is configured as, for example, a communication module supporting wireless communication, such as wireless local area network (LAN), cellular communication (for example, LTE-Advanced, 5G, or the like), or Bluetooth (registered trademark), or wired communication.

The communication unit 207 exchanges various kinds of data with the video distribution server 12 via the Internet 30 under the control of the control unit 200. Furthermore, the communication unit 207 can communicate with an external device including, for example, a game machine (dedicated console), a personal computer, a server, a reproduction machine, a dedicated controller, a remote controller, or the like.

Furthermore, the control unit 200 includes an image acquisition unit 211, an image processing unit 212, and a display control unit 213.

The image acquisition unit 211 acquires an image signal of each of a plurality of images included in a video stream distributed from the video distribution server 12, and stores the acquired image signal in the storage unit 202.

The image processing unit 212 reads out the image signal of the image stored in the storage unit 202, performs predetermined image processing, and supplies data obtained as a result of the image processing to the display control unit 213. Note that the image processing includes processing coping with the missing input of the high-resolution image or the low-resolution image, in addition to decoding processing and the like.

The display control unit 213 displays a video image (or an image) on the display unit 203 on the basis of the data from the image processing unit 212.

(Missing Input of High-Resolution Image)

Here, in the video distribution system 2 of FIG. 31, it is assumed, for example, that the input of the high-resolution image I1-2 captured by the high-resolution camera 11-2 is missing among the high-resolution image I1-1 (A of FIG. 11), the high-resolution image I1-2 (B of FIG. 11), the low-resolution image I1-3 (C of FIG. 12), and the low-resolution image I1-4 (D of FIG. 12).

In this case, in (the image processing unit 113 of) the workstation 10, the stitch processing, the dividing processing, and the like are performed to generate and encode synthetic images I2-1 to I2-5, but the missing input of the high-resolution image I1-2 causes a partial region of a high-resolution synthetic image I2 included in the synthetic images I2 to be missing.

Specifically, a partial region (a black region in the drawing) of, for example, a high-resolution synthetic image I2-1 is in a missing state (A of FIG. 33) among the synthetic images I2-1 to I2-5.

Figure 33:
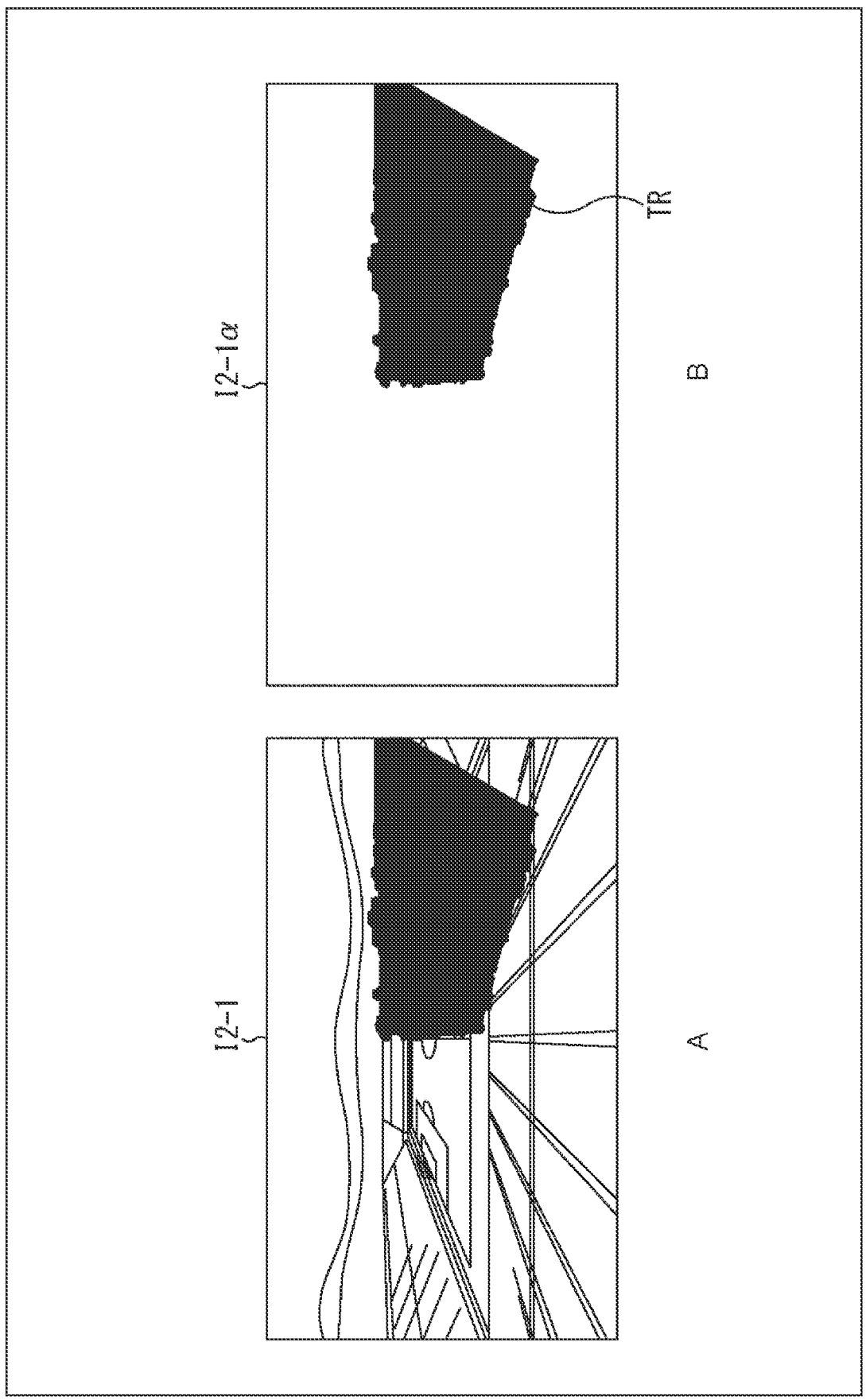
FIG. 33 is a diagram illustrating respective examples of a high-resolution synthetic image and a high-resolution alpha image.

At this time, (the image processing unit 113 of) the workstation 10 generates a high-resolution alpha image I2-1α including an alpha value corresponding to the missing region of the high-resolution synthetic image I2-1 (B of FIG. 33). In the high-resolution alpha image I2-1α, for example, the transparent region TR is set to have an alpha value of 0.

Figure 34:
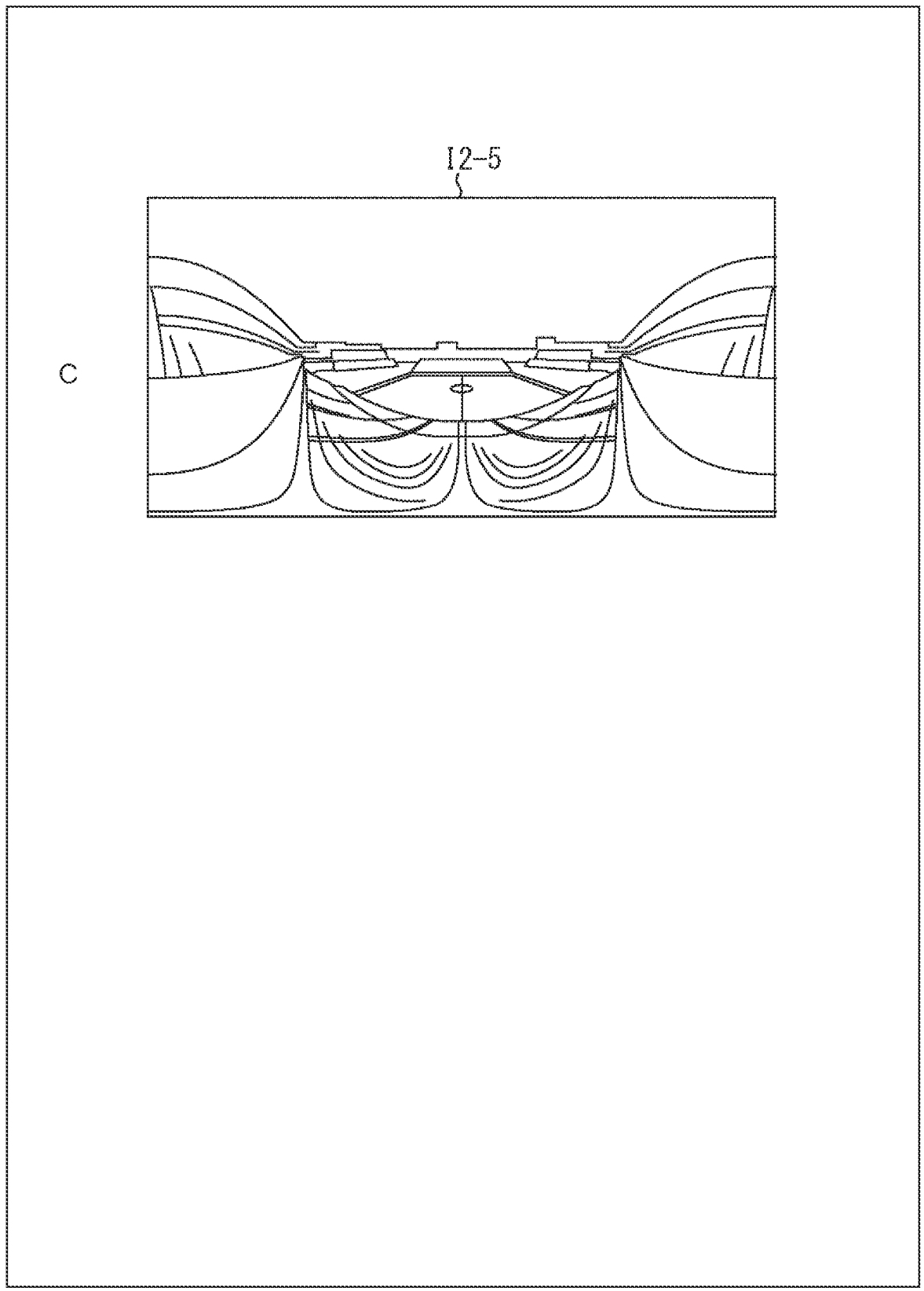
FIG. 34 is a diagram illustrating an example of a low-resolution synthetic image.

Note that, in this example, the input of the high-resolution image I1-2 is missing while a partial region of a low-resolution synthetic image I2 included in the synthetic images I2 is not missing. Therefore, it is not necessary to prepare a low-resolution alpha image, for example, for the low-resolution synthetic image I2-5 (C of FIG. 34).

The synthetic images I2-1 to I2-5 are encoded in the workstation 10, and the encoded data is uploaded to the video distribution server 12 via the Internet 30 together with the high-resolution alpha image I2-1α.

Then, in a case where the video distribution server 12 is requested from a display terminal 20 to distribute a video, a video stream including the high-resolution alpha image I2-1α together with the encoded data is distributed to the requesting display terminal 20 via the Internet 30. On the other hand, the display terminal 20 receives the video stream distributed from the video distribution server 12 and reproduces the video. This will be described in detail with reference to FIGS. 35 and 36.

(Processing on Display Terminal Side)

Figure 35:
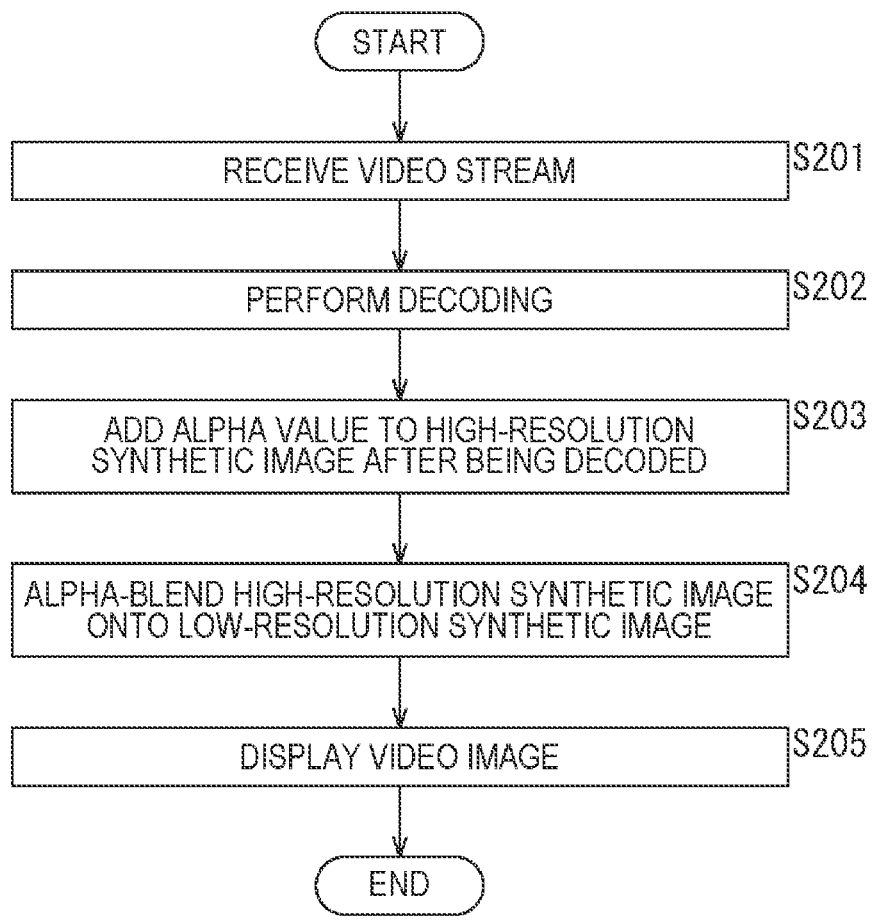
FIG. 35 is a flowchart for explaining a flow of first reproducing processing on a display terminal side.
Figure 36:
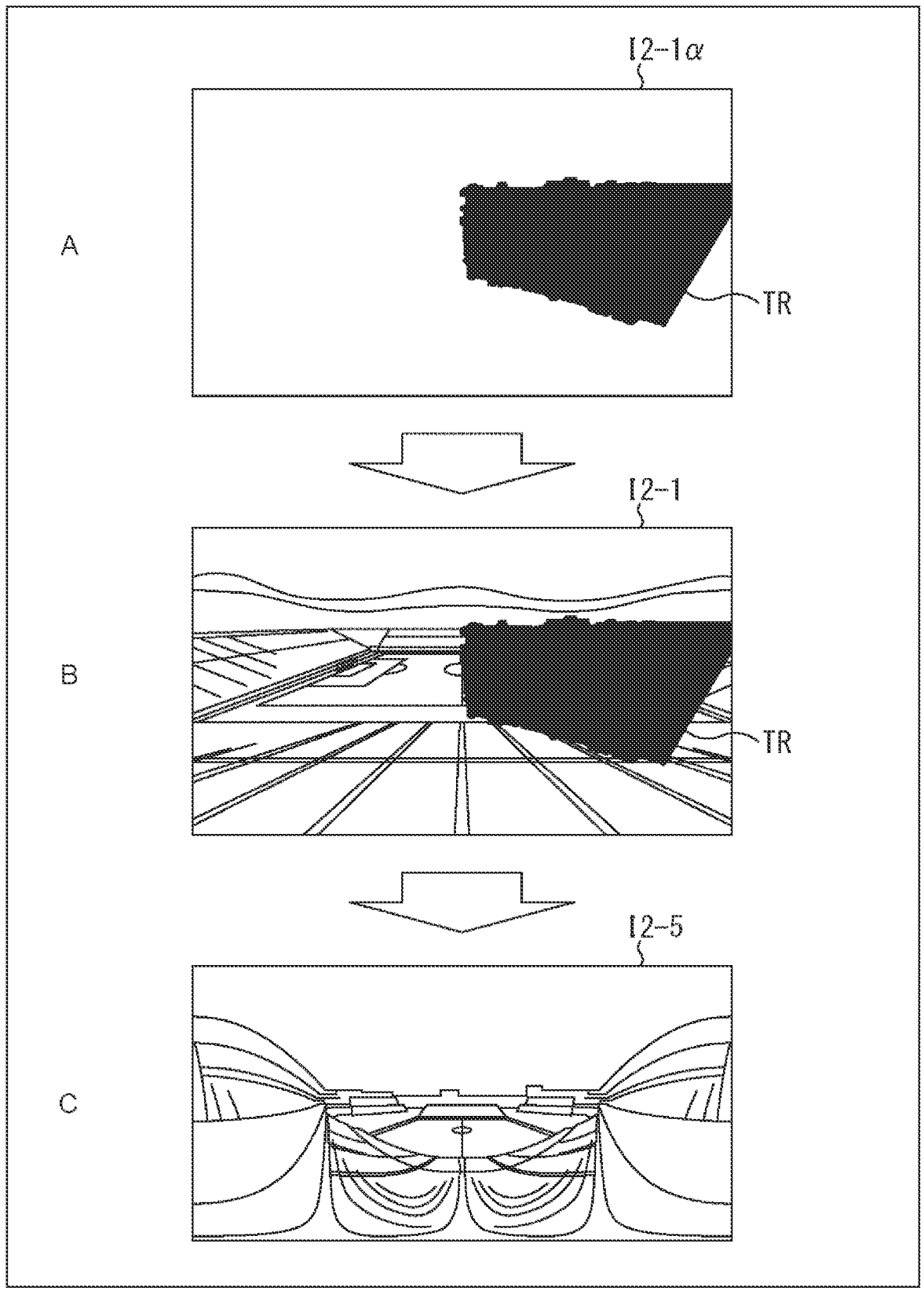
FIG. 36 is a diagram schematically illustrating an image processed by the first reproducing processing.

FIG. 35 is a flowchart for explaining a flow of first reproducing processing executed by the display terminal 20. Note that FIG. 36, which schematically illustrates an image processed by the first reproducing processing illustrated in FIG. 35, will be appropriately referred to for explanation.

In the display terminal 20, the communication unit 207 receives the video stream distributed from the video distribution server 12 via the Internet 30 (S201). Furthermore, the image processing unit 212 decodes the encoded data included in the received video stream (S202).

The image processing unit 212 adds the alpha value included in the high-resolution alpha image I2-1α (A of FIG. 36) included in the video stream to the high-resolution synthetic image I2-1 obtained by the decoding (S203). Therefore, the missing region in the high-resolution synthetic image I2-1 can be set as the transparent region TR (region where the alpha value is 0) (B of FIG. 36).

Subsequently, the image processing unit 212 alpha-blends the high-resolution synthetic image I2-1 (B of FIG. 36), to which the alpha value has been added, onto the low-resolution synthetic image I2-5 (C of FIG. 36) obtained by the decoding (S204). Therefore, the high-resolution synthetic image I2-1 is synthesized on the low-resolution synthetic image I2-5 using the alpha value, such that the missing region in the high-resolution synthetic image I2-1 is complemented with the low-resolution synthetic image I2-5.

Then, in the display terminal 20, the display control unit 213 displays a video image such as the high-resolution synthetic image I2-1 complemented with the low-resolution synthetic image I2-5 on the display unit 203 (S205).

The flow of the first reproducing processing has been described above.

In this way, in a case where an input of a high-resolution image is missing, a missing region of the high-resolution synthetic image I2 is complemented with the low-resolution synthetic image I2 by applying the high-resolution alpha image I2-α including an alpha value corresponding to the missing region of the high-resolution synthetic image I2 and alpha-blending the high-resolution synthetic image I2 to which the alpha value has been added onto the low-resolution synthetic image I2. In other words, it can be said that the low-resolution synthetic image I2 used for the complementation is a substitute image.

(Missing Input of Low-Resolution Image)

Next, in the video distribution system 2 of FIG. 31, it is assumed, for example, that the input of the low-resolution image I1-3 captured by the low-resolution camera 11-3 is missing among the high-resolution image I1-1 (A of FIG. 11), the high-resolution image I1-2 (B of FIG. 11), the low-resolution image I1-3 (C of FIG. 12), and the low-resolution image I1-4 (D of FIG. 12).

In this case, in (the image processing unit 113 of) the workstation 10, the stitch processing, the dividing processing, and the like are performed to generate and encode synthetic images I2-1 to I2-5, but the missing input of the low-resolution image I1-3 causes respective partial regions of a high-resolution synthetic image I2 and a low-resolution synthetic image I2 included in the synthetic images I2 to be missing.

Specifically, a partial region (a black region in the drawing) of, for example, a high-resolution synthetic image I2-1 is in a missing state (A of FIG. 37) among the synthetic images I2-1 to I2-5.

Figure 37:
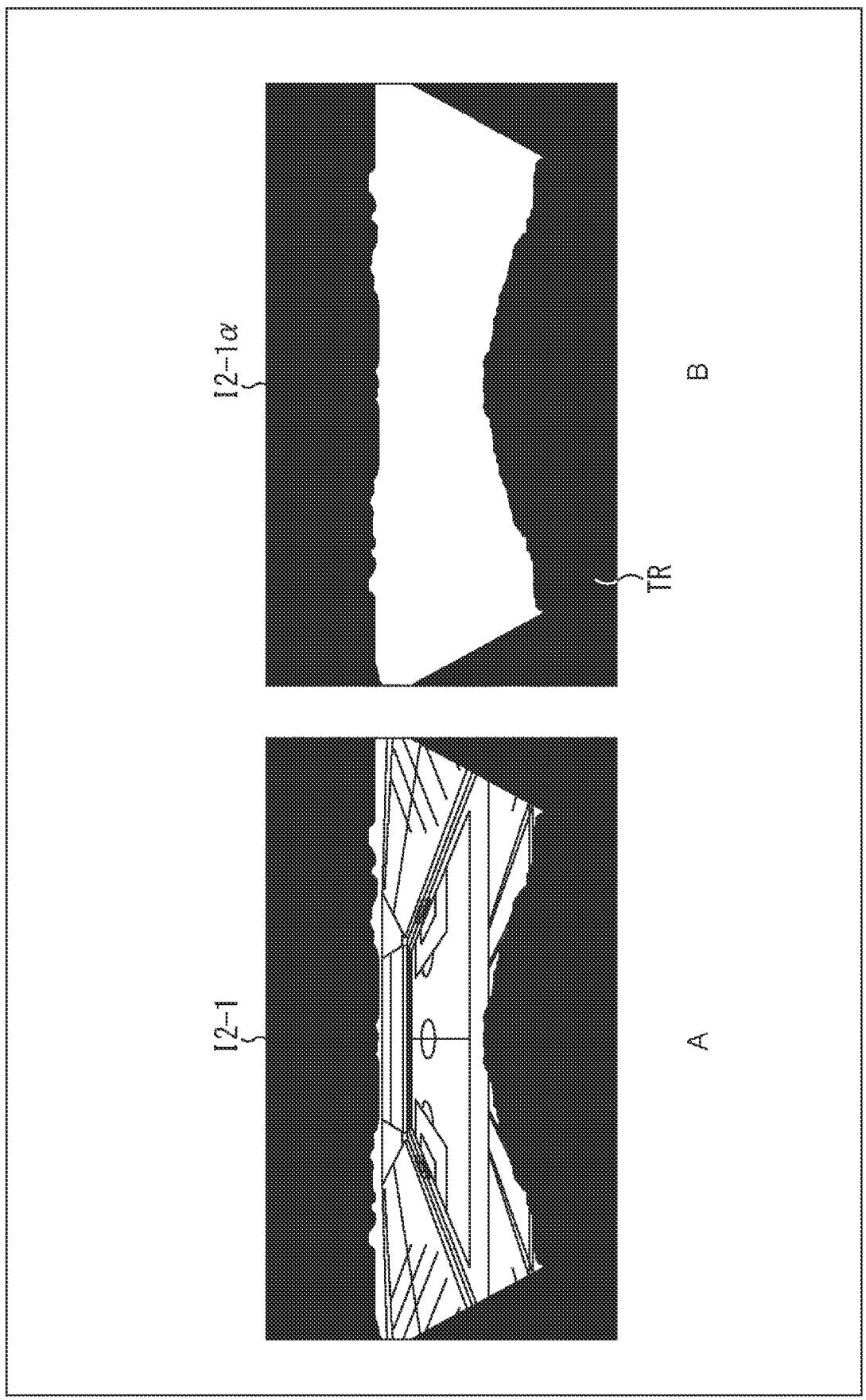
FIG. 37 is a diagram illustrating respective examples of a high-resolution synthetic image and a high-resolution alpha image.

At this time, the image processing unit 113 generates a high-resolution alpha image I2-1α including an alpha value corresponding to the missing region of the high-resolution synthetic image I2-1 (B of FIG. 37). In the high-resolution alpha image I2-1α, the transparent region TR is set to have an alpha value of 0.

Furthermore, a partial region (a black region in the drawing) of, for example, a low-resolution synthetic image I2-5 is in a missing state (C of FIG. 38) among the synthetic images I2-1 to I2-5.

Figure 38:
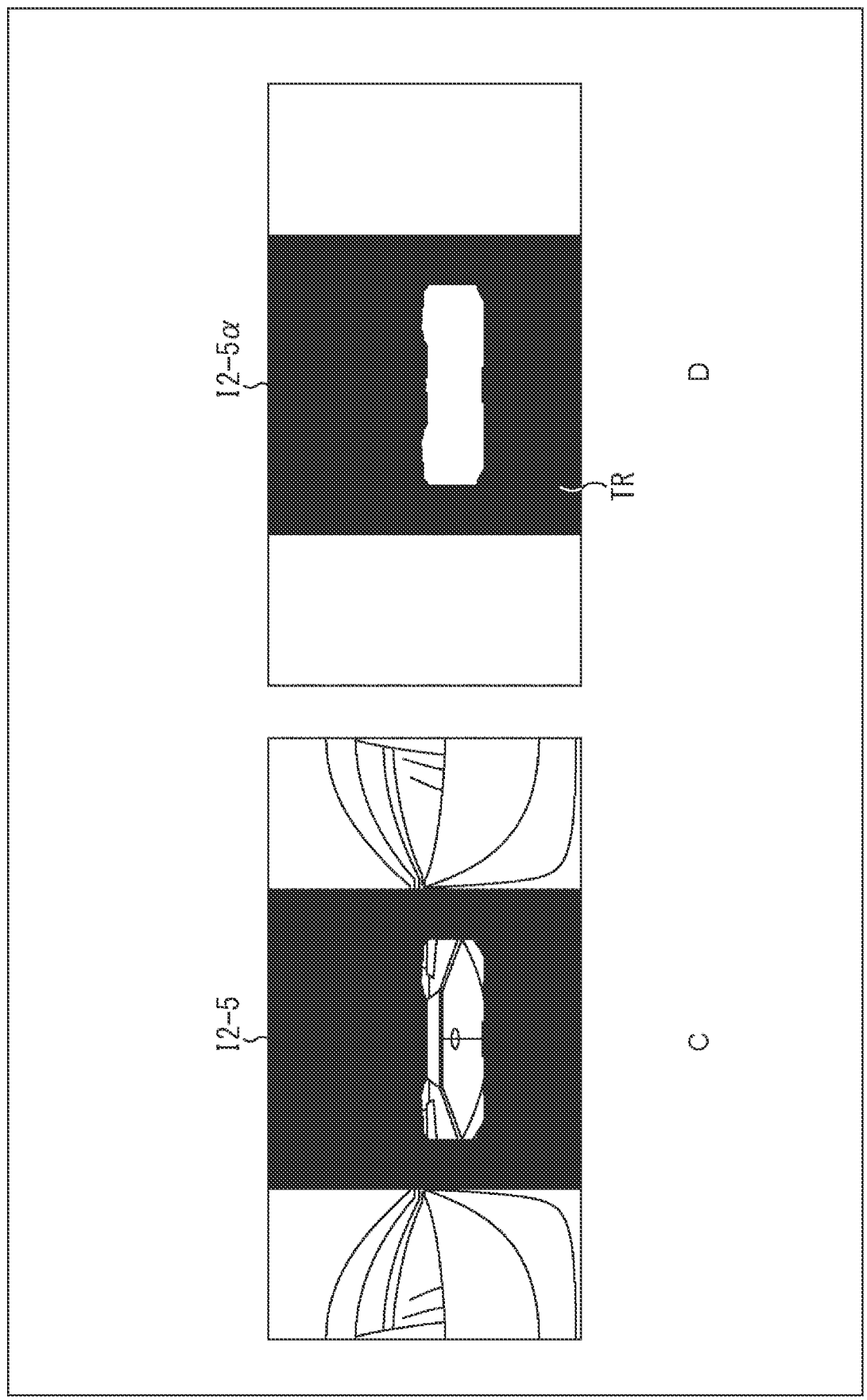
FIG. 38 is a diagram illustrating respective examples of a low-resolution synthetic image and a low-resolution alpha image.

At this time, the image processing unit 113 generates a low-resolution alpha image I2-5α including an alpha value corresponding to the missing region of the low-resolution synthetic image I2-5 (D of FIG. 38). In the low-resolution alpha image I2-5α, the transparent region TR is set to have an alpha value of 0.

Figure 39:
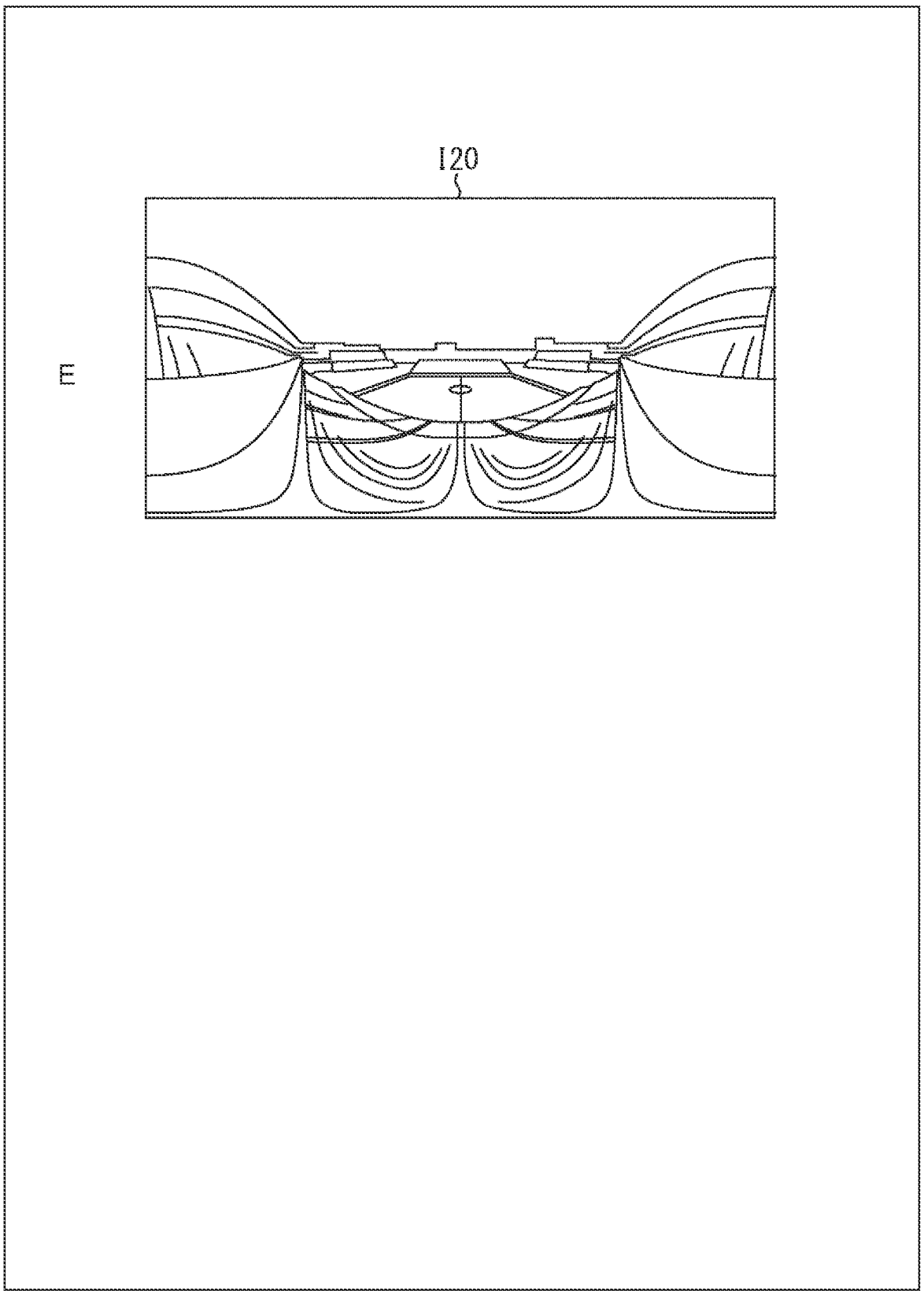
FIG. 39 is a diagram illustrating an example of a background still image.

Moreover, the image processing unit 113 acquires a background still image I20 (E of FIG. 39). The background still image I20 may be, for example, an image that is captured in advance (previously) and stored in the storage unit 103 or an image that is captured immediately before the missing, such as an image captured one frame ahead or an image captured several frames ahead, and temporarily stored, or may alternatively be, for example, an image that is acquired from an external device or the like.

The synthetic images I2-1 to I2-5 are encoded in the workstation 10, and the encoded data is uploaded to the video distribution server 12 via the Internet 30 together with the high-resolution alpha image I2-1α, the low-resolution alpha image I2-5α, and the background still image I20.

Then, in a case where the video distribution server 12 is requested from a display terminal 20 to distribute a video, a video stream including the high-resolution alpha image I2-1α, the low-resolution alpha image I2-5α, and the background still image I20 together with the encoded data is distributed to the requesting display terminal 20 via the Internet 30. On the other hand, the display terminal 20 receives the video stream distributed from the video distribution server 12 and reproduces the video. This will be described in detail with reference to FIGS. 40 and 41.

(Processing on Display Terminal Side)

Figure 40:
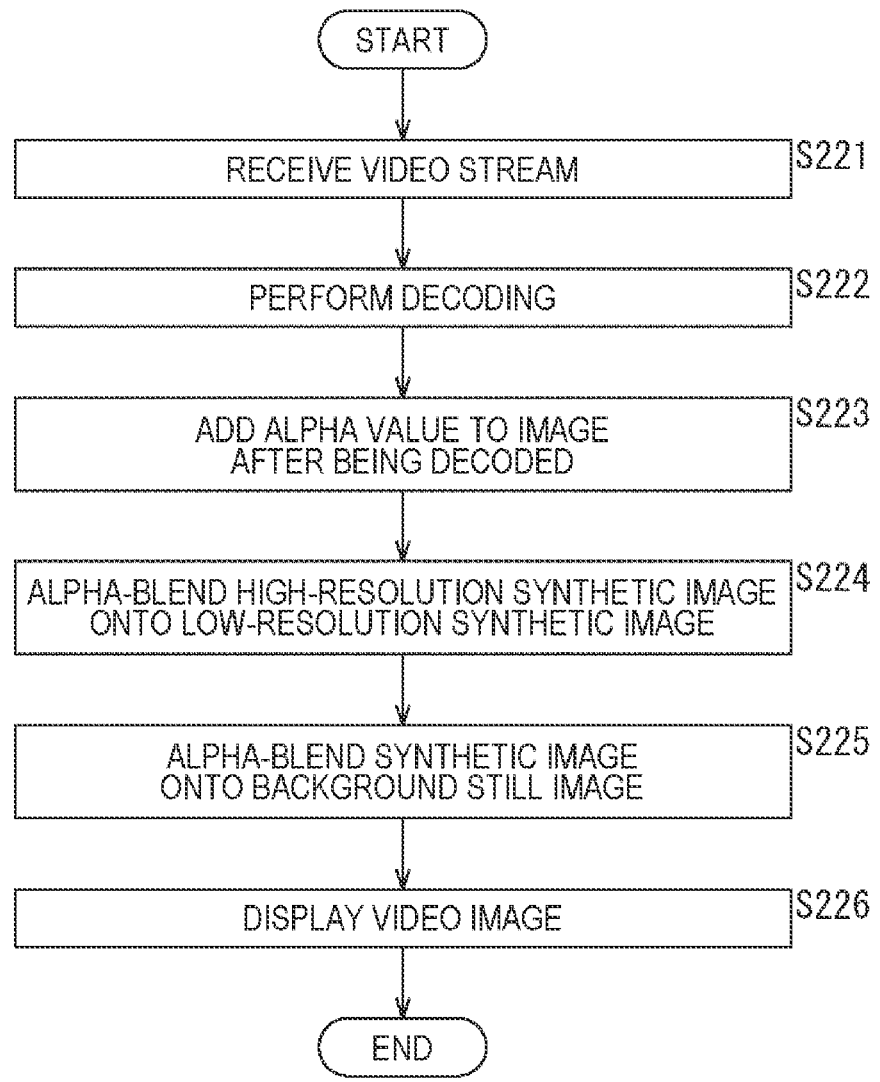
FIG. 40 is a flowchart for explaining a flow of second reproducing processing on the display terminal side.

FIG. 40 is a flowchart for explaining a flow of second reproducing processing executed by the display terminal 20. Note that FIG. 41, which schematically illustrates an image processed by the second reproducing processing illustrated in FIG. 40, will be appropriately referred to for explanation.

In the display terminal 20, the communication unit 207 receives the video stream distributed from the video distribution server 12 via the Internet 30 (S221). Furthermore, the image processing unit 212 decodes the encoded data included in the received video stream (S222).

The image processing unit 212 adds the alpha value included in the high-resolution alpha image I2-1α included in the video stream to the high-resolution synthetic image I2-1 obtained by the decoding (S223). Furthermore, the image processing unit 212 adds the low-resolution alpha image I2-5α included in the video stream to the low-resolution synthetic image I2-5 obtained by the decoding (S223).

Figure 41:
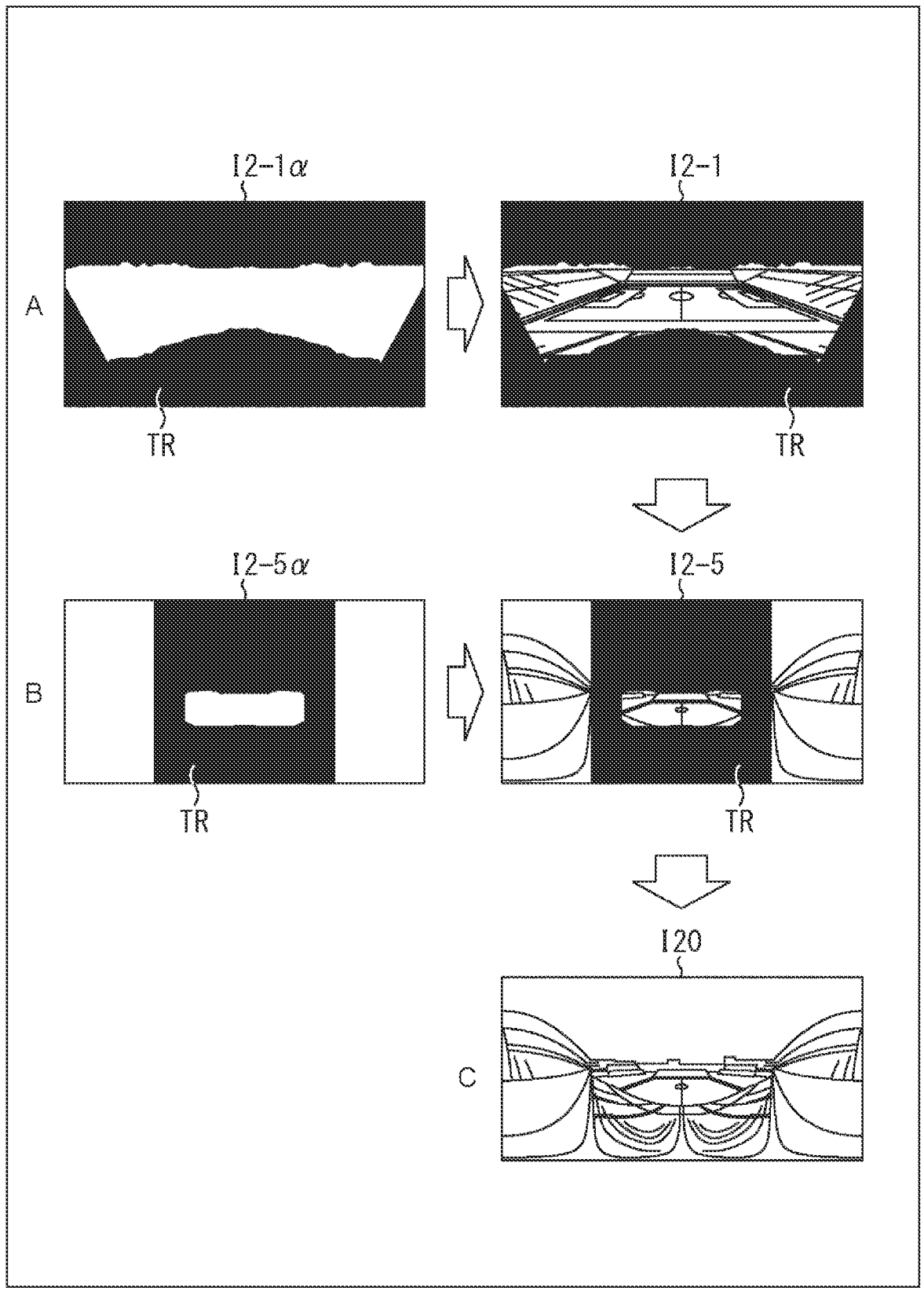
FIG. 41 is a diagram schematically illustrating an image processed by the second reproducing processing.

Therefore, the missing region in the high-resolution synthetic image I2-1 can be set as the transparent region TR (A of FIG. 41), and the missing region in the low-resolution synthetic image I2-5 can be set as the transparent region TR (B of FIG. 41).

Subsequently, the image processing unit 212 alpha-blends the high-resolution synthetic image I2-1 to which the alpha value has been added onto the low-resolution synthetic image I2-5 to which the alpha value has been added (S224). Therefore, an image in which the high-resolution synthetic image I2-1 is synthesized on the low-resolution synthetic image I2-5 is obtained as a synthetic image using the alpha value.

The image processing unit 212 further alpha-blends the synthetic image obtained by the processing in step S224 onto the background still image I20 included in the video stream (S225). Therefore, the synthetic image is synthesized on the background still image I20 using the alpha value, such that the missing regions in the high-resolution synthetic image I2-1 and the low-resolution synthetic image I2-5 are complemented with the background still image I20.

Then, in the display terminal 20, the display control unit 213 displays video images such as the high-resolution synthetic image I2-1 and the low-resolution synthetic image I2-5 complemented with the background still image I20 on the display unit 203 (S226).

The flow of the second reproducing processing has been described above.

In this way, in a case where an input of a low-resolution image is missing, each of the high-resolution alpha image I2-α including an alpha value corresponding to a missing region of the high-resolution synthetic image I2 and the low-resolution alpha image I2-α including an alpha value corresponding to a missing region of the low-resolution synthetic image I2 is applied. The high-resolution synthetic image I2 to which the alpha value has been added is alpha-blended onto the low-resolution synthetic image I2 to which the alpha value has been added, and an image obtained thereby is further alpha-blended onto the background still image I20. Therefore, the missing regions of the high-resolution synthetic image I2 and the low-resolution synthetic image I2 are complemented with the background still image I20. In other words, it can be said that the background still image I20 used for the complementation is a substitute image.

As described above, in the second embodiment, the image acquisition unit 211 of the display terminal 20 acquires first synthetic images (for example, the synthetic images I2-1 to I2-5) having continuity between low-resolution images (for example, the low-resolution images I1-3 and I1-4) acquired from low-resolution cameras (for example, the low-resolution cameras 11-3 and 11-4) and high-resolution images (for example, the high-resolution images I1-1 and I1-2) acquired from high-resolution cameras (for example, the high-resolution cameras 11-1 and 11-2), and the display control unit 213 displays the first synthetic images on a display unit (for example, the display unit 203) in a case where there is no abnormality in any one of first signals representing the low-resolution images and second signals representing the high-resolution images.

On the other hand, in a case where there is an abnormality, the display control unit 213 displays second synthetic images (for example, the synthetic images in FIG. 36 or 41) on the display unit (for example, the display unit 203), the second synthetic images substantially reproducing the continuity by replacing an image acquired from one having the abnormality among the low-resolution cameras and the high-resolution cameras with a substitute image (for example, the low-resolution synthetic image I2-5 or the background still image I20) corresponding to a region of a real space.

Therefore, in the video distribution system 1, even in a case where inputs from some of the cameras 11 are missing due to, for example, failure of the cameras 11, cable disconnection, battery shortage, or the like on the video distribution side (the workstation 10), the processing is performed on the video reproduction side (the display terminal 20) to cope with the missing inputs of the high-resolution images or the low-resolution images, thereby making it possible to continue live distribution. As a result, video distribution can be more reliably performed.

3. Modified Example (Configuration of System)

Figure 42:
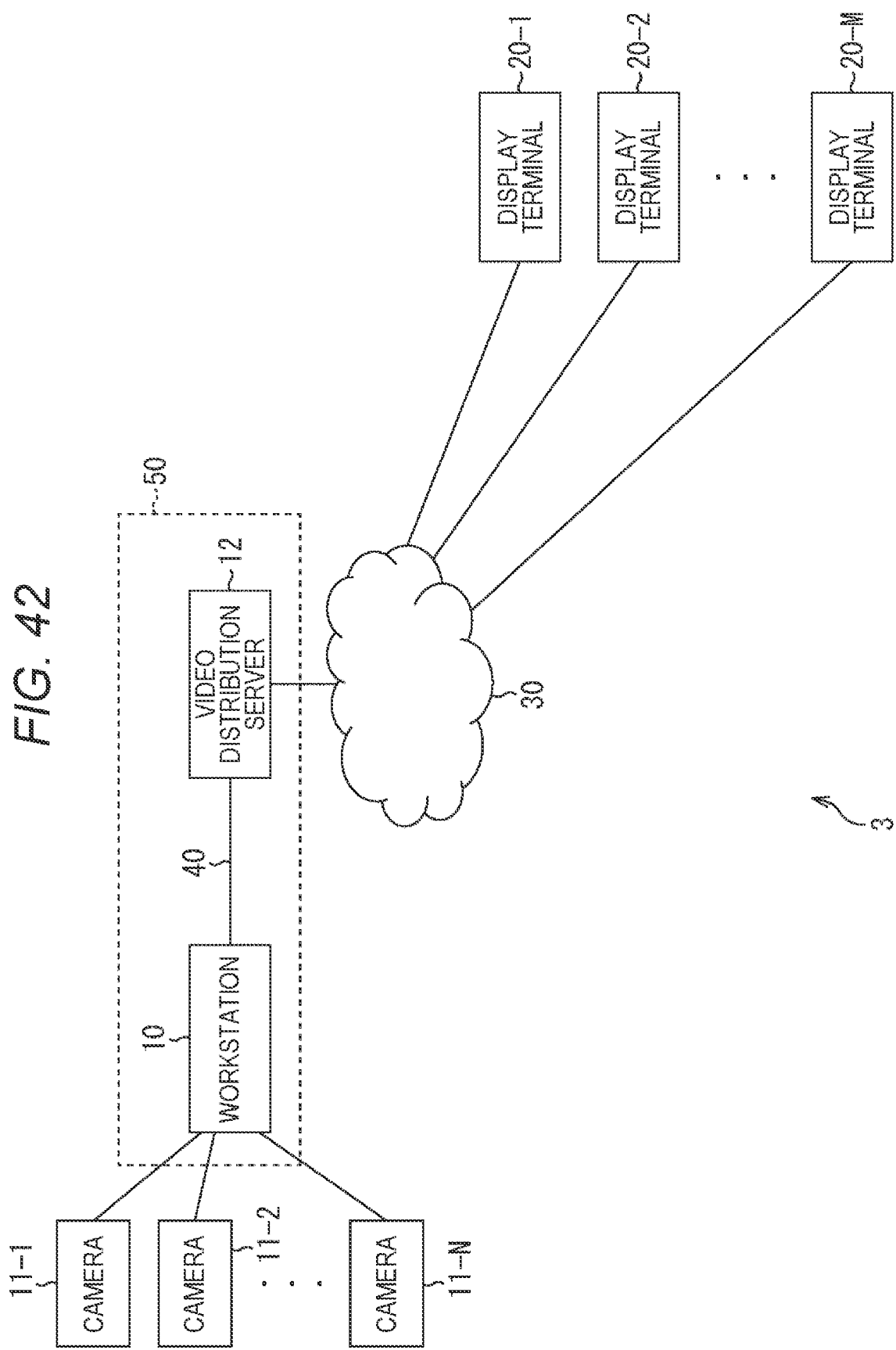
FIG. 42 is a diagram illustrating an example of another configuration for a video distribution system to which the present technology is applied.

FIG. 42 illustrates an example of another configuration for a video distribution system to which the present technology is applied.

In the video distribution system 3 of FIG. 42, a workstation 10 and a video distribution server 12 are connected to each other, for example, via a communication line 40 such as a dedicated line, to exchange various kinds of data therebetween. Furthermore, although it is illustrated in FIG. 42 that the workstation 10 and the video distribution server 12 are different devices, the workstation 10 and the video distribution server 12 may be integrated into a single device 50 having their functions.

Furthermore, one or a plurality of devices (servers) may be included for each function of the workstation 10 or the video distribution server 12. Moreover, the cameras 11-1 to 11-N may be connected to the Internet 30 to transmit data on images captured by the cameras 11-1 to 11-N to the workstation 10 via the Internet 30.

(Configuration of Display Terminal)

Although it has been described above that the display terminal 20 is configured as a head-mounted display, the present technology is not limited to the head-mounted display that is narrow in scope, and can also be applied even in a case where the display terminal 20 is mounted on, for example, a spectacle, a spectacle-type display, a spectacle-type camera, a headphone, a headset (a headphone with a microphone), an earphone, an earring, an earring-type camera, a hat, a hat with a camera, a hair band, or the like.

Furthermore, the present technology may be applied to not only a display terminal 20 such as a head-mounted display configured as an independent device but also an information processing device of a game machine, a personal computer, or the like connected to the head-mounted display.

Furthermore, although it has been described above that virtual reality (VR) is implemented by displaying three-dimensional video images, so that a user who uses the display terminal 20 supporting VR live distribution (omni-directional-image live distribution) can experience a sense as if the user were there, the present technology is not limited to the virtual reality (VR), and may be applied to distribute another type of video image. Furthermore, the video image to be displayed is not limited to a video image in a VR space, and may be, for example, another type of video image such as a video image in a real space.

Moreover, although it has been described above that omnidirectional images are used in the hierarchical segmentation scheme, and typically, images having a viewing angle of 360 degrees are used, another type of image can be used as long as the image has a wider view than the user's view, for example, an image having a viewing angle of 180 degrees or the like.

Note that, in the present disclosure, the system refers to a set of a plurality of components (devices, modules (parts), etc.), regardless of whether or not all the components are in the same housing.

4. Configuration of Computer

Figure 43:
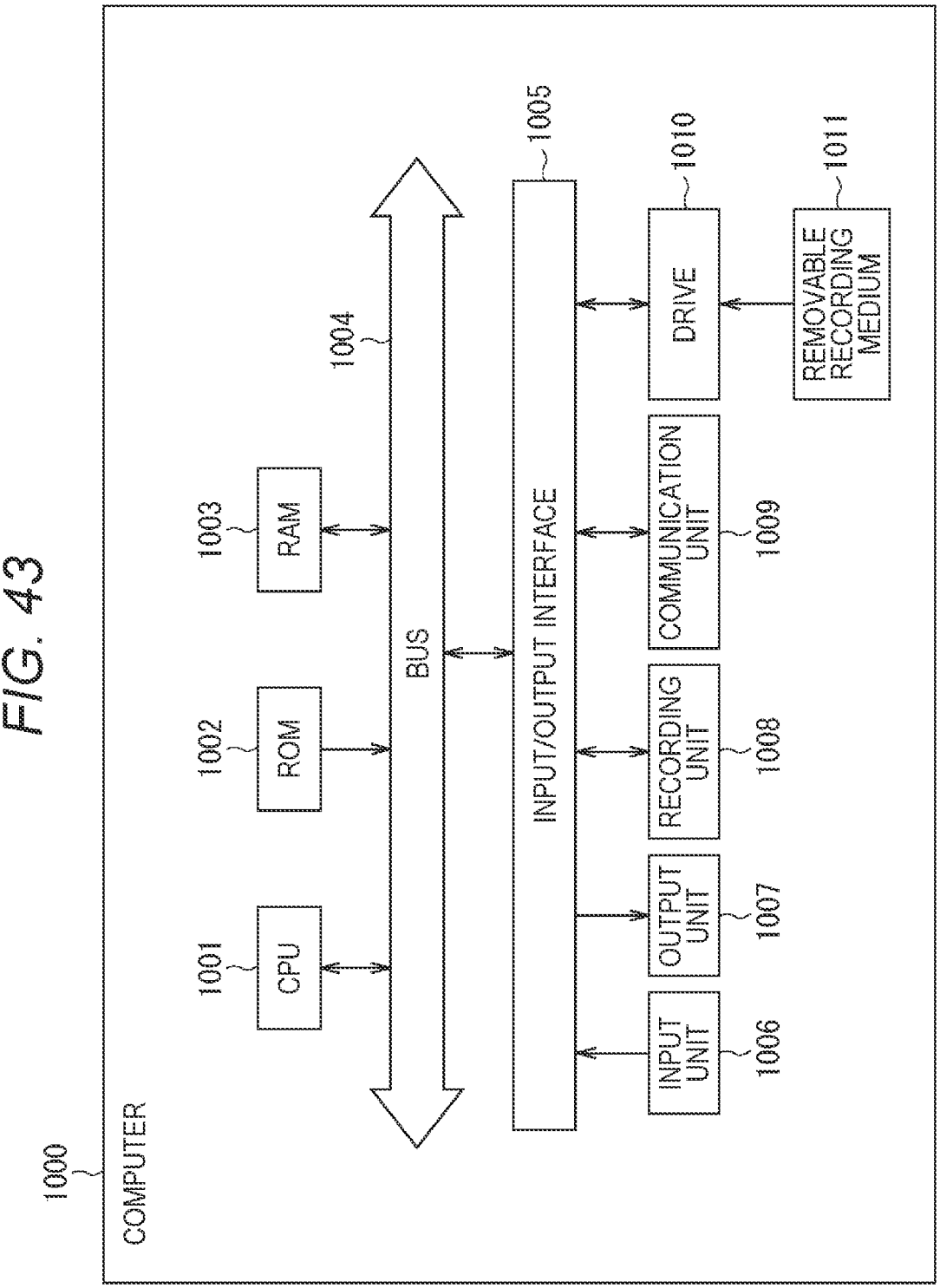
FIG. 43 is a diagram illustrating an example of a configuration for a computer.

The above-described series of processing (for example, the image processing and the like illustrated in FIGS. 25 to 28) can be executed by hardware or can be executed by software. In a case where the series of processing is executed by software, a program constituting the software is installed in a computer of each device. FIG. 43 is a block diagram illustrating an example of a configuration for computer hardware for a program to execute the above-described series of processing.

In a computer 1000, a central processing unit (CPU) 1001, a read only memory (ROM) 1002, and a random access memory (RAM) 1003 are connected to each other by a bus 1004. Moreover, an input/output interface 1005 is connected to the bus 1004. An input unit 1006, an output unit 1007, a recording unit 1008, a communication unit 1009, and a drive 1010 are connected to the input/output interface 1005.

The input unit 1006 is configured as a microphone, a keyboard, a mouse, or the like. The output unit 1007 is configured as a speaker, a display, or the like. The recording unit 1008 is configured as a hard disk, a nonvolatile memory, or the like. The communication unit 1009 is configured as a network interface or the like. The drive 1010 drives a removable recording medium 1011 such as a magnetic disk, an optical disk, a magneto-optical disk, or a semiconductor memory.

In the computer 1000 configured as described above, the CPU 1001 loads programs recorded in the ROM 1002 and the recording unit 1008 into the RAM 1003 via the input/output interface 1005 and the bus 1004 and executes the programs to perform the above-described series of processing.

The program to be executed by the computer 1000 (CPU 1001) can be provided by being recorded, for example, in the removable recording medium 1011 as a package medium or the like. Furthermore, the program can be provided via a wired or wireless transmission medium such as a local area network, the Internet, or digital satellite broadcasting.

In the computer 1000, the program can be installed in the recording unit 1008 via the input/output interface 1005 by mounting the removable recording medium 1011 on the drive 1010. Alternatively, the program can be installed in the recording unit 1008 after being received by the communication unit 1009 via a wired or wireless transmission medium. In addition, the program can be installed in the ROM 1002 or the recording unit 1008 in advance.

Here, in the present specification, the processing performed by the computer according to the program is not necessarily performed in time series in the order described in the flowchart. That is, the processing performed by the computer according to the program also includes processing executed in parallel or individually (for example, parallel processing or processing by an object). Furthermore, the program may be processed by one computer (processor) or may be processed in a distributed manner by a plurality of computers.

Note that the embodiments of the present technology are not limited to the above-described embodiments, and various modifications can be made without departing from the gist of the present technology.

Furthermore, each step of the above-described processing can be executed by one device or can be shared and executed by a plurality of devices. Moreover, in a case where a plurality of processing is included in one step, the plurality of processing included in the one step can be executed by one device or can be shared and executed by a plurality of devices.

Note that the present technology can have the following configurations.

(1)

A video distribution system including:

an image acquisition unit that acquires a low-resolution image from a low-resolution camera while acquiring a high-resolution image from a high-resolution camera, the high-resolution image having a narrower angle of view than the low-resolution image, having a higher resolution than the low-resolution image, and representing a region of a real space included in the low-resolution image;

an abnormality determination unit that determines whether or not there is an abnormality in any one of a first signal representing the low-resolution image and a second signal representing the high-resolution image; and a transmission control unit that transmits first synthetic images to a display terminal in a case where it is determined that there is no abnormality, the first synthetic images having continuity between the low-resolution image and the high-resolution image, and transmits second synthetic images to the display terminal in a case where it is determined that there is an abnormality, the second synthetic images substantially reproducing the continuity by replacing an image acquired from one determined to have the abnormality between the low-resolution camera and the high-resolution camera with a substitute image corresponding to the region of the real space.

(2)

The video distribution system according to (1), further including an image processing unit that generates the first synthetic images or the second synthetic images.

(3)

The video distribution system according to (2), in which the image processing unit reproduces the continuity between the low-resolution image and the high-resolution image by stitching using the low-resolution image and the high-resolution image.

(4)

The video distribution system according to (3), in which the substitute image includes the low-resolution image or a still image prepared in advance.

(5)

The video distribution system according to (4), in which in a case where the second signal is abnormal, the image processing unit complements a missing region of the high-resolution image with the low-resolution image.

(6)

The video distribution system according to (5), in which the image processing unit replaces the missing high-resolution image with a transparent image, and alpha-blends a high-resolution stitch image obtained by stitching using the high-resolution image onto a low-resolution stitch image obtained by stitching using the low-resolution image.

(7)

The video distribution system according to (6), in which
the image processing unit trims a region corresponding to the high-resolution stitch image off the low-resolution stitch image and resizes the trimmed-off region of the low-resolution stitch image to a size corresponding to the high-resolution stitch image.

(8)

The video distribution system according to any one of (4) to (7), in which
in a case where the first signal is abnormal, the image processing unit complements a missing region of the low-resolution image with the still image corresponding to the missing low-resolution image.

(9)

The video distribution system according to (8), in which
the still image includes a background image captured in advance or a background image immediately before the low-resolution image is missing.

(10)

The video distribution system according to any one of (1) to (9), in which
one or more of the low-resolution cameras are provided,
one or more of the high-resolution cameras are provided, and
the image acquisition unit acquires a plurality of the low-resolution images and a plurality of the high-resolution images.

(11)

The video distribution system according to (10), in which
on the basis of a plurality of first input signals corresponding to a plurality of the low-resolution images and a plurality of second input signals corresponding to a plurality of the high-resolution images, the abnormality determination unit determines that the first input signals are abnormal when one or more of the low-resolution cameras are abnormal, and determines that the second input signals are abnormal when one or more of the high-resolution cameras are abnormal.

(12)

The video distribution system according to (6), in which
the low-resolution stitch image includes an equidistant cylindrical image, and
the high-resolution stitch image includes a partial equidistant cylindrical image.

(13)

The video distribution system according to (12), in which
in the first synthetic images or the second synthetic images, a region excluding a region of the partial equidistant cylindrical image is replaced with the equidistant cylindrical image.

(14)

The video distribution system according to any one of (1) to (13), in which
the display terminal includes a head-mounted display.

(15)

A video distribution method performed by a video distribution system, including:
acquiring a low-resolution image from a low-resolution camera while acquiring a high-resolution image from a high-resolution camera, the high-resolution image having a narrower angle of view than the low-resolution image, having a higher resolution than the low-resolution image, and representing a region of a real space included in the low-resolution image;
determining whether or not there is an abnormality in any one of a first signal representing the low-resolution image and a second signal representing the high-resolution image; and
transmitting first synthetic images to a display terminal in a case where it is determined that there is no abnormality, the first synthetic images having continuity between the low-resolution image and the high-resolution image, and transmitting second synthetic images to the display terminal in a case where it is determined that there is an abnormality, the second synthetic images substantially reproducing the continuity by replacing an image acquired from one determined to have the abnormality between the low-resolution camera and the high-resolution camera with a substitute image corresponding to the region of the real space.

(16)

A computer-readable storage medium storing a program for causing a computer to function as:
an image acquisition unit that acquires a low-resolution image from a low-resolution camera while
acquiring a high-resolution image from a high-resolution camera, the high-resolution image having a narrower angle of view than the low-resolution image, having a higher resolution than the low-resolution image, and representing a region of a real space included in the low-resolution image;
an abnormality determination unit that determines whether or not there is an abnormality in any one of a first signal representing the low-resolution image and a second signal representing the high-resolution image; and
a transmission control unit that
transmits first synthetic images to a display terminal in a case where it is determined that there is no abnormality, the first synthetic images having continuity between the low-resolution image and the high-resolution image, and
transmits second synthetic images to the display terminal in a case where it is determined that there is an abnormality, the second synthetic images substantially reproducing the continuity by replacing an image acquired from one determined to have the abnormality between the low-resolution camera and the high-resolution camera with a substitute image corresponding to the region of the real space.

(17)

A display terminal including:
an image acquisition unit that acquires first synthetic images having continuity between
a low-resolution image acquired from a low-resolution camera and
a high-resolution image acquired from a high-resolution camera, the high-resolution image having a narrower angle of view than the low-resolution image, having a higher resolution than the low-resolution image, and representing a region of a real space included in the low-resolution image; and
a display control unit that
displays the first synthetic images on a display unit in a case where there is no abnormality in any one of a first signal representing the low-resolution image and a second signal representing the high-resolution image, and
displays second synthetic images on the display unit in a case where there is an abnormality, the second synthetic images substantially reproducing the continuity by replacing an image acquired from one having the abnormality between the low-resolution camera and the high-resolution camera with a substitute image corresponding to the region of the real space.

(18)

The display terminal according to (17), further including an image processing unit that generates the second synthetic images by performing alpha blending using an image to which an alpha image is applied, the alpha image including an alpha value corresponding to a missing region of the image included in the second synthetic images.

(19)

The display terminal according to (18), in which in a case where the second signal is abnormal, the image acquisition unit acquires a high-resolution alpha image including a first alpha value corresponding to a missing region of a high-resolution synthetic image included in the second synthetic images, and in a case where the second signal is abnormal, the image processing unit adds the first alpha value included in the high-resolution alpha image to the missing region of the high-resolution synthetic image, and alpha-blends the high-resolution synthetic image, to which the first alpha value has been added, onto a low-resolution synthetic image included in the second synthetic images.

(20)

The display terminal according to (18) or (19), in which in a case where the first signal is abnormal, the image acquisition unit acquires a high-resolution alpha image including a first alpha value corresponding to a missing region of a high-resolution synthetic image included in the second synthetic images, and a low-resolution alpha image including a second alpha value corresponding to a missing region of a low-resolution synthetic image included in the second synthetic images, and in a case where the first signal is abnormal, the image processing unit adds the first alpha value included in the high-resolution alpha image to the missing region of the high-resolution synthetic image, adds the second alpha value included in the low-resolution alpha image to the missing region of the low-resolution synthetic image, alpha-blends the high-resolution synthetic image, to which the first alpha value has been added, onto the low-resolution synthetic image, to which the second alpha value has been added, and alpha-blends an image obtained by the alpha blending onto a background still image prepared in advance.

(21)

The display terminal according to (17) or (18), in which the substitute image includes a low-resolution synthetic image included in the second synthetic images or a background still image prepared in advance.

(22)

A display control method performed by a display terminal, including:

acquiring first synthetic images having continuity between a low-resolution image acquired from a low-resolution camera and a high-resolution image acquired from a high-resolution camera, the high-resolution image having a narrower angle of view than the low-resolution image, having a higher resolution than the low-resolution image, and representing a region of a real space included in the low-resolution image; and displaying the first synthetic images on a display unit in a case where there is no abnormality in any one of a first signal representing the low-resolution image and a second signal representing the high-resolution image, and displaying second synthetic images on the display unit in a case where there is an abnormality, the second synthetic images substantially reproducing the continuity by replacing an image acquired from one having the abnormality between the low-resolution camera and the high-resolution camera with a substitute image corresponding to the region of the real space.

(23)

A computer-readable storage medium storing a program for causing a computer to function as:

an image acquisition unit that acquires first synthetic images having continuity between a low-resolution image acquired from a low-resolution camera and a high-resolution image acquired from a high-resolution camera, the high-resolution image having a narrower angle of view than the low-resolution image, having a higher resolution than the low-resolution image, and representing a region of a real space included in the low-resolution image; and a display control unit that displays the first synthetic images on a display unit in a case where there is no abnormality in any one of a first signal representing the low-resolution image and a second signal representing the high-resolution image, and displays second synthetic images on the display unit in a case where there is an abnormality, the second synthetic images substantially reproducing the continuity by replacing an image acquired from one having the abnormality between the low-resolution camera and the high-resolution camera with a substitute image corresponding to the region of the real space.

REFERENCE SIGNS LIST 1, 2, 3 Video distribution system
10 Workstation
11, 11-1 to 11-N Camera
11-1, 11-2 High-resolution camera
11-3, 11-4 Low-resolution camera
12 Video distribution server
20, 20-1 to 20M Display terminal
30 Internet
100 Control unit
101 Input unit
102 Output unit
103 Storage unit
104 Communication unit
111 Image acquisition unit
112 Abnormality determination unit
113 Image processing unit
114 Transmission control unit
121-1 to 121-4 Input monitoring unit
122 Distribution unit
123 Memory
131-1, 131-2 Synchronization processing unit
132-1 High-resolution stitch processing unit
132-2 Low-resolution stitch processing unit
133 Distribution unit
134 Trimming and resizing unit
135 Alpha-blending unit
136 Division unit
150 Control unit
151 Storage unit
152 Communication unit
161 Transmission control unit
200 Control unit 201 Sensor unit
202 Storage unit
203 Display unit
204 Sound output unit
205 Input terminal
206 Output terminal
207 Communication unit
211 Image acquisition unit
212 Image processing unit
213 Display control unit
1000 Computer
1001 CPU

The invention claimed is:

1. A video distribution system comprising:
an image acquisition unit that acquires a low-resolution image from a low-resolution camera while acquiring a high-resolution image from a high-resolution camera, the high-resolution image having a narrower angle of view than the low-resolution image, having a higher resolution than the low-resolution image, and representing a region of a real space included in the low-resolution image;
an abnormality determination unit that determines whether or not there is an abnormality in any one of a first signal representing the low-resolution image and a second signal representing the high-resolution image; and
a transmission control unit that
transmits first synthetic images to a display terminal in a case where it is determined that there is no abnormality, the first synthetic images having continuity between the low-resolution image and the high-resolution image, and
transmits second synthetic images to the display terminal in a case where it is determined that there is an abnormality, the second synthetic images substantially reproducing the continuity by replacing an image acquired from one determined to have the abnormality between the low-resolution camera and the high-resolution camera with a substitute image corresponding to the region of the real space.

2. The video distribution system according to claim 1, further comprising
an image processing unit that generates the first synthetic images or the second synthetic images.

3. The video distribution system according to claim 2, wherein
the image processing unit reproduces the continuity between the low-resolution image and the high-resolution image by stitching using the low-resolution image and the high-resolution image.

4. The video distribution system according to claim 3, wherein
the substitute image includes the low-resolution image or a still image prepared in advance.

5. The video distribution system according claim 4, wherein
in a case where the second signal is abnormal, the image processing unit complements a missing region of the high-resolution image with the low-resolution image.

6. The video distribution system according to claim 5, wherein
the image processing unit
replaces the missing high-resolution image with a transparent image, and
alpha-blends a high-resolution stitch image obtained by stitching using the high-resolution image onto a low-resolution stitch image obtained by stitching using the low-resolution image.

7. The video distribution system according to claim 6, wherein
the image processing unit trims a region corresponding to the high-resolution stitch image off the low-resolution stitch image and resizes the trimmed-off region of the low-resolution stitch image to a size corresponding to the high-resolution stitch image.

8. The video distribution system according to claim 4, wherein
in a case where the first signal is abnormal, the image processing unit complements a missing region of the low-resolution image with the still image corresponding to the missing low-resolution image.

9. The video distribution system according to claim 8, wherein
the still image includes a background image captured in advance or a background image immediately before the low-resolution image is missing.

10. The video distribution system according to claim 1, wherein
one or more of the low-resolution cameras are provided,
one or more of the high-resolution cameras are provided, and
the image acquisition unit acquires a plurality of the low-resolution images and a plurality of the high-resolution images.

11. The video distribution system according to claim 10, wherein
on a basis of a plurality of first input signals corresponding to a plurality of the low-resolution images and a plurality of second input signals corresponding to a plurality of the high-resolution images, the abnormality determination unit determines that the first input signals are abnormal when one or more of the low-resolution cameras are abnormal, and determines that the second input signals are abnormal when one or more of the high-resolution cameras are abnormal.

12. The video distribution system according to claim 6, wherein
the low-resolution stitch image includes an equidistant cylindrical image, and
the high-resolution stitch image includes a partial equidistant cylindrical image.

13. The video distribution system according to claim 12, wherein
in the first synthetic images or the second synthetic images, a region excluding a region of the partial equidistant cylindrical image is replaced with the equidistant cylindrical image.

14. The video distribution system according to claim 1, wherein
the display terminal includes a head-mounted display.

15. A video distribution method performed by a video distribution system, comprising:
acquiring a low-resolution image from a low-resolution camera while acquiring a high-resolution image from a high-resolution camera, the high-resolution image having a narrower angle of view than the low-resolution image, having a higher resolution than the low-resolution image, and representing a region of a real space included in the low-resolution image;

determining whether or not there is an abnormality in any one of a first signal representing the low-resolution image and a second signal representing the high-resolution image; and transmitting first synthetic images to a display terminal in a case where it is determined that there is no abnormality, the first synthetic images having continuity between the low-resolution image and the high-resolution image, and transmitting second synthetic images to the display terminal in a case where it is determined that there is an abnormality, the second synthetic images substantially reproducing the continuity by replacing an image acquired from one determined to have the abnormality between the low-resolution camera and the high-resolution camera with a substitute image corresponding to the region of the real space.

16. A display terminal comprising:

an image acquisition unit that acquires first synthetic images having continuity between a low-resolution image acquired from a low-resolution camera and a high-resolution image acquired from a high-resolution camera, the high-resolution image having a narrower angle of view than the low-resolution image, having a higher resolution than the low-resolution image, and representing a region of a real space included in the low-resolution image; and a display control unit that displays the first synthetic images on a display unit in a case where there is no abnormality in any one of a first signal representing the low-resolution image and a second signal representing the high-resolution image, and displays second synthetic images on the display unit in a case where there is an abnormality, the second synthetic images substantially reproducing the continuity by replacing an image acquired from one having the abnormality between the low-resolution camera and the high-resolution camera with a substitute image corresponding to the region of the real space.

17. The display terminal according to claim 16, further comprising an image processing unit that generates the second synthetic images by performing alpha blending using an image to which an alpha image is applied, the alpha image including an alpha value corresponding to a missing region of the image included in the second synthetic images.

18. The display terminal according to claim 17, wherein in a case where the second signal is abnormal, the image acquisition unit acquires a high-resolution alpha image including a first alpha value corresponding to a missing region of a high-resolution synthetic image included in the second synthetic images, and in a case where the second signal is abnormal, the image processing unit adds the first alpha value included in the high-resolution alpha image to the missing region of the high-resolution synthetic image, and alpha-blends the high-resolution synthetic image, to which the first alpha value has been added, onto a low-resolution synthetic image included in the second synthetic images.

19. The display terminal according to claim 17, wherein in a case where the first signal is abnormal, the image acquisition unit acquires a high-resolution alpha image including a first alpha value corresponding to a missing region of a high-resolution synthetic image included in the second synthetic images, and a low-resolution alpha image including a second alpha value corresponding to a missing region of a low-resolution synthetic image included in the second synthetic images, and in a case where the first signal is abnormal, the image processing unit adds the first alpha value included in the high-resolution alpha image to the missing region of the high-resolution synthetic image, adds the second alpha value included in the low-resolution alpha image to the missing region of the low-resolution synthetic image, alpha-blends the high-resolution synthetic image, to which the first alpha value has been added, onto the low-resolution synthetic image, to which the second alpha value has been added, and alpha-blends an image obtained by the alpha blending onto a background still image prepared in advance.

20. The display terminal according to claim 16, wherein the substitute image includes a low-resolution synthetic image included in the second synthetic images or a background still image prepared in advance.

* * * * *